(12) United States Patent
Chen et al.

(10) Patent No.: US 10,019,633 B2
(45) Date of Patent: Jul. 10, 2018

(54) MULTI-TO-MULTI TRACKING IN VIDEO ANALYTICS

(71) Applicant: QUALCOMM Incorporated, San Diego, CA (US)

(72) Inventors: Ying Chen, San Diego, CA (US); Lei Wang, Clovis, CA (US); Jinglun Gao, Milpitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 15/384,911

(22) Filed: Dec. 20, 2016

(65) Prior Publication Data
US 2018/0046865 A1   Feb. 15, 2018

Related U.S. Application Data

(60) Provisional application No. 62/375,174, filed on Aug. 15, 2016.

(51) Int. Cl.
  *G06K 9/00* (2006.01)
  *G06K 9/32* (2006.01)
  (Continued)

(52) U.S. Cl.
  CPC ....... *G06K 9/00771* (2013.01); *G06K 9/3233* (2013.01); *G06K 9/6201* (2013.01);
  (Continued)

(58) Field of Classification Search
  None
  See application file for complete search history.

(56) References Cited

U.S. PATENT DOCUMENTS 7,227,893 B1 * 6/2007 Srinivasa ........... G06K 9/00771
                                                                  348/155
9,390,506 B1    7/2016 Asvatha et al.
(Continued)

FOREIGN PATENT DOCUMENTS

AU        2008261196 A1    7/2010

OTHER PUBLICATIONS

Breuers S., et al., "Exploring Bounding Box Context for Multi-Object Tracker Fusion", IEEE Winter Conference on Applications of Computer Vision (WACV), Mar. 2016, pp. 1-8.
(Continued)

*Primary Examiner* — Shervin Nakhjavan
(74) *Attorney, Agent, or Firm* — Kilpatrick Townsend & Stockton

(57) ABSTRACT

Techniques and systems are provided for processing video data. For example, techniques and systems are provided for matching a plurality of bounding boxes to a plurality of trackers. In some examples, a first association is performed, in which case one or more of the plurality of bounding boxes are associated with one or more of the plurality of trackers by minimizing distances between the one or more bounding boxes and the one or more trackers. A set of unmatched trackers are identified from the plurality of trackers after the first association. The set of unmatched trackers are not associated with a bounding box from the plurality of bounding boxes during the first association. A second association is then performed, in which case each of the set of unmatched trackers is associated with an associated bounding box from the plurality of bounding boxes that is within a first pre-determined distance. A set of unmatched bounding boxes is identified from the plurality of bounding boxes after the second association. The set of unmatched bounding boxes are not associated with a tracker from the plurality of trackers during the second association. A third association is then performed, in which case each of the set of unmatched (Continued)

bounding boxes is associated with an associated tracker from the plurality of trackers that is within a second predetermined distance.

30 Claims, 28 Drawing Sheets

(51) Int. Cl.
    *G06K 9/62*     (2006.01)
    *G06T 7/20*     (2017.01)

(52) U.S. Cl.
    CPC ........ *G06T 7/20* (2013.01); *G06K 2009/6213* (2013.01); *G06T 2207/10004* (2013.01); *G06T 2207/10016* (2013.01)

(56) References Cited

U.S. PATENT DOCUMENTS

| | | | |
|---|---|---|---|
| 9,846,810 B2 * | 12/2017 | Partis | G06K 9/00771 |
| 2008/0111730 A1 | 5/2008 | Ding et al. | |
| 2014/0098989 A1 | 4/2014 | Datta et al. | |
| 2015/0104066 A1 | 4/2015 | Shellshear | |
| 2015/0309581 A1 * | 10/2015 | Minnen | G06T 7/20 |
| | | | 345/156 |
| 2015/0310628 A1 | 10/2015 | Burry | |
| 2015/0317519 A1 | 11/2015 | Gurbuz | |

OTHER PUBLICATIONS

Fan L., et al., "A Survey on Multiple Object Tracking Algorithm", Proceedings of the IEEE International Conference on Information and Automation, Aug. 1, 2016, pp. 1855-1862, XP033053713, DOI: 10.1109/ICINFA.2016.7832121 [retrieved on Jan. 24, 2017].
International Search Report and Written Opinion—PCT/US2017/040727—ISA/EPO—dated Oct. 10, 2017.
Zulkifley M.A., et al., "Robust Hierarchical Multiple Hypothesis Tracker for Multiple-Object Tracking", Expert Systems With Applications, vol. 39. No. 16, Jun. 6, 2012, pp. 12319-12331, XP028451655, ISSN: 0957-4174, DOI: 10.1016/J.ESWA.2012.03.004 [retrieved on Jun. 6, 2012].

\* cited by examiner

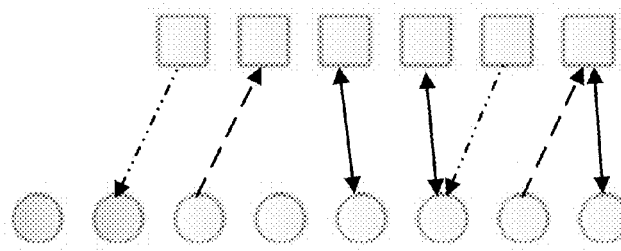
FIG. 5J
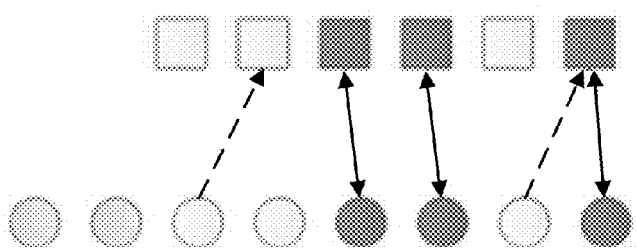
FIG. 5I
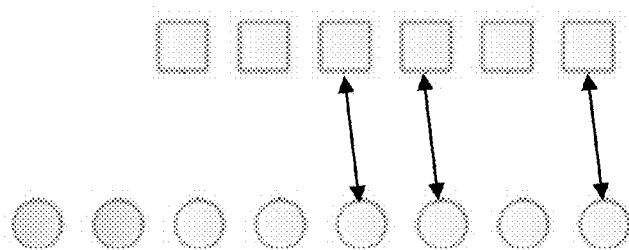
FIG. 5H
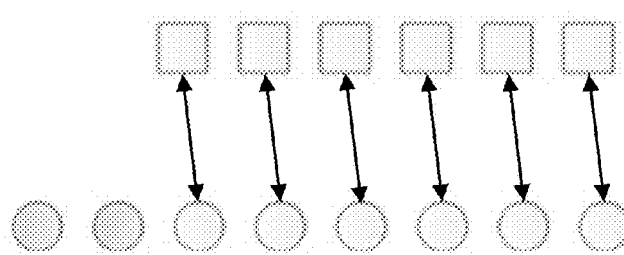
FIG. 5G
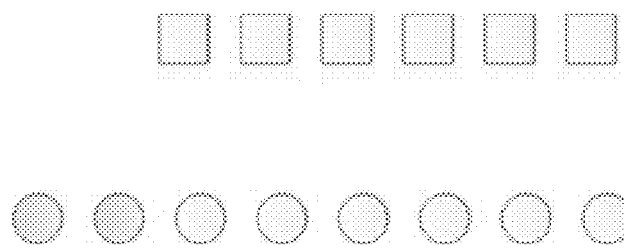
FIG. 5F
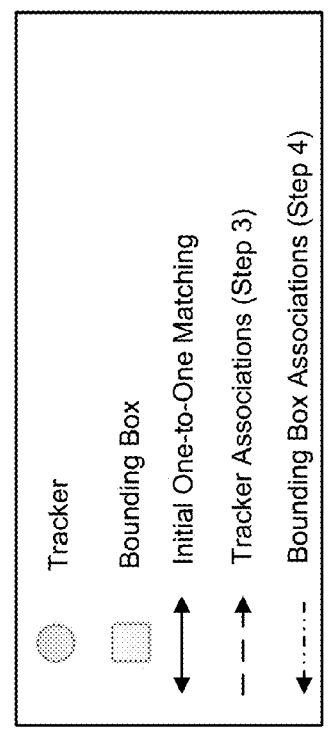

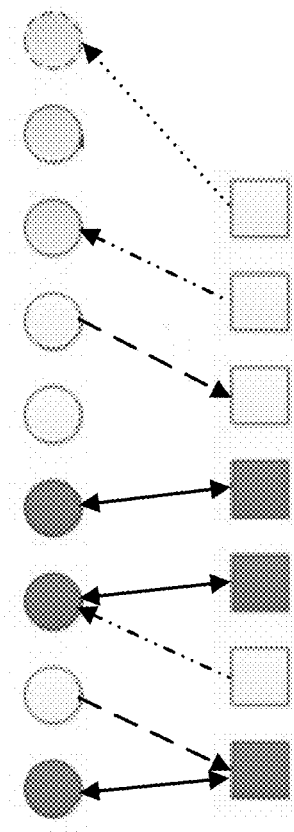
FIG. 5K
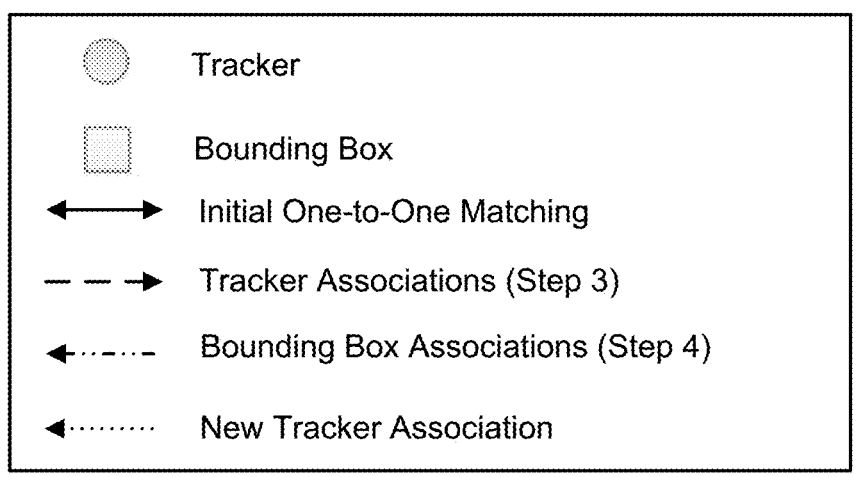

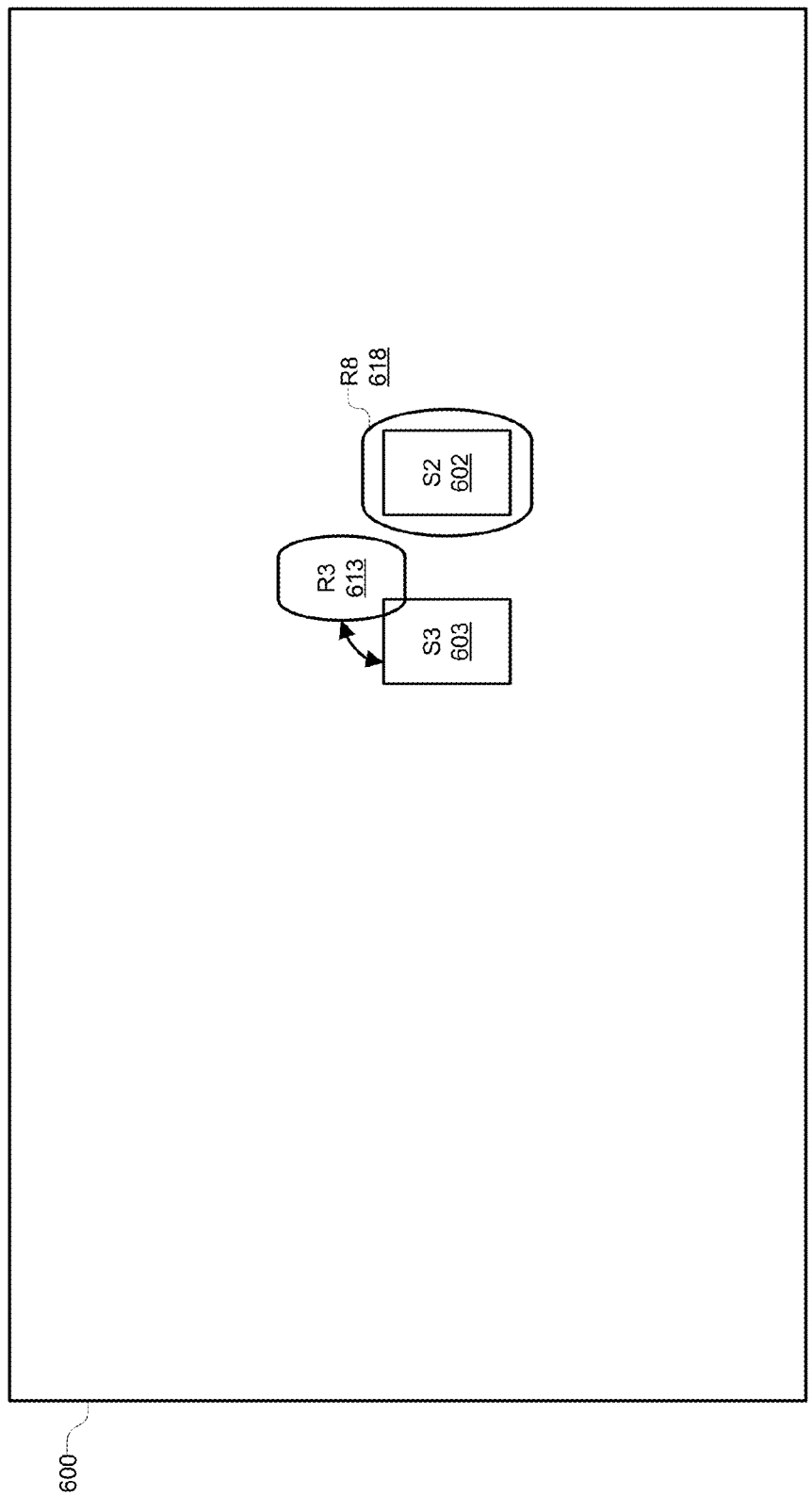

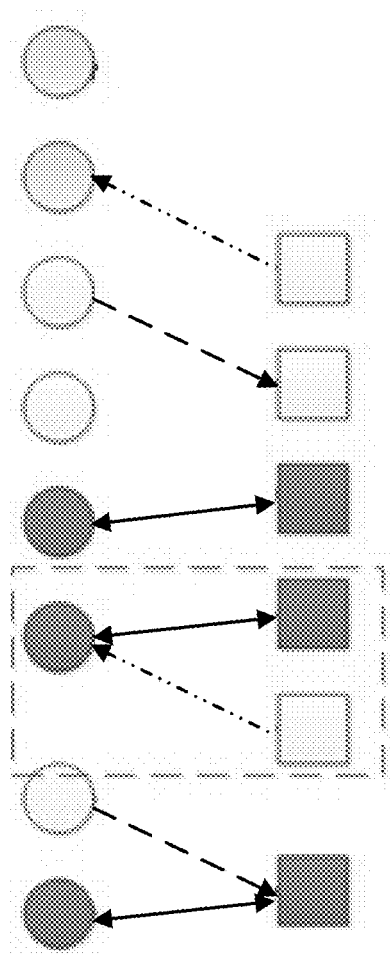
FIG. 6C
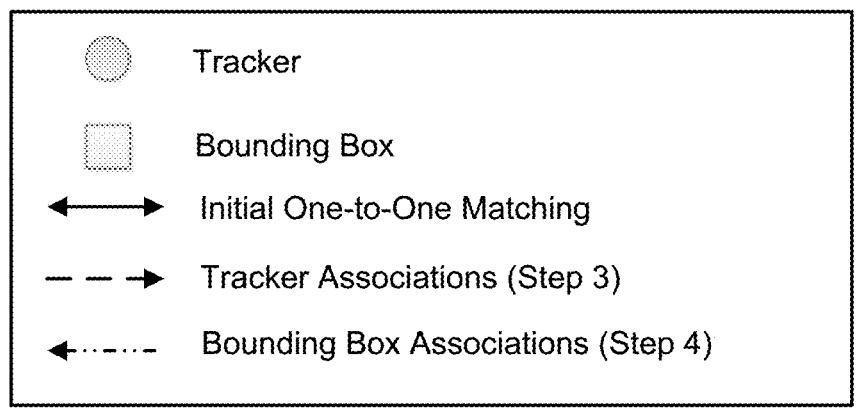

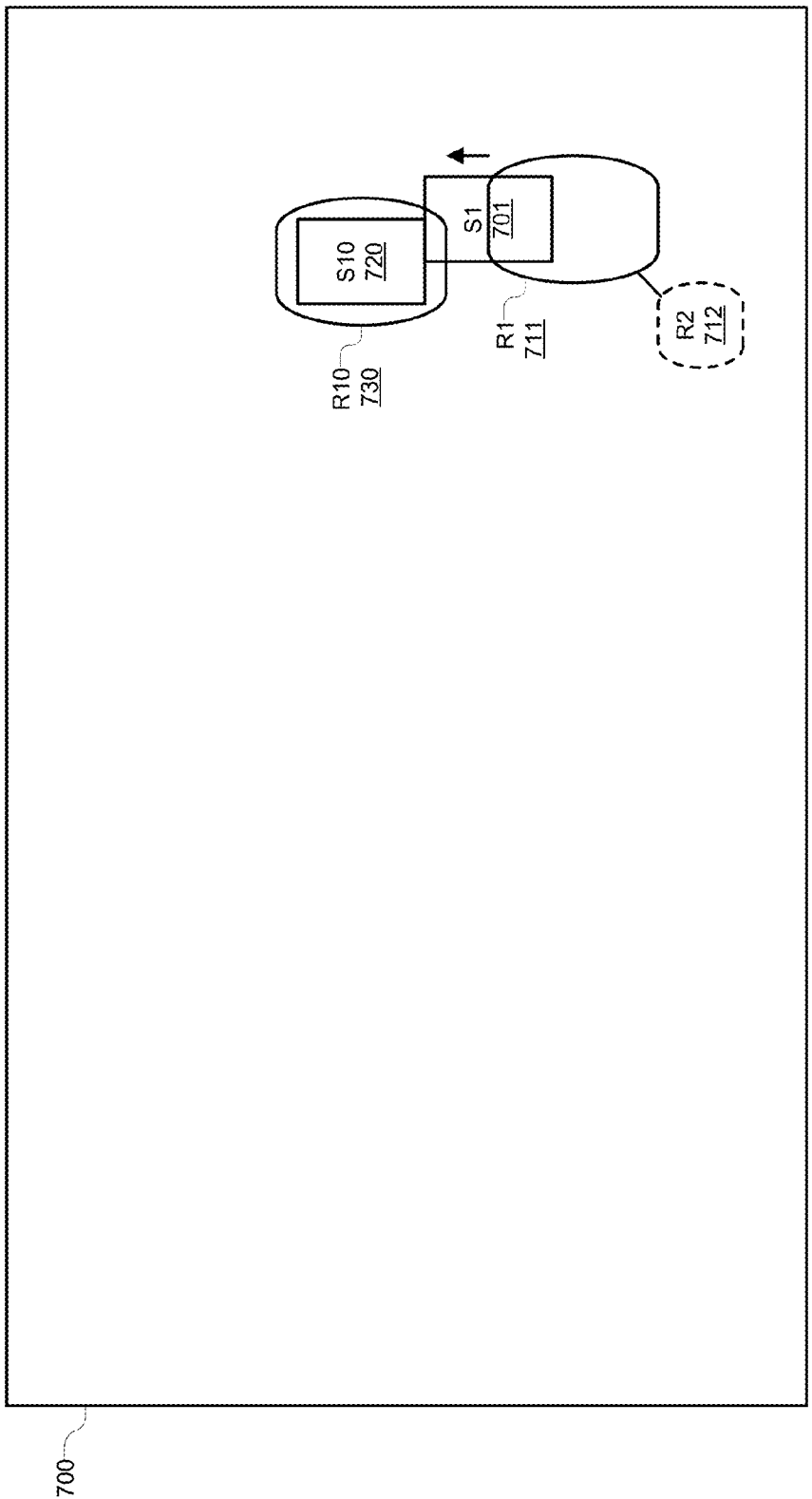

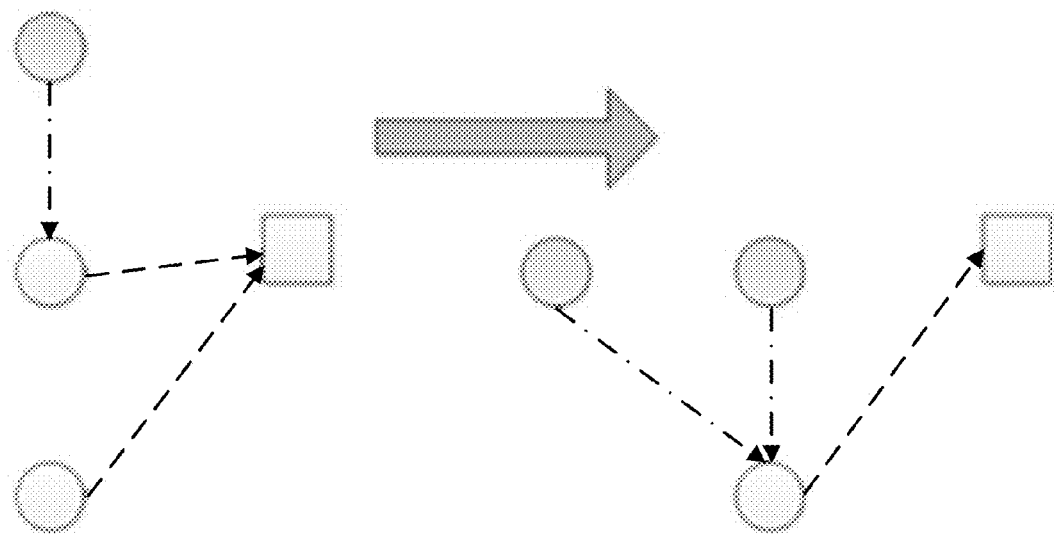
FIG. 7E
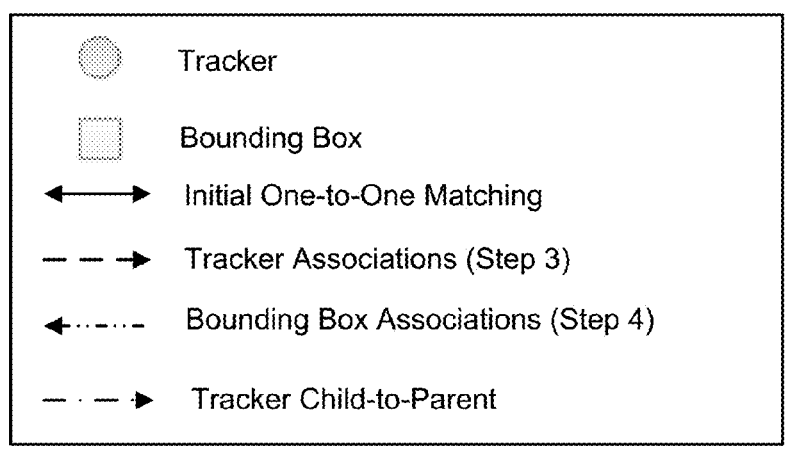

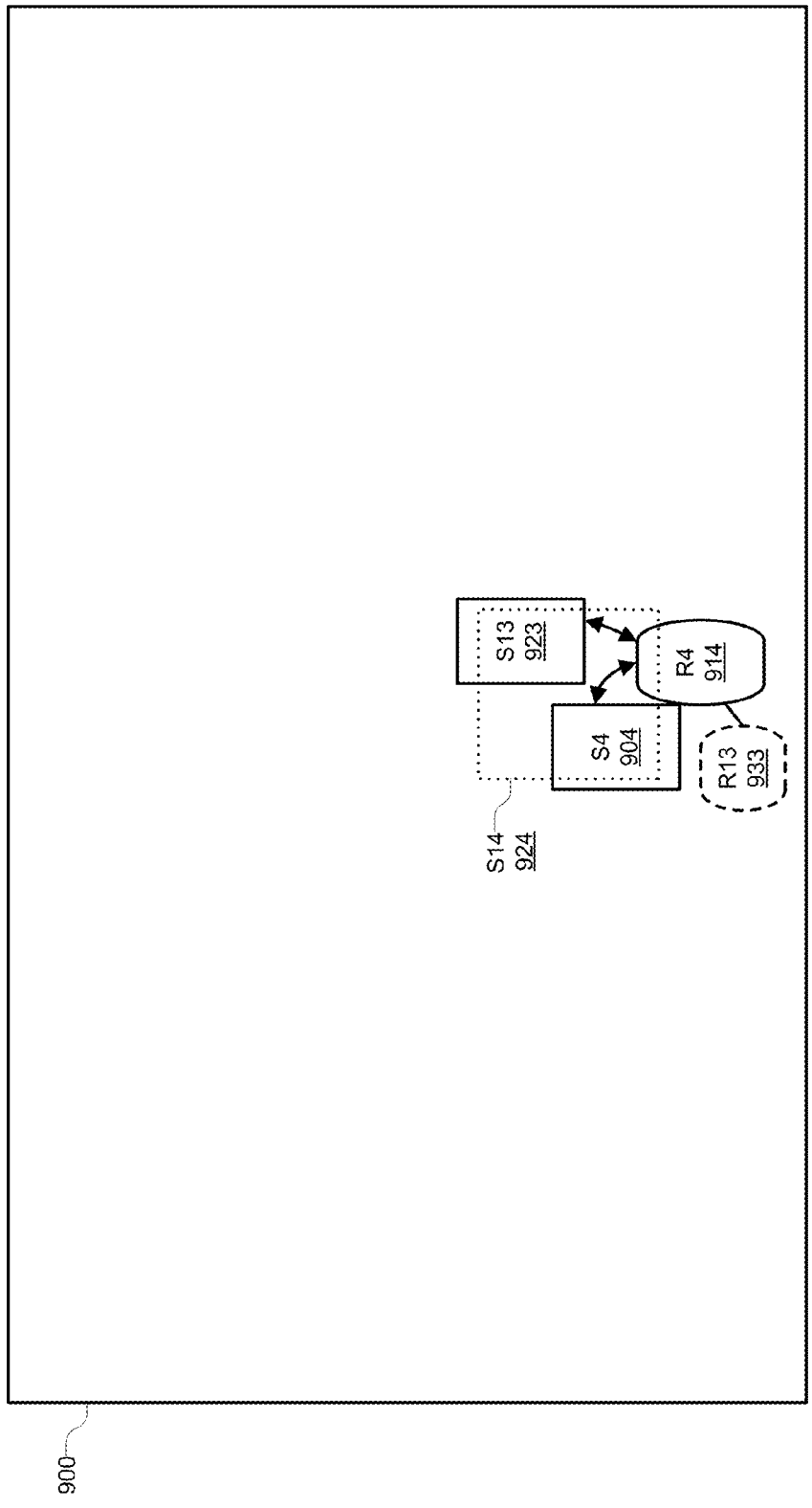

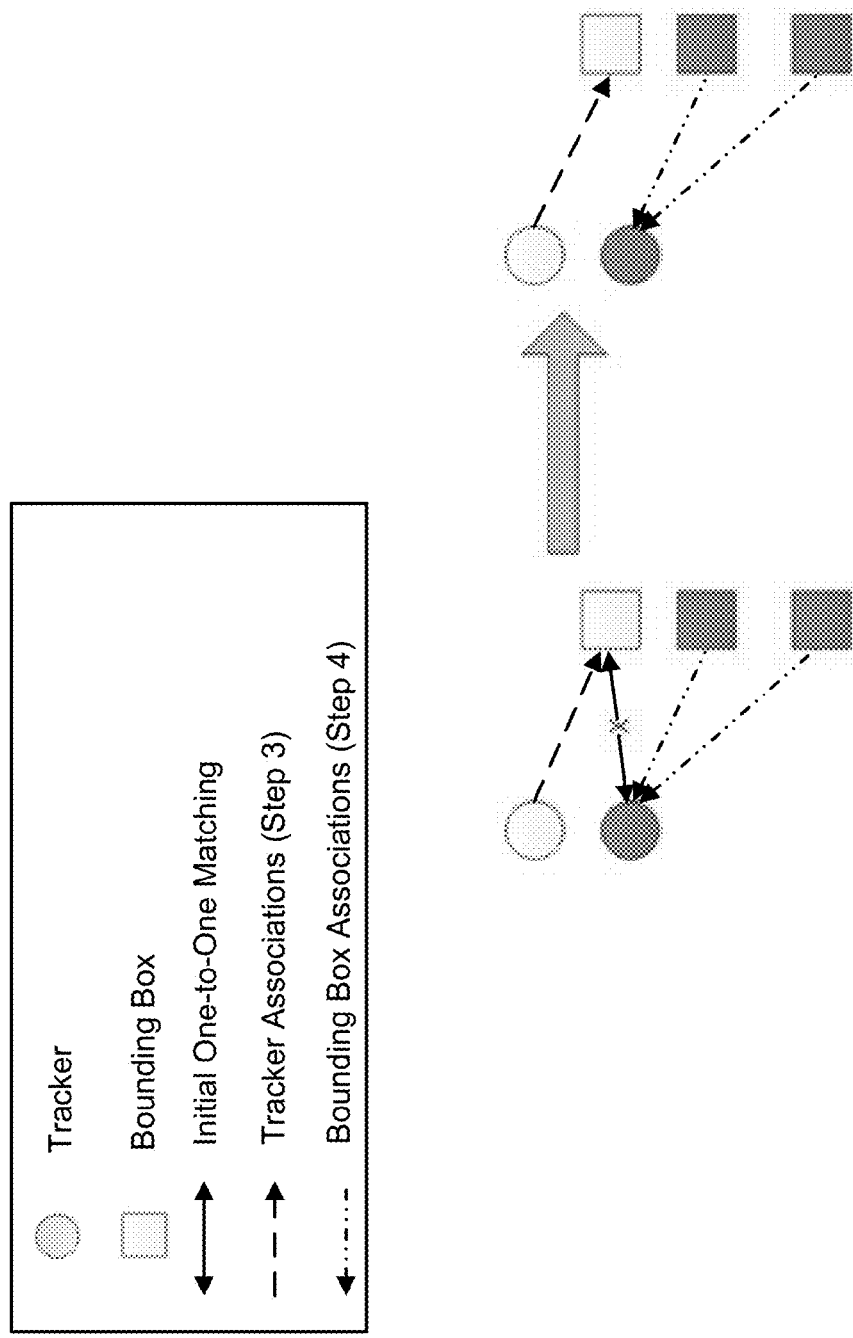

MULTI-TO-MULTI TRACKING IN VIDEO ANALYTICS

CROSS-REFERENCE TO RELATED APPLICATIONS

This application claims the benefit of U.S. Provisional Application No. 62/375,174, filed Aug. 15, 2016, which is hereby incorporated by reference, in its entirety.

FIELD

The present disclosure generally relates to video analytics, and more specifically to techniques and systems for multi-to-multi matching of blob bounding boxes to object trackers.

BACKGROUND

Many devices and systems allow a scene to be captured by generating video data of the scene. For example, an Internet protocol camera (IP camera) is a type of digital video camera that can be employed for surveillance or other applications. Unlike analog closed circuit television (CCTV) cameras, an IP camera can send and receive data via a computer network and the Internet. The video data from these devices and systems can be captured and output for processing and/or consumption.

Video analytics, also referred to as Video Content Analysis (VCA), is a generic term used to describe computerized processing and analysis of a video sequence acquired by a camera. Video analytics provides a variety of tasks, including immediate detection of events of interest, analysis of pre-recorded video for the purpose of extracting events in a long period of time, and many other tasks. For instance, using video analytics, a system can automatically analyze the video sequences from one or more cameras to detect one or more events. In some cases, video analytics can send alerts or alarms for certain events of interest. More advanced video analytics is needed to provide efficient and robust video sequence processing.

BRIEF SUMMARY

In some embodiments, techniques and systems are described for a multi-to-multi matching process, which can be used in video content analysis to match multiple bounding boxes and multiple trackers in a video frame. A bounding box can be used in video content analysis to circumscribe a blob detected in a video frame. A blob represents at least a portion of one or more objects in a video frame (also referred to as a "picture"). A tracker (also referred to herein as a blob tracker or object tracker) can be used to track the movement of an object as the object moves within a scene being viewed by a camera. A tracker thus can provide historical data about an object. A bounding box, which may circumscribe a blob, can provide various information about the blob, such as the blob's location, size, and/or approximate shape. A video content analysis system can use a blob's bounding box to update a tracker that is associated with the blob.

In many cases, many objects may be moving within a scene at any given moment. When objects within a scene stay relatively far apart, each object may be detected as individual blobs, and can be tracked as individual blobs. Objects, however, can move close enough to each other that two or more objects appear merged, and are detected as only one blob. Alternatively, an object may initially appear as one blob, but then later split into multiple objects, and be detected as multiple blobs. Objects may even merge and then split again. Additionally, objects may be entering and leaving a scene, with blobs of pixels for each object appearing and disappearing. Furthermore, each of these situations—objects merging, splitting, entering the scene, or leaving the scene—may happen in various combinations, with various numbers of objects.

Effective video content analysis can continue to accurately track objects through each of these situations or combination of situations. To do so, a video content analysis system can include a multi-to-multi matching process. Using the multi-to-multi matching process, the system can match (or associate) multiple bounding boxes in a scene and multiple trackers. A multi-to-multi matching process may not only attempt to make sure each tracker and each bounding box finds a match, but may also attempt to find the best matches. For example, in most cases, a bounding box should only be matched with a tracker that is within a certain distance to the bounding box. The matching process may further be able to determine when a split has occurred, such as by identifying trackers that the process has associated with more than one bounding box. The matching process may also be able to determine when a merge has occurred, such as by identifying bounding boxes that the process has associated with more than one tracker. The matching process may further make use of "hidden" trackers, which can be used to preserve information when a blob has merged with another blob. Using these and other techniques, the multi-to-multi matching process can provide a more accurate reflection of the activity within a scene.

According to at least one example, a method of matching a plurality of bounding boxes to a plurality of trackers is provided that includes performing a first association, the first association including associating one or more bounding boxes from the plurality of bounding boxes with one or more trackers from the plurality of trackers. The associating includes minimizing distances between the one or more bounding boxes and the one or more trackers. The method further includes identifying a set of unmatched trackers from the plurality of trackers after the first association. The set of unmatched trackers are not associated with a bounding box from the plurality of bounding boxes during performance of the first association. The method further includes performing a second association, the second association including associating each of the set of unmatched trackers with an associated bounding box from the plurality of bounding boxes that is within a first pre-determined distance. The method further includes identifying a set of unmatched bounding boxes from the plurality of bounding boxes after the second association. The set of unmatched bounding boxes are not associated with a tracker from the plurality of trackers during performance of the second association. The method further includes performing a third association, the third association including associating each bounding box of the set of unmatched bounding boxes with an associated tracker from the plurality of trackers that is within a second pre-determined distance.

In another example, an apparatus is provided that includes a memory configured to store video data and a processor. The processor is configured to and can perform a first association, the first association including associating one or more bounding boxes from the plurality of bounding boxes with one or more trackers from the plurality of trackers. The associating includes minimizing distances between the one or more bounding boxes and the one or more trackers. The processor is configured to and can identify a set of unmatched trackers from the plurality of trackers after the first association. The set of unmatched trackers are not associated with a bounding box from the plurality of bounding boxes during performance of the first association. The processor is configured to and can perform a second association, the second association including associating each of the set of unmatched trackers with an associated bounding box from the plurality of bounding boxes that is within a first pre-determined distance. The processor is configured to and can identify a set of unmatched bounding boxes from the plurality of bounding boxes after the second association. The set of unmatched bounding boxes are not associated with a tracker from the plurality of trackers during performance of the second association. The processor is configured to and can perform a third association, the third association including associating each bounding box of the set of unmatched bounding boxes with an associated tracker from the plurality of trackers that is within a second pre-determined distance.

In another example, a computer readable medium is provided having stored thereon instructions that when executed by a processor perform a method that includes: performing a first association, the first association including associating one or more bounding boxes from the plurality of bounding boxes with one or more trackers from the plurality of trackers, wherein the associating includes minimizing distances between the one or more bounding boxes and the one or more trackers; identifying a set of unmatched trackers from the plurality of trackers after the first association, wherein the set of unmatched trackers are not associated with a bounding box from the plurality of bounding boxes during performance of the first association; performing a second association, the second association including associating each of the set of unmatched trackers with an associated bounding box from the plurality of bounding boxes that is within a first pre-determined distance; identifying a set of unmatched bounding boxes from the plurality of bounding boxes after the second association, wherein the set of unmatched bounding boxes are not associated with a tracker from the plurality of trackers during performance of the second association; and performing a third association, the third association including associating each bounding box of the set of unmatched bounding boxes with an associated tracker from the plurality of trackers that is within a second pre-determined distance.

In another example, an apparatus is provided that includes means for performing a first association, the first association including associating one or more bounding boxes from the plurality of bounding boxes with one or more trackers from the plurality of trackers. The associating includes minimizing distances between the one or more bounding boxes and the one or more trackers. The apparatus further comprises means for identifying a set of unmatched trackers from the plurality of trackers after the first association. The set of unmatched trackers are not associated with a bounding box from the plurality of bounding boxes during performance of the first association. The apparatus further comprises means for performing a second association, the second association including associating each of the set of unmatched trackers with an associated bounding box from the plurality of bounding boxes that is within a first pre-determined distance. The apparatus further comprises means for identifying a set of unmatched bounding boxes from the plurality of bounding boxes after the second association. The set of unmatched bounding boxes are not associated with a tracker from the plurality of trackers during performance of the second association. The apparatus further comprises means for performing a third association, the third association including associating each bounding box of the set of unmatched bounding boxes with an associated tracker from the plurality of trackers that is within a second pre-determined distance.

In some aspects, the methods, apparatuses, and computer readable medium described above further comprise: wherein the first association includes associating a number of bounding boxes from the plurality of bounding boxes with an equal number of trackers from the plurality of trackers, wherein each bounding box from the number of bounding boxes is matched with one tracker from the number of trackers; identifying one or more bounding boxes from the number of bounding boxes and one or more associated trackers from the number of trackers, wherein a distance between each of the identified one or more bounding boxes and an associated tracker from the one or more associated trackers is greater than a third pre-determined distance; and removing associations between the identified one or more bounding boxes and one or more associated trackers.

In some aspects, the methods, apparatuses, and computer readable medium described above further comprise: identifying one or more remaining unmatched bounding boxes from the plurality of bounding boxes after the third association; and generating a new tracker for each of the one or more remaining unmatched bounding boxes.

In some aspects, the methods, apparatuses, and computer readable medium described above further comprise: identifying one or more remaining unmatched trackers from the plurality of trackers after the third association; and designating the one or more remaining unmatched trackers as lost.

In some aspects, the methods, apparatuses, and computer readable medium described above further comprise: identifying a first bounding box from the plurality of bounding boxes that is associated with a tracker from the plurality of trackers after the third association, wherein the tracker is associated with a second bounding box from the plurality of bounding boxes; and splitting the first bounding box from the tracker. The splitting includes: removing the association of the first bounding box from the tracker; generating a new tracker; and associating the first bounding box with the new tracker.

In some aspects, the methods, apparatuses, and computer readable medium described above further comprise: identifying a bounding box from the plurality of bounding boxes that is associated with at least a first tracker and a second tracker, wherein the first tracker and the second tracker are included in the plurality of trackers; and merging the first tracker and the second tracker. The merging includes: assigning the first tracker as a hidden tracker of the second tracker; assigning the second tracker as a parent tracker of the first tracker; and removing the association of the first tracker from the identified bounding box.

In some aspects, associating each bounding box of the set of bounding boxes with an associated tracker from the plurality of trackers includes associating an unmatched bounding box from the one or more unmatched bounding boxes with a tracker from the plurality of trackers that is designated as hidden.

In some aspects, hidden trackers are only considered for association with the set of unmatched bounding boxes during the third association.

In some aspects, the methods, apparatuses, and computer readable medium described above further comprise: identifying a first bounding box from the plurality of bounding boxes that is associated with a first tracker from the plurality of trackers after the third association, wherein the first tracker is associated with a second bounding box, wherein a second tracker is assigned as a hidden tracker of the first tracker; and splitting the first bounding box from the first tracker. The splitting includes: removing the association of the first bounding box from the first tracker; removing the second tracker as the hidden tracker of the first tracker; and associating the first bounding box with the second tracker.

In some aspects, the methods, apparatuses, and computer readable medium described above further comprise: identifying a first tracker from the plurality of trackers that is associated with a first bounding box and a second bounding box, wherein the first bounding box and the second bounding box are included in the plurality of bounding boxes; identifying a second tracker from the plurality of trackers that is associated with the second bounding box; and removing the association of the first tracker from the second bounding box.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 5A-FIG. 5K illustrate various examples of matching trackers and bounding boxes according to a multi-to-multi matching process.

FIG. 6B illustrates an example of generating a new tracker when a split has occurred.

FIG. 6C illustrates an example of two bounding boxes being associated with one tracker.

FIG. 7C illustrates an example where a parent tracker, which is associated with a hidden tracker, merges with another tracker.

FIG. 7E illustrates an example of merged trackers.

FIG. 9A illustrates an example where two bounding boxes are both associated with a parent tracker.

FIG. 10C and FIG. 10D illustrate examples of ambiguous matchings.

DETAILED DESCRIPTION

Figure 1:
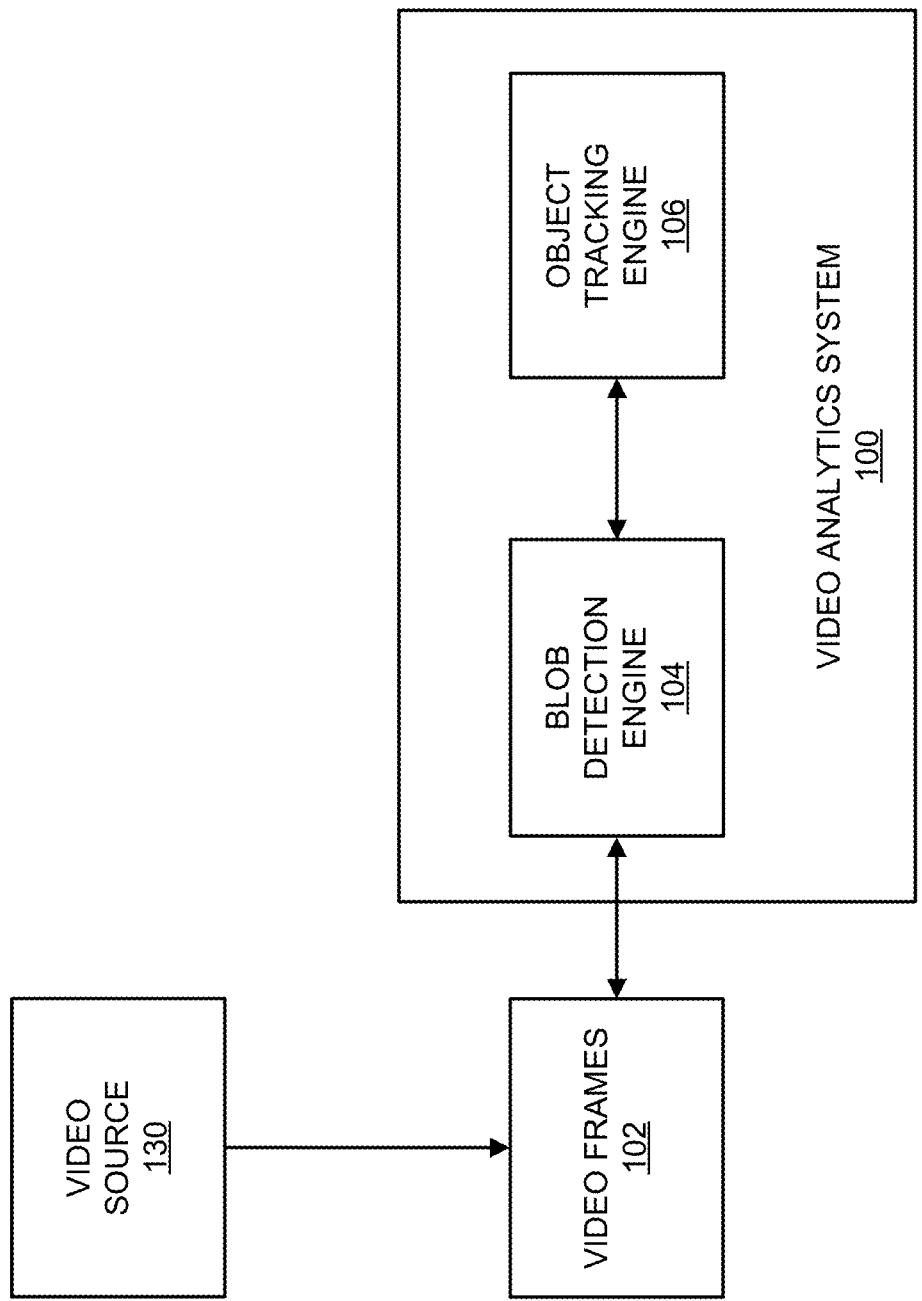
FIG. 1 is a block diagram illustrating an example of a system including a video source and a video analytics system, in accordance with some embodiments.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

A video analytics system can obtain a video sequence from a video source and can process the video sequence to provide a variety of tasks. One example of a video source can include an Internet protocol camera (IP camera), or other video capture device. An IP camera is a type of digital video camera that can be used for surveillance, home security, or other suitable application. Unlike analog closed circuit television (CCTV) cameras, an IP camera can send and receive data via a computer network and the Internet. In some instances, one or more IP cameras can be located in a scene or an environment, and can remain static while capturing video sequences of the scene or environment.

An IP camera can be used to send and receive data via a computer network and the Internet. In some cases, IP camera systems can be used for two-way communications. For example, data (e.g., audio, video, metadata, or the like) can be transmitted by an IP camera using one or more network cables or using a wireless network, allowing users to communicate with what they are seeing. In one illustrative example, a gas station clerk can assist a customer with how to use a pay pump using video data provided from an IP camera (e.g., by viewing the customer's actions at the pay pump). Commands can also be transmitted for pan, tilt, zoom (PTZ) cameras via a single network or multiple networks. Furthermore, IP camera systems provide flexibility and wireless capabilities. For example, IP cameras provide for easy connection to a network, adjustable camera location, and remote accessibility to the service over Internet. IP camera systems also provide for distributed intelligence. For example, with IP cameras, video analytics can be placed in the camera itself. Encryption and authentication is also easily provided with IP cameras. For instance, IP cameras offer secure data transmission through already defined encryption and authentication methods for IP based applications. Even further, labor cost efficiency is increased with IP cameras. For example, video analytics can produce alarms for certain events, which reduces the labor cost in monitoring all cameras (based on the alarms) in a system.

Video analytics provides a variety of tasks ranging from immediate detection of events of interest, to analysis of pre-recorded video for the purpose of extracting events in a long period of time, as well as many other tasks. Various research studies and real-life experiences indicate that in a surveillance system, for example, a human operator typically cannot remain alert and attentive for more than 20 minutes, even when monitoring the pictures from one camera. When there are two or more cameras to monitor or as time goes beyond a certain period of time (e.g., 20 minutes), the operator's ability to monitor the video and effectively respond to events is significantly compromised. Video analytics can automatically analyze the video sequences from the cameras and send alarms for events of interest. This way, the human operator can monitor one or more scenes in a passive mode. Furthermore, video analytics can analyze a huge volume of recorded video and can extract specific video segments containing an event of interest.

Video analytics also provides various other features. For example, video analytics can operate as an Intelligent Video Motion Detector by detecting moving objects and by tracking moving objects. In some cases, the video analytics can generate and display a bounding box around a valid object. Video analytics can also act as an intrusion detector, a video counter (e.g., by counting people, objects, vehicles, or the like), a camera tamper detector, an object left detector, an object/asset removal detector, an asset protector, a loitering detector, and/or as a slip and fall detector. Video analytics can further be used to perform various types of recognition functions, such as face detection and recognition, license plate recognition, object recognition (e.g., bags, logos, body marks, or the like), or other recognition functions. In some cases, video analytics can be trained to recognize certain objects. Another function that can be performed by video analytics includes providing demographics for customer metrics (e.g., customer counts, gender, age, amount of time spent, and other suitable metrics). Video analytics can also perform video search (e.g., extracting basic activity for a given region) and video summary (e.g., extraction of the key movements). In some instances, event detection can be performed by video analytics, including detection of fire, smoke, fighting, crowd formation, or any other suitable even the video analytics is programmed to or learns to detect. A detector can trigger the detection of an event of interest and sends an alert or alarm to a central control room to alert a user of the event of interest.

Object tracking in video analytics, as discussed further below, generally involves the identification of moving objects in a scene and maintain historical data—that is, a tracker—for each moving object. As discussed above, a moving object may be identified from a blob of pixels in a current frame, and may be described by a bounding box. For each current frame, a video analytics system can match or associate a tracker with the bounding box for each blob, where a tracker can provide the location of a particular blob in previous frames.

Objects moving in a scene, however, can have intersecting, adjacent, or diverging paths, complicating the task of associating trackers with bounding boxes. Specifically, in one example, in a given frame, one tracker may be found to be associated with two or more bounding boxes. This situation may occur when one blob splits into two or more blobs, as may happen when, for example, two people walking close together (which may be detected as one blob) start walking in different directions (thus being detected as two blobs). In another example, several trackers may be found to be associated with one bounding box. This may occur when two or more blobs merge together into one blob, which may happen when, for example, two people in a scene move close together and are detected as one blob.

Objects can also move into and out of a scene. For example, in a given frame, an entirely new blob may be found because, for example, a person has newly walked into the scene. When a new blob is detected in a frame, a new tracker may be required. As another example, an person may walk out of a scene, and thus no longer be visible in a particular frame. When an object leaves the scene, its tracker may be found to not be associated with a bounding box, and thus may be "lost." In yet another example, a given frame may include both a new object and a lost tracker, where the tracker is lost because the bounding box that it was associated with is no longer in the frame. In such an example, the lost tracker should not be associated with the new object, and should remain lost. Instead, a new tracker should be generated for the new object.

In various implementations, a video content analysis system may include a multi-to-multi matching process, configured to identify splitting and merging of blobs, as well as new blobs and blobs that have exited the scene. In the multi-to-multi matching process, one-to-one matching between bounding boxes and trackers is not required. Additionally, unmatched bounding boxes and unmatched trackers are allowed. Furthermore, a cost function (e.g., a distance between a bounding box and a tracker) may be provided, to assist the video content analysis system in matching bounding boxes with the correct trackers.

FIG. 1 is a block diagram illustrating an example of a video analytics system 100. The video analytics system 100 receives video frames 102 from a video source 130. The video frames 102 can also be referred to herein as a video picture or a picture. The video frames 102 can be part of one or more video sequences. The video source 130 can include a video capture device (e.g., a video camera, a camera phone, a video phone, or other suitable capture device), a video storage device, a video archive containing stored video, a video server or content provider providing video data, a video feed interface receiving video from a video server or content provider, a computer graphics system for generating computer graphics video data, a combination of such sources, or other source of video content. In one example, the video source 130 can include an IP camera or multiple IP cameras. In an illustrative example, multiple IP cameras can be located throughout an environment, and can provide the video frames 102 to the video analytics system 100. For instance, the IP cameras can be placed at various fields of view within the environment so that surveillance can be performed based on the captured video frames 102 of the environment.

In some embodiments, the video analytics system 100 and the video source 130 can be part of the same computing device. In some embodiments, the video analytics system 100 and the video source 130 can be part of separate computing devices. In some examples, the computing device (or devices) can include one or more wireless transceivers for wireless communications. The computing device (or devices) can include an electronic device, such as a camera (e.g., an IP camera or other video camera, a camera phone, a video phone, or other suitable capture device), a mobile or stationary telephone handset (e.g., smartphone, cellular telephone, or the like), a desktop computer, a laptop or notebook computer, a tablet computer, a set-top box, a television, a display device, a digital media player, a video gaming console, a video streaming device, or any other suitable electronic device.

The video analytics system 100 includes a blob detection engine 104 and an object tracking engine 106. Object detection and tracking allows the video analytics system 100 to provide various end-to-end features, such as the video analytics features described above. For example, intelligent motion detection, intrusion detection, and other features can directly use the results from object detection and tracking to generate end-to-end events. Other features, such as people, vehicle, or other object counting and classification can be greatly simplified based on the results of object detection and tracking. The blob detection engine 104 can detect one or more blobs in video frames (e.g., video frames 102) of a video sequence, and the object tracking engine 106 can track the one or more blobs across the frames of the video sequence. As used herein, a blob refers to pixels of at least a portion of an object in a video frame. For example, a blob can include a contiguous group of pixels making up at least a portion of a foreground object in a video frame. In another example, a blob can refer to a contiguous group of pixels making up at least a portion of a background object in a frame of image data. A blob can also be referred to as an object, a portion of an object, a blotch of pixels, a pixel patch, a cluster of pixels, a blot of pixels, a spot of pixels, a mass of pixels, or any other term referring to a group of pixels of an object or portion thereof. In some examples, a bounding box can be associated with a blob. In some examples, a tracker can also be represented by a tracker bounding box. In the tracking layer, in case there is no need to know how the blob is formulated within a bounding box, the term blob and bounding box may be used interchangeably.

As described in more detail below, blobs can be tracked using blob trackers. A blob tracker can be associated with a tracker bounding box. In some examples, a bounding box for a blob tracker in a current frame can be the bounding box of a previous blob in a previous frame for which the blob tracker was associated. For instance, when the blob tracker is updated in the previous frame (after being associated with the previous blob in the previous frame), updated information for the blob tracker can include the tracking information for the previous frame and also prediction of a location of the blob tracker in the next frame (which is the current frame in this example). The prediction of the location of the blob tracker in the current frame can be based on the location of the blob in the previous frame. A history or motion model can be maintained for a blob tracker, including a history of various states, a history of the velocity, and a history of location, of continuous frames, for the blob tracker, as described in more detail below In some examples, a motion model for a blob tracker can determine and maintain two locations of the blob tracker for each frame. For example, a first location for a blob tracker for a current frame can include a predicted location in the current frame. The first location is referred to herein as the predicted location. The predicted location of the blob tracker in the current frame includes a location in a previous frame of a blob with which the blob tracker was associated. Hence, the location of the blob associated with the blob tracker in the previous frame can be used as the predicted location of the blob tracker in the current frame. A second location for the blob tracker for the current frame can include a location in the current frame of a blob with which the tracker is associated in the current frame. The second location is referred to herein as the actual location. Accordingly, the location in the current frame of a blob associated with the blob tracker is used as the actual location of the blob tracker in the current frame. The actual location of the blob tracker in the current frame can be used as the predicted location of the blob tracker in a next frame. The location of the blobs can include the locations of the bounding boxes of the blobs.

The velocity of a blob tracker can include the displacement of a blob tracker between consecutive frames. For example, the displacement can be determined between the centers (or centroids) of two bounding boxes for the blob tracker in two consecutive frames. In one illustrative example, the velocity of a blob tracker can be defined as $V_t = C_t - C_{t-1}$, where $C_t - C_{t-1} = (C_{tx} - C_{t-1x}, C_{ty} - C_{t-1y})$. The term $C_t(C_{tx}, C_{ty})$ denotes the center position of a bounding box of the tracker in a current frame, with $C_{tx}$ being the x-coordinate of the bounding box, and $C_{ty}$ being the y-coordinate of the bounding box. The term $C_{t-1}(C_{t-1x}, C_{t-1y})$ denotes the center position (x and y) of a bounding box of the tracker in a previous frame. In some implementations, it is also possible to use four parameters to estimate x, y, width, height at the same time. In some cases, because the timing for video frame data is constant or at least not dramatically different overtime (according to the frame rate, such as 30 frames per second, 60 frames per second, 120 frames per second, or other suitable frame rate), a time variable may not be needed in the velocity calculation. In some cases, a time constant can be used (according to the instant frame rate) and/or a timestamp can be used.

Using the blob detection engine 104 and the object tracking engine 106, the video analytics system 100 can perform blob generation and detection for each frame or picture of a video sequence. For example, the blob detection engine 104 can perform background subtraction for a frame, and can then detect foreground pixels in the frame. Foreground blobs are generated from the foreground pixels using morphology operations and spatial analysis. Further, blob trackers from previous frames need to be associated with the foreground blobs in a current frame, and also need to be updated. Both the data association of trackers with blobs and tracker updates can rely on a cost function calculation. For example, when blobs are detected from a current input video frame, the blob trackers from the previous frame can be associated with the detected blobs according to a cost calculation. Trackers are then updated according to the data association, including updating the state and location of the trackers so that tracking of objects in the current frame can be fulfilled. Further details related to the blob detection engine 104 and the object tracking engine 106 are described with respect to FIGS. 3-4.

Figure 2:
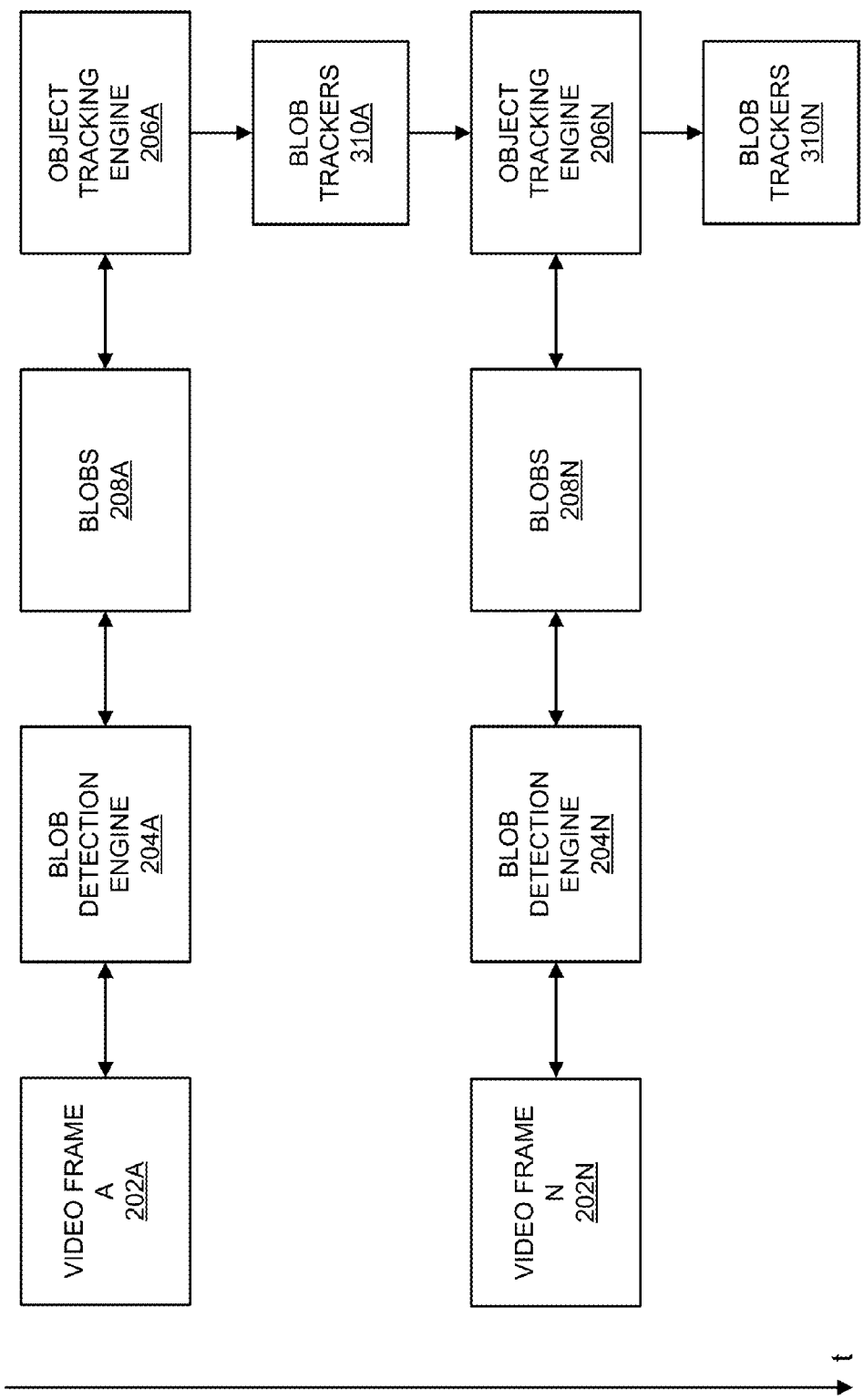
FIG. 2 is an example of a video analytics system processing video frames, in accordance with some embodiments.

FIG. 2 is an example of the video analytics system (e.g., video analytics system 100) processing video frames across time t. As shown in FIG. 2, a video frame A 202A is received by a blob detection engine 204A. The blob detection engine 204A generates foreground blobs 208A for the current frame A 202A. After blob detection is performed, the foreground blobs 208A can be used for temporal tracking by the object tracking engine 206A. Costs (e.g., a cost including a distance, a weighted distance, or other cost) between blob trackers and blobs can be calculated by the object tracking engine 206A. The object tracking engine 206A can perform data association to associate or match the blob trackers (e.g., blob trackers generated or updated based on a previous frame or newly generated blob trackers) and blobs 208A using the calculated costs (e.g., using a cost matrix or other suitable association technique). The blob trackers can be updated, including in terms of positions of the trackers, according to the data association to generate updated blob trackers 310A. For example, a blob tracker's state and location for the video frame A 202A can be calculated and updated. The blob tracker's location in a next video frame N 202N can also be predicted from the current video frame A 202A. For example, the predicted location of a blob tracker for the next video frame N 202N can include the location of the blob tracker (and its associated blob) in the current video frame A 202A. Tracking of blobs of the current frame A 202A can be performed once the updated blob trackers 310A are generated.

When a next video frame N 202N is received, the blob detection engine 204N generates foreground blobs 208N for the frame N 202N. The object tracking engine 206N can then perform temporal tracking of the blobs 208N. For example, the object tracking engine 206N obtains the blob trackers 310A that were updated based on the prior video frame A 202A. The object tracking engine 206N can then calculate a cost and can associate the blob trackers 310A and the blobs 208N using the newly calculated cost. The blob trackers 310A can be updated according to the data association to generate updated blob trackers 310N.

Figure 3:
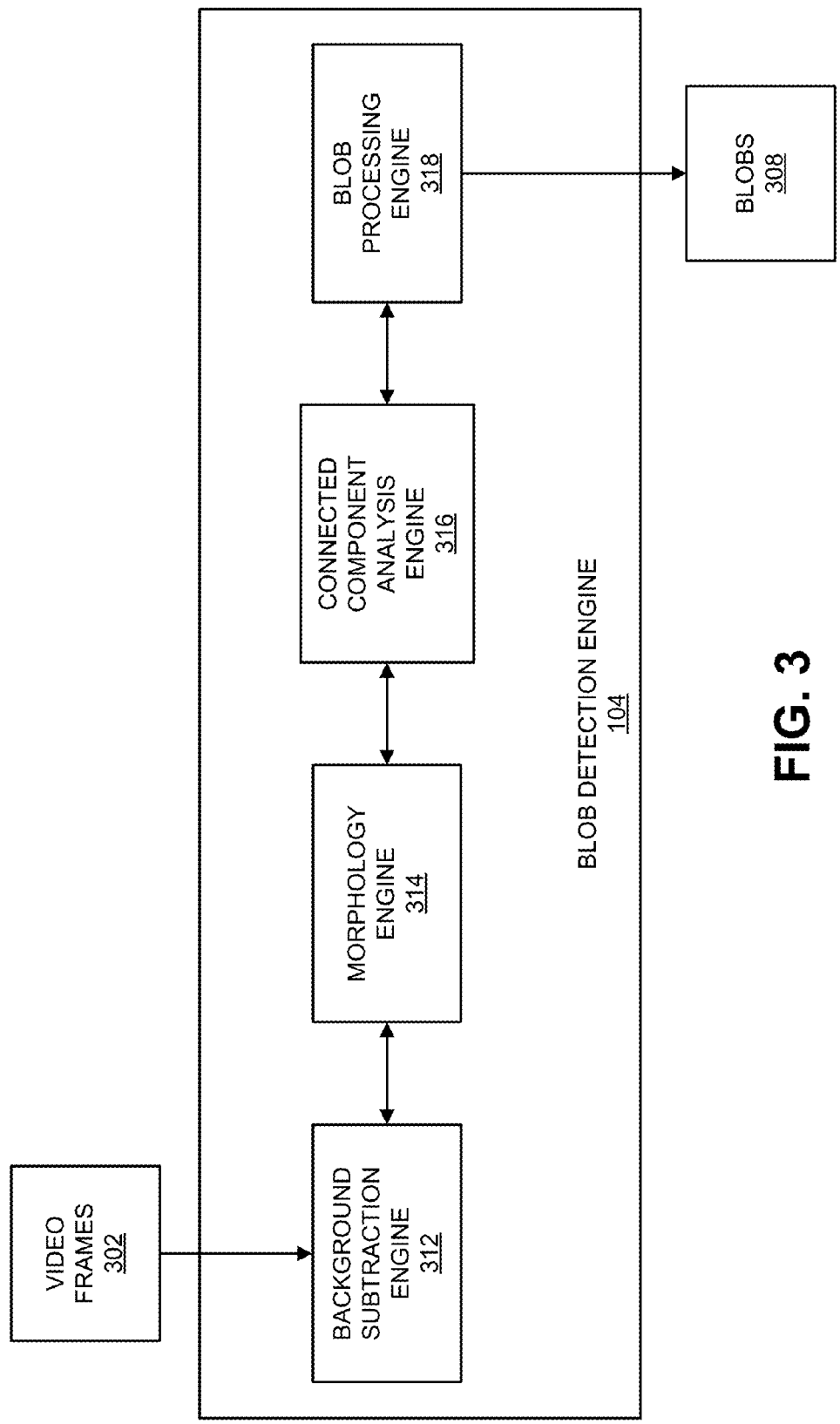
FIG. 3 is a block diagram illustrating an example of a blob detection engine, in accordance with some embodiments.

FIG. 3 is a block diagram illustrating an example of a blob detection engine 104. Blob detection is used to segment moving objects from the global background in a scene. The blob detection engine 104 includes a background subtraction engine 312 that receives video frames 302. The background subtraction engine 312 can perform background subtraction to detect foreground pixels in one or more of the video frames 302. For example, the background subtraction can be used to segment moving objects from the global background in a video sequence and to generate a foreground-background binary mask (referred to herein as a foreground mask). In some examples, the background subtraction can perform a subtraction between a current frame or picture and a background model including the background part of a scene (e.g., the static or mostly static part of the scene). Based on the results of background subtraction, the morphology engine 314 and connected component analysis engine 316 can perform foreground pixel processing to group the foreground pixels into foreground blobs for tracking purpose. For example, after background subtraction, morphology operations can be applied to remove noisy pixels as well as to smooth the foreground mask. Connected component analysis can then be applied to generate the blobs. Blob processing can then be performed, which may include further filtering out some blobs and merging together some blobs to provide bounding boxes as input for tracking.

The background subtraction engine 312 can model the background of a scene (e.g., captured in the video sequence) using any suitable background subtraction technique (also referred to as background extraction). One example of a background subtraction method used by the background subtraction engine 312 includes modeling the background of the scene as a statistical model based on the relatively static pixels in previous frames which are not considered to belong to any moving region. For example, the background subtraction engine 312 can use a Gaussian distribution model for each pixel location, with parameters of mean and variance to model each pixel location in frames of a video sequence. All the values of previous pixels at a particular pixel location are used to calculate the mean and variance of the target Gaussian model for the pixel location. When a pixel at a given location in a new video frame is processed, its value will be evaluated by the current Gaussian distribution of this pixel location. A classification of the pixel to either a foreground pixel or a background pixel is done by comparing the difference between the pixel value and the mean of the designated Gaussian model. In one illustrative example, if the distance of the pixel value and the Gaussian Mean is less than 3 times of the variance, the pixel is classified as a background pixel. Otherwise, in this illustrative example, the pixel is classified as a foreground pixel. At the same time, the Gaussian model for a pixel location will be updated by taking into consideration the current pixel value.

The background subtraction engine 312 can also perform background subtraction using a mixture of Gaussians (GMM). A GMM models each pixel as a mixture of Gaussians and uses an online learning algorithm to update the model. Each Gaussian model is represented with mean, standard deviation (or covariance matrix if the pixel has multiple channels), and weight. Weight represents the probability that the Gaussian occurs in the past history.

$$P(X_t) = \sum_{i=1}^{K} \omega_{i,t} N(X_t | \mu_{i,t}, \Sigma_{i,t})$$ Equation (1)

An equation of the GMM model is shown in equation (1), wherein there are K Gaussian models. Each Guassian model has a distribution with a mean of $\mu$ and variance of $\Sigma$, and has a weight $\omega$. Here, i is the index to the Gaussian model and t is the time instance. As shown by the equation, the parameters of the GMM change over time after one frame (at time t) is processed.

The background subtraction techniques mentioned above are based on the assumption that the camera is mounted still, and if anytime the camera is moved or orientation of the camera is changed, a new background model will need to be calculated. There are also background subtraction methods that can handle foreground subtraction based on a moving background, including techniques such as tracking key points, optical flow, saliency, and other motion estimation based approaches.

The background subtraction engine 312 can generate a foreground mask with foreground pixels based on the result of background subtraction. For example, the foreground mask can include a binary image containing the pixels making up the foreground objects (e.g., moving objects) in a scene and the pixels of the background. In some examples, the background of the foreground mask (background pixels) can be a solid color, such as a solid white background, a solid black background, or other solid color. In such examples, the foreground pixels of the foreground mask can be a different color than that used for the background pixels, such as a solid black color, a solid white color, or other solid color. In one illustrative example, the background pixels can be black (e.g., pixel color value 0 in 8-bit grayscale or other suitable value) and the foreground pixels can be white (e.g., pixel color value 255 in 8-bit grayscale or other suitable value). In another illustrative example, the background pixels can be white and the foreground pixels can be black.

Using the foreground mask generated from background subtraction, a morphology engine 314 can perform morphology functions to filter the foreground pixels. The morphology functions can include erosion and dilation functions. In one example, an erosion function can be applied, followed by a series of one or more dilation functions. An erosion function can be applied to remove pixels on object boundaries. For example, the morphology engine 314 can apply an erosion function (e.g., FilterErode3×3) to a 3×3 filter window of a center pixel, which is currently being processed. The 3×3 window can be applied to each foreground pixel (as the center pixel) in the foreground mask. One of ordinary skill in the art will appreciate that other window sizes can be used other than a 3×3 window. The erosion function can include an erosion operation that sets a current foreground pixel in the foreground mask (acting as the center pixel) to a background pixel if one or more of its neighboring pixels within the 3×3 window are background pixels. Such an erosion operation can be referred to as a strong erosion operation or a single-neighbor erosion operation. Here, the neighboring pixels of the current center pixel include the eight pixels in the 3×3 window, with the ninth pixel being the current center pixel.

A dilation operation can be used to enhance the boundary of a foreground object. For example, the morphology engine 314 can apply a dilation function (e.g., FilterDilate3×3) to a 3×3 filter window of a center pixel. The 3×3 dilation window can be applied to each background pixel (as the center pixel) in the foreground mask. One of ordinary skill in the art will appreciate that other window sizes can be used other than a 3×3 window. The dilation function can include a dilation operation that sets a current background pixel in the foreground mask (acting as the center pixel) as a foreground pixel if one or more of its neighboring pixels in the 3×3 window are foreground pixels. The neighboring pixels of the current center pixel include the eight pixels in the 3×3 window, with the ninth pixel being the current center pixel. In some examples, multiple dilation functions can be applied after an erosion function is applied. In one illustrative example, three function calls of dilation of 3×3 window size can be applied to the foreground mask before it is sent to the connected component analysis engine 316. In some examples, an erosion function can be applied first to remove noise pixels, and a series of dilation functions can then be applied to refine the foreground pixels. In one illustrative example, one erosion function with 3×3 window size is called first, and three function calls of dilation of 3×3 window size are applied to the foreground mask before it is sent to the connected component analysis engine 316. Details regarding content-adaptive morphology operations are described below.

After the morphology operations are performed, the connected component analysis engine 316 can apply connected component analysis to connect neighboring foreground pixels to formulate connected components and blobs. One example of the connected component analysis performed by the connected component analysis engine 316 is implemented as follows:

--- for each pixel of the foreground mask {
-if it is a foreground pixel and has not been processed, the following steps apply:
   -Apply FloodFill function to connect this pixel to other foreground and generate a connected component
   -Insert the connected component in a list of connected components.
   -Mark the pixels in the connected component as being processed. }

---

The Floodfill (seed fill) function is an algorithm that determines the area connected to a seed node in a multi-dimensional array (e.g., a 2-D image in this case). This Floodfill function first obtains the color or intensity value at the seed position (e.g., a foreground pixel) of the source foreground mask, and then finds all the neighbor pixels that have the same (or similar) value based on 4 or 8 connectivity. For example, in a 4 connectivity case, a current pixel's neighbors are defined as those with a coordination being (x+d, y) or (x, y+d), wherein d is equal to 1 or −1 and (x, y) is the current pixel. One of ordinary skill in the art will appreciate that other amounts of connectivity can be used. Some objects are separated into different connected components and some objects are grouped into the same connected components (e.g., neighbor pixels with the same or similar values). Additional processing may be applied to further process the connected components for grouping. Finally, the blobs 308 are generated that include neighboring foreground pixels according to the connected components. In one example, a blob can be made up of one connected component. In another example, a blob can include multiple connected components (e.g., when two or more blobs are merged together).

The blob processing engine 318 can perform additional processing to further process the blobs generated by the connected component analysis engine 316. In some examples, the blob processing engine 318 can generate the bounding boxes to represent the detected blobs and blob trackers. In some cases, the blob bounding boxes can be output from the blob detection engine 104. In some examples, the blob processing engine 318 can perform content-based filtering of certain blobs. For instance, a machine learning method can determine that a current blob contains noise (e.g., foliage in a scene). Using the machine learning information, the blob processing engine 318 can determine the current blob is a noisy blob and can remove it from the resulting blobs that are provided to the object tracking engine 106. In some examples, the blob processing engine 318 can merge close blobs into one big blob to remove the risk of having too many small blobs that could belong to one object. In some examples, the blob processing engine 318 can filter out one or more small blobs that are below a certain size threshold (e.g., an area of a bounding box surrounding a blob is below an area threshold). In some embodiments, the blob detection engine 104 does not include the blob processing engine 318, or does not use the blob processing engine 318 in some instances. For example, the blobs generated by the connected component analysis engine 316, without further processing, can be input to the object tracking engine 106 to perform blob and/or object tracking.

Figure 4:
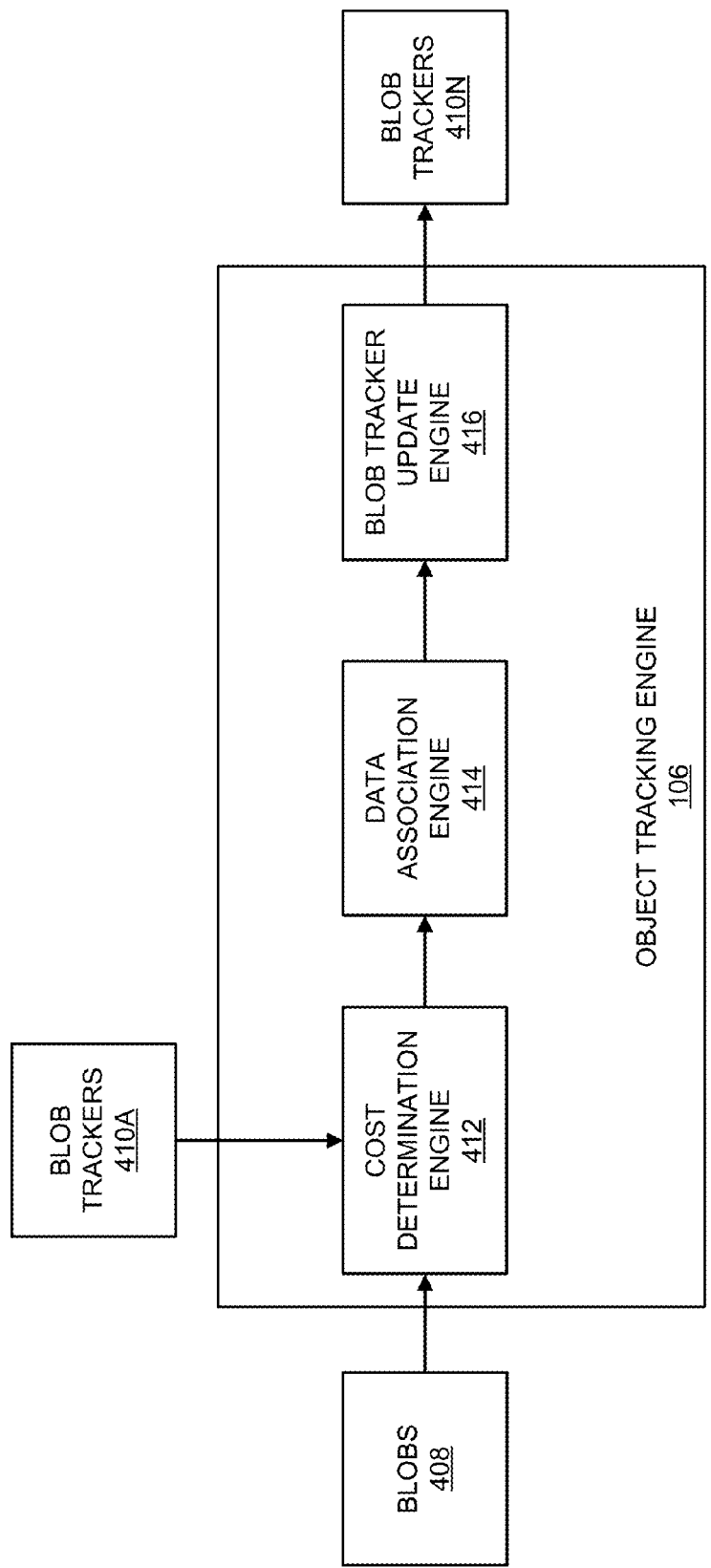
FIG. 4 is a block diagram illustrating an example of an object tracking engine, in accordance with some embodiments.

FIG. 4 is a block diagram illustrating an example of an object tracking engine 106. Object tracking in a video sequence can be used for many applications, including surveillance applications, among many others. For example, the ability to detect and track multiple objects in the same scene is of great interest in many security applications. When blobs (making up at least portions of objects) are detected from an input video frame, blob trackers from the previous video frame need to be associated to the blobs in the input video frame according to a cost calculation. The blob trackers can be updated based on the associated foreground blobs. In some instances, the steps in object tracking can be conducted in a series manner.

A cost determination engine 412 of the object tracking engine 106 can obtain the blobs 408 of a current video frame from the blob detection engine 104. The cost determination engine 412 can also obtain the blob trackers 410A updated from the previous video frame (e.g., video frame A 202A). A cost function can then be used to calculate costs between the object trackers 410A and the blobs 408. Any suitable cost function can be used to calculate the costs. In some examples, the cost determination engine 412 can measure the cost between a blob tracker and a blob by calculating the Euclidean distance between the centroid of the tracker (e.g., the bounding box for the tracker) and the centroid of the bounding box of the foreground blob. In one illustrative example using a 2-D video sequence, this type of cost function is calculated as below:

$$Cost_{tb} = \sqrt{(t_x-b_x)^2+(t_y-b_y)^2}$$

The terms $(t_x,t_y)$ and $(b_x,b_y)$ are the center locations of the blob tracker and blob bounding boxes, respectively. As noted herein, in some examples, the bounding box of the blob tracker can be the bounding box of a blob associated with the blob tracker in a previous frame. In some examples, other cost function approaches can be performed that use a minimum distance in an x-direction or y-direction to calculate the cost. Such techniques can be good for certain controlled scenarios, such as well-aligned lane conveying. In some examples, a cost function can be based on a distance of a blob tracker and a blob, where instead of using the center position of the bounding boxes of blob and tracker to calculate distance, the boundaries of the bounding boxes are considered so that a negative distance is introduced when two bounding boxes are overlapped geometrically. In addition, the value of such a distance is further adjusted according to the size ratio of the two associated bounding boxes. For example, a cost can be weighted based on a ratio between the area of the blob tracker bounding box and the area of the blob bounding box (e.g., by multiplying the determined distance by the ratio).

In some embodiments, a cost is determined for each tracker-blob pair between each tracker and each blob. For example, if there are three trackers, including tracker A, tracker B, and tracker C, and three blobs, including blob A, blob B, and blob C, a separate cost between tracker A and each of the blobs A, B, and C can be determined, as well as separate costs between trackers B and C and each of the blobs A, B, and C. In some examples, the costs can be arranged in a cost matrix, which can be used for data association. For example, the cost matrix can be a 2-dimensional matrix, with one dimension being the blob trackers 410A and the second dimension being the blobs 408. Every tracker-blob pair or combination between the trackers 410A and the blobs 408 includes a cost that is included in the cost matrix. Best matches between the trackers 410A and blobs 408 can be determined by identifying the lowest cost tracker-blob pairs in the matrix. For example, the lowest cost between tracker A and the blobs A, B, and C is used to determine the blob with which to associate the tracker A.

Data association between trackers 410A and blobs 408, as well as updating of the trackers 410A, may be based on the determined costs. The data association engine 414 matches or assigns a tracker with a corresponding blob and vice versa. For example, as described previously, the lowest cost tracker-blob pairs may be used by the data association engine 414 to associate the blob trackers 410A with the blobs 408. Another technique for associating blob trackers with blobs includes the Hungarian method, which is a combinatorial optimization algorithm that solves such an assignment problem in polynomial time and that anticipated later primal-dual methods. For example, the Hungarian method can optimize a global cost across all blob trackers 410A with the blobs 408 in order to minimize the global cost. The blob tracker-blob combinations in the cost matrix that minimize the global cost can be determined and used as the association.

In addition to the Hungarian method, other robust methods can be used to perform data association between blobs and blob trackers. For example, the association problem can be solved with additional constraints to make the solution more robust to noise while matching as many trackers and blobs as possible.

Regardless of the association technique that is used, the data association engine 414 can rely on the distance between the blobs and trackers. The location of the foreground blobs are identified with the blob detection engine 104. However, a blob tracker location in a current frame may need to be predicted from a previous frame (e.g., using a location of a blob associated with the blob tracker in the previous frame). The calculated distance between the identified blobs and estimated trackers is used for data association. After the data association for the current frame, the tracker location in the current frame can be identified with the location of its associated blob(s) in the current frame. The tracker's location can be further used to update the tracker's motion model and predict its location in the next frame.

Once the association between the blob trackers 410A and blobs 408 has been completed, the blob tracker update engine 416 can use the information of the associated blobs, as well as the trackers' temporal statuses, to update the states of the trackers 410A for the current frame. Upon updating the trackers 410A, the blob tracker update engine 416 can perform object tracking using the updated trackers 410N, and can also provide the update trackers 410N for use for a next frame.

The state of a blob tracker can include the tracker's identified location (or actual location) in a current frame and its predicted location in the next frame. The state can also, or alternatively, include a tracker's temporal status. The temporal status can include whether the tracker is a new tracker that was not present before the current frame, whether the tracker has been alive for certain frames, or other suitable temporal status. Other states can include, additionally or alternatively, whether the tracker is considered as lost when it does not associate with any foreground blob in the current frame, whether the tracker is considered as a dead tracker if it fails to associate with any blobs for a certain number of consecutive frames (e.g., 2 or more), or other suitable tracker states.

Other than the location of a tracker, there may be other status information needed for updating the tracker, which may require a state machine for object tracking. Given the information of the associated blob(s) and the tracker's own status history table, the status also needs to be updated. The state machine collects all the necessary information and updates the status accordingly. Various statuses can be updated. For example, other than a tracker's life status (e.g., new, lost, dead, or other suitable life status), the tracker's association confidence and relationship with other trackers can also be updated. Taking one example of the tracker relationship, when two objects (e.g., persons, vehicles, or other objects of interest) intersect, the two trackers associated with the two objects will be merged together for certain frames, and the merge or occlusion status needs to be recorded for high level video analytics.

One method for performing a tracker location update is using a Kalman filter. The Kalman filter is a framework that includes two steps. The first step is to predict a tracker's state, and the second step is to use measurements to correct or update the state. In this case, the tracker from the last frame predicts (using the blob tracker update engine 416) its location in the current frame, and when the current frame is received, the tracker first uses the measurement of the blob(s) to correct its location states and then predicts its location in the next frame. For example, a blob tracker can employ a Kalman filter to measure its trajectory as well as predict its future location(s). The Kalman filter relies on the measurement of the associated blob(s) to correct the motion model for the blob tracker and to predict the location of the object tracker in the next frame. In some examples, if a blob tracker is associated with a blob in a current frame, the location of the blob is directly used to correct the blob tracker's motion model in the Kalman filter. In some examples, if a blob tracker is not associated with any blob in a current frame, the blob tracker's location in the current frame is identified as its predicted location from the previous frame, meaning that the motion model for the blob tracker is not corrected and the prediction propagates with the blob tracker's last model (from the previous frame).

Regardless of the tracking method being used, a new tracker starts to be associated with a blob in one frame and, moving forward, the new tracker may be connected with possibly moving blobs across multiple frames. When a tracker has been continuously associated with blobs and a duration has passed, the tracker may be promoted to be a normal tracker and output as an identified tracker-blob pair. A tracker-blob pair is output at the system level as an event (e.g., presented as a tracked object on a display, output as an alert, or other suitable event) when the tracker is promoted to be a normal tracker. In some implementations, a normal tracker (e.g., including certain status data of the normal tracker, the motion model for the normal tracker, or other information related to the normal tracker) can be output as part of object metadata. The metadata, including the normal tracker, can be output from the video analytics system (e.g., an IP camera running the video analytics system) to a server or other system storage. The metadata can then be analyzed for event detection (e.g., by rule interpreter). A tracker that is not promoted as a normal tracker can be removed (or killed), after which the tracker can be considered as dead.

Various methods for matching blobs and trackers, such as the methods described above, may attempt as best as possible to pair up trackers and the bounding boxes for blobs. This may be the case regardless of whether the method seeks global optimization of matches or greedy matching.

Several issues may arise when matching trackers and bounding boxes. For example, a moving object found in frame F may have disappeared from the current frame F+1. In frame F, the object would have been described by a bounding box, and the bounding box would have been associated with a tracker. In the current frame F+1, this tracker should (in most cases) not be matched to any bounding box in the current frame F+1. In some cases, however, a new object may have appeared in the current frame F+1, and the tracker may instead be matched to the bounding box for the new object, particularly if the new object is close to the location of the tracker. In this example, a new tracker should have been generated for the new object, and the tracker for the object that is no longer in the scene should have been considered lost.

As another example, a sequence of frames may result in a set of trackers arranged in a line and spaced approximately equidistant from each other. A frame F may have a set of bounding boxes, with each bounding box being associated with a different one of the trackers. In this example, the leftmost bounding box may disappear from the current frame F+1 (due to the associated object moving off-screen), while a new bounding box may appear on the right side of the screen (due to a new object moving into view). In this scenario, it may occur that the trackers each match a bounding box, but that they each match an incorrect bounding box; that is, the trackers may each shift to a bounding box to the left. This result may occur particularly when the video content analysis system seeks to achieve one-to-one matching and global optimization. Instead, one tracker should have been lost (corresponding to the object moving off-screen) and a new tracker should have been generated (corresponding to the new object moving into view).

Another possible issue may occur when objects separate or merge. For example, a bounding box $S_i$ may split from a second bounding box, where the second bounding box was previously associated with a tracker $R_j$. In this example, the bounding box $S_i$ may be incorrectly associated with a tracker $R_k$ (which may be a lost tracker or a tracker for another bounding box). In this situation, the system should have generated and assigned a new tracker to the bounding box $S_i$. As another example, a frame F may include two bounding boxes that, in a current frame F+1, merge into a single bounding box $S_i$. In this example, the two bounding boxes had trackers $R_j$ and $R_{j+1}$ in frame F. In the current frame F+1, tracker $R_j$ may be associated with the merged bounding box $S_i$, while tracker $R_{j+1}$ is associated with a different, unrelated bounding box $S_i$ instead. In this example, it may be more appropriate to keep tracker $R_{j+1}$ associated with the merged bounding box.

Another scenario that a video content analysis system may encounter is two objects that merge and then separate. For example, two people walking in a scene, one associated with tracker $R_j$ and the other associated with tracker $R_{j+1}$, may initially be distinct, but may later walk so close to each other that they appear as one blob and one bounding box. In this example, the trackers $R_j$ and $R_{j+1}$ may be merged, resulting in one merged tracker. Later in the video sequence, the two people may separate and again be detectable as two distinct blobs. In this situation, maintaining only the merged tracker may not sufficiently describe what has occurred in the scene.

The scenarios described above, including new objects entering a scene, objects leaving a scene, objects splitting, and objects merging, may further occur in combination. For example, four objects may merge into one object and after a few seconds, the one object may split into three objects. Accurate tracking of these objects should indicate that a relationship exists between the three objects and the original four objects.

In various implementations, a video content analysis system can include multi-to-multi matching processes for matching trackers and bounding boxes for blobs. While implementations of the multi-to-multi matching processes are discussed below in the context of object tracking for video analytics, the multi-to-multi matching processes can also be applied wherever one set of items needs to be matched to a second set of items.

For purposes of describing multi-to-multi matching in the examples discussed below, trackers shall be designated using capital letter R and blobs or bounding boxes shall be designated using capital letter S. Additionally, a set of trackers 1 through N may be defined as $R=\{R_i|i=1, 2, \ldots, N\}$ and a set of bounding boxes 1 through L may be defined as $S=\{S_j|j=1, 2, \ldots, L\}$. A tracker and bounding box pair may thus be specified as $(R_i, S_j)$. The distance between a tracker and bounding box $(R_i, S_j)$ may be designated as $d_{ij}$. The distance between a tracker and bounding box may also be referred to as the cost function for a particular tracker and bounding box pair $(R_i, S_j)$.

Given these designations, a multi-to-multi matching process is described for matching trackers and bounding boxes to optimize a matching graph M defined as $M=(\overline{R},S)=(R',S')\cup(R^N,S'')$, wherein $S'\cup S''=S$, $S'\cap S''=\emptyset$, $R'\subset R$ and $R'\cap R^N=\emptyset$, and $\overline{R}=R'\cup R^N$. Using these denotations, a set of matching trackers and bounding boxes is designated as $(\overline{R}, S)=\{(R_i,S_j)|R_i\in \overline{R}$ and $S_j\in S\}$.

Optimization of the matching pairs can further be defined as $\mathrm{argmin}_{R_i\in S}d(R',S')-\lambda|S'|$, subject to $d(R_i,S_j)<T$, wherein $d(R',S')=\Sigma_{(R'_i,S'_j)\in R'}d(R'_i,S'_j)$.

Here the set $R^N$ can describe a set of one or more new trackers that may need to be created to be associated with a subset of bounding boxes S", where the subset S" can include bounding boxes for which no tracker has yet been generated. It should be noted that the cardinal of the matching set (R',S') can be higher than that of R' or S', such as when multi-to-multi matching happens for both trackers and bounding boxes within R' and S'. In various implementations, a greedy method may be applied to an optimization process.

FIG. 5A-FIG. 5J illustrate an example of matching trackers and bounding boxes according to a multi-to-multi matching process. In the following examples, a bounding box that is associated with only one tracker is referred to as a "unique bounding box" and a tracker that associated with only one bounding box is referred to as a "unique tracker." Also in these examples, a bounding box that is not associated with a tracker is referred to as an "unmatched bounding box" and a tracker that is not associated with a bounding box is referred to as an "unmatched tracker." Also in these examples, a bounding box that is associated with at least one existing tracker is referred to as a "matched bounding box" and a tracker that is associated with at least one bounding box is referred to as a "matched tracker." These designations are intended to provide clarity to the following discussion, and are not intended to define or limit the associated terms.

FIG. 5A-FIG. 5E illustrate an example of a video frame 500 where six blobs have been identified, and bounding boxes S1 501, S2 502, S3 503, S4 504, S5 505, and S6 506 have been defined for each of the six blob. Additionally, at least six trackers R1 511, R2 512, R3 513, R4 514, R5 515, and R6 516 are associated with the video frame 500, having been derived from at least six blobs detected in previous frames. As discussed further below, the video frame 500 may be associated with additional trackers, such as hidden trackers, which are not illustrated here.

Once bounding boxes have been defined for any blobs found in the frame 500, the video content analysis system matches bounding boxes with trackers, so that the tracking information can be updated. As provided in the examples of FIG. 5A-FIG. 5E, this matching process can involve multiple bounding boxes and multiple trackers. The video content analysis system can thus implement a multi-to-multi matching process for matching or associating bounding boxes and trackers with a high-degree of accuracy.

Figure 5A:
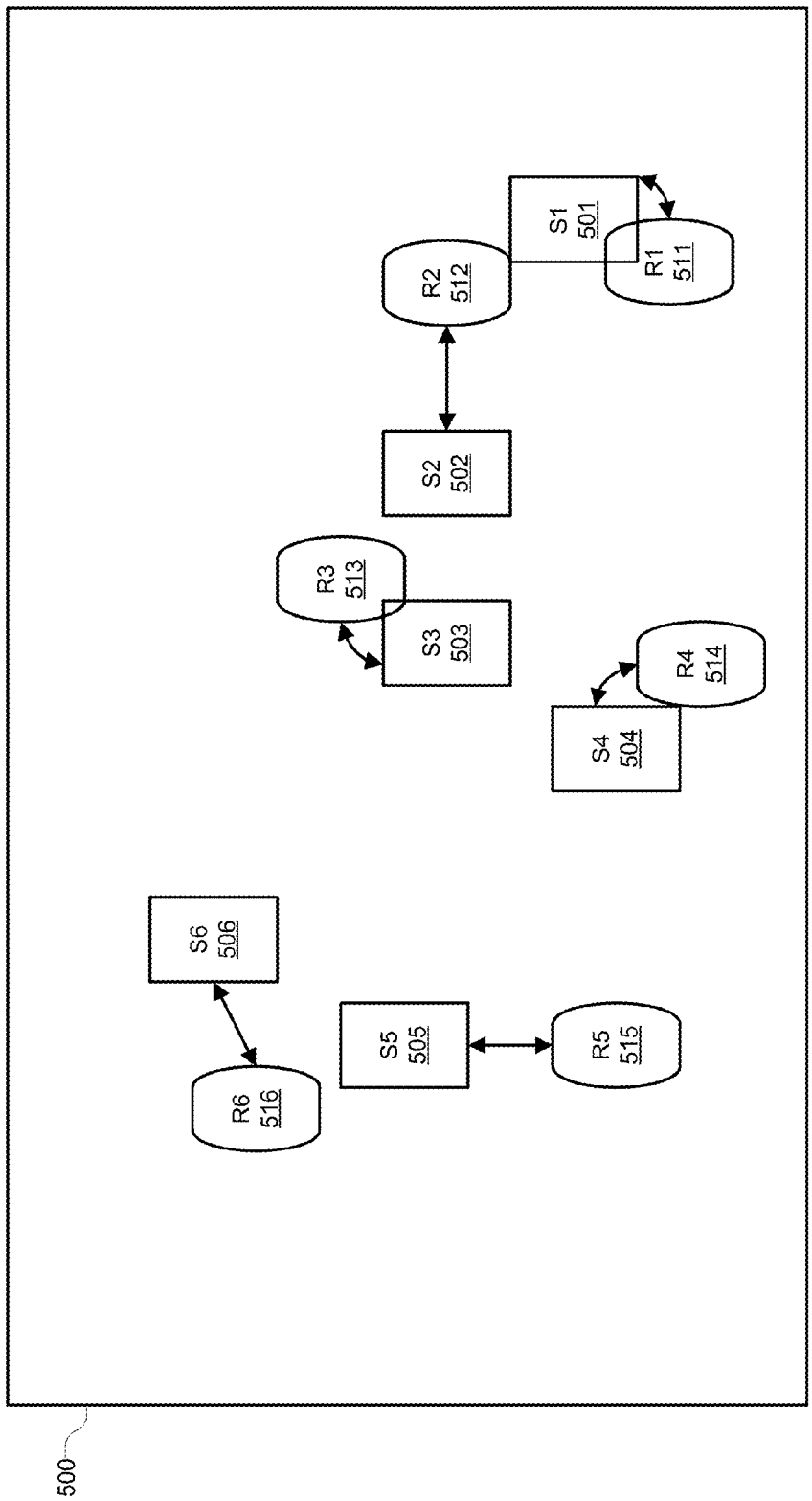

FIG. 5A illustrates an example of a first step (denoted as "step 1") in the multi-to-multi matching process. In FIG. 5A, the system attempts to match every bounding box and every tracker. In various implementations, bounding boxes and trackers may be matched based on their distance from one another. For example, each tracker may be matched to the nearest bounding box, unless the bounding box is closer to another tracker, in which case the next nearest bounding box is chosen. In the illustrated example, the step 1 in pairing the bounding boxes and trackers results in bounding box S1 501 being associated with tracker R1 511, bounding box S2 502 being associated with tracker R2 512, bounding box S3 503 being associated with tracker R3 513, bounding box S4 504 being associated with tracker R4 514, bounding box S5 505 being associated with tracker R5 515, and bounding box S6 506 being associated with tracker R6 516.

Various methods may be used to generate the associations illustrated in FIG. 5A. For example, a Hungarian method, as described above, may be used. Methods such as the Hungarian method seek optimization by obtaining one-to-one matching, and thus may associate a bounding box with a tracker that is farther than a distance $T_1$ away. The distance $T_1$ may be defined such that a tracker that is farther than $T_1$ from a bounding box is, more likely than not, a tracker for a different bounding box. Such associations may be removed.

Figure 5B:
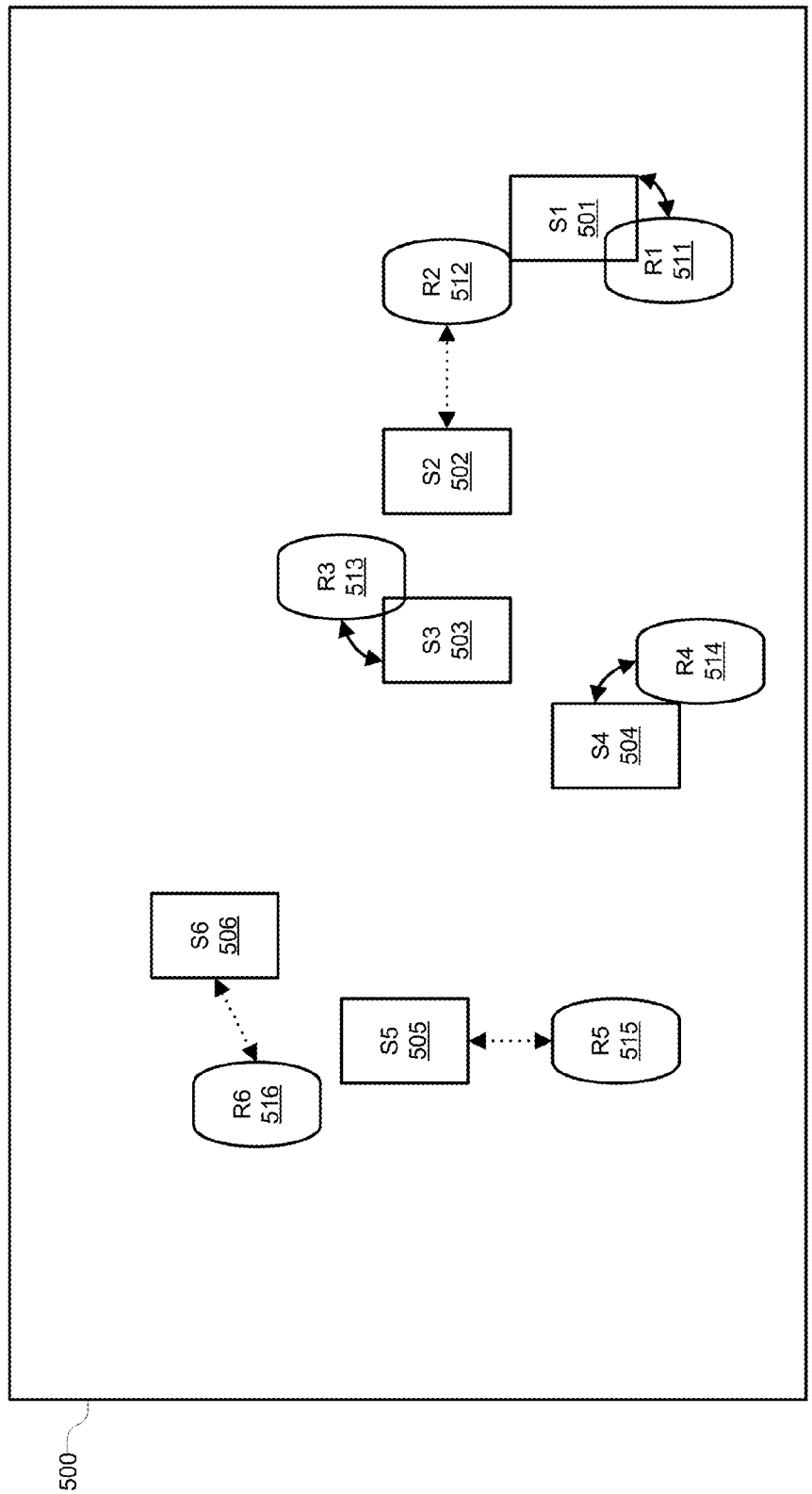

FIG. 5B illustrates an example of a second step (denoted as "step 2") in the multi-to-multi matching process. In FIG. 5B, any associations between trackers and bounding boxes, determined in step 1, where the distance between the tracker and the bounding box is greater than a threshold $T_1$ are removed. Stated another way, any matching $(R_i, S_j)$ with a distance $d(R_i, S_j)$ is removed if $d(R_i, S_j) > T_1$. For example, the distance between bounding box S2 502 and tracker R2 512 exceeds $T_1$, thus the association between bounding box S2 502 and tracker R2 512 is removed. As another example, the distance between bounding box S6 506 and tracker R6 516 is also too large, and is also removed. There may be situations in which, after step 1 illustrated in FIG. 5A, the distance between all bounding box and tracker pairs are below the threshold $T_1$, in which case no associations would be removed, unlike the example illustrated in FIG. 5B. Stated another way, the set that includes bounding box and tracker pairs where a bounding box is too far from its matched tracker can be an empty set.

Various methods can be used to determine the distance between a bounding box and a tracker. For example, in some implementations, the distance can be measured as the nearest distance between a tracker and a bounding box. As another example, in some implementations, the distance can be measured as the horizontal distance between the tracker and the bounding box, the vertical distance between the tracker and the bounding box, or a combination of the vertical and the horizontal distances. As another example, in some implementations, the distance can be measured from the center of each of the bounding box and the tracker. As another example, the distance can be based on the similarity of the pixels in the bounding box and the pixels in the tracker. As another example, the distance can be calculated in a feature set space representing the bounding box and the tracker.

In various implementations, the distance between a bounding box and an associated tracker can be defined using geometry information about the bounding box and the predicted location of the tracker. For example, in a frame F, a tracker may match a bounding box pBox. In a current frame F+1, prediction (resulting, for example, from a Kalman filter) may place the tracker at a location predBox. In the same frame F+1, bounding box pBox from the previous frame F may now have a location curBox. Thus, in this example, the distance between the bounding box and the tracker can be defined as the distance between curBox and predBox.

Figure 5C:
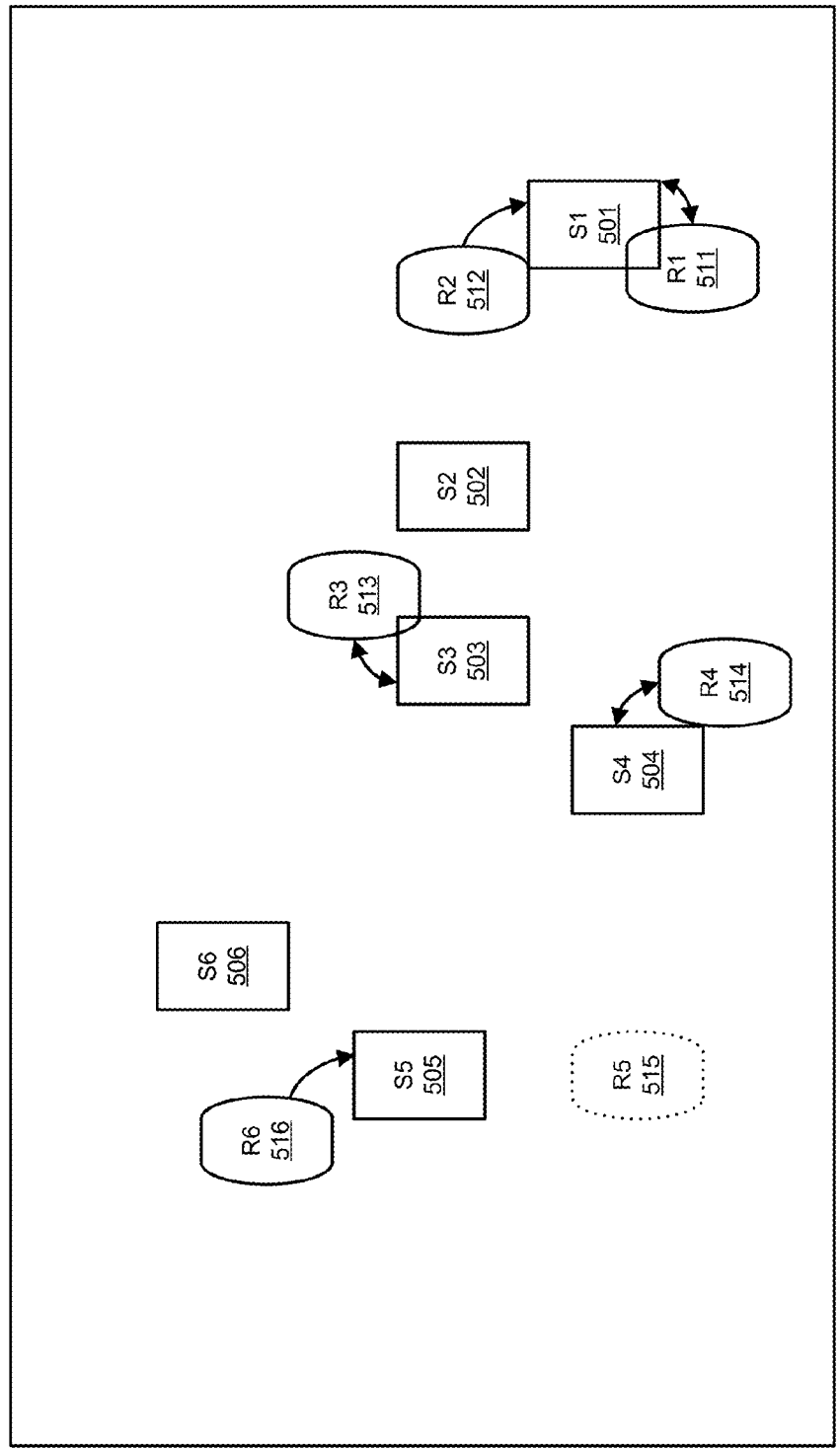

After step 1 and step 2, as described above, the frame 500 may still have unmatched trackers; that is, trackers that have not yet been associated with at least one bounding box. FIG. 5C illustrates an example of a third step (denoted as "step 3") in the multi-to-multi matching process, in which the system identifies any remaining unmatched trackers and attempts to match them with bounding boxes. In step 3, the system attempts to match unmatched trackers to bounding boxes that are within a distance $T_2$. In this step, multiple matches between trackers and bounding boxes are allowed. In the example of FIG. 5C, trackers R2 512, R5 515, and R6 516 remain unmatched after step 2. Unmatched tracker R2 512 is matched with bounding box S1 501, which is within distance $T_2$ to the tracker R2 512. Similarly, tracker R2 516 is matched with bounding box S5 505. After the step 3, there may still be unmatched trackers, such as tracker R5 515, for which no bounding box could be found that was near enough to the tracker R5 515. Unmatched trackers, at this point, may be considered lost, meaning the object that the tracker was tracking may have left the scene. Such an unmatched tracker may be assigned a lost state.

Figure 5D:
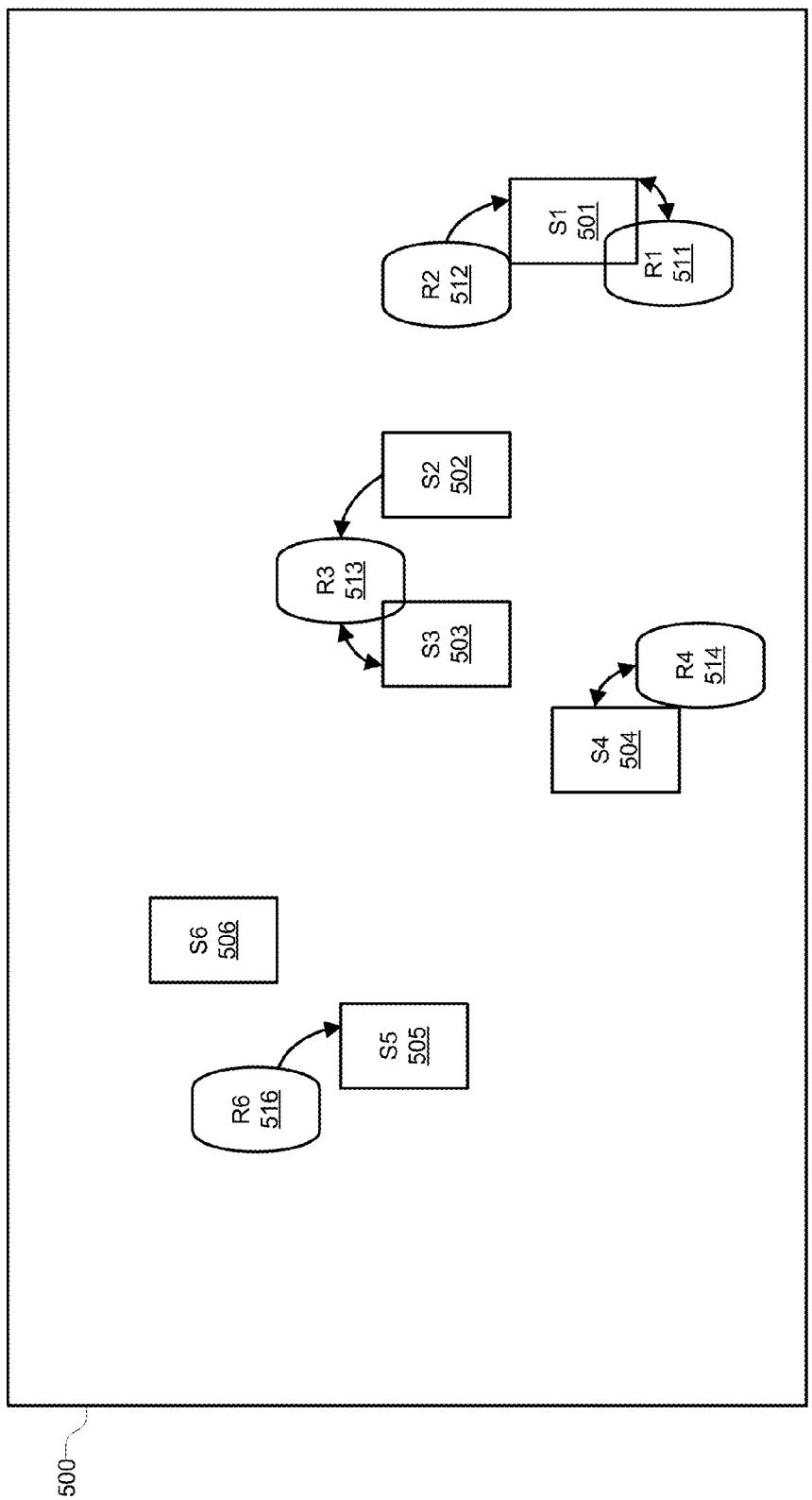

After step 3, as described above, the frame may still have unmatched bounding boxes. FIG. 5D illustrates an example of a fourth step (denoted as "step 4") in the multi-to-multi matching process, in which the system identifies any remaining unmatched bounding boxes and attempts to match them with trackers. In step 4, the system attempts, for each unmatched bounding box, to find a tracker that is within distance $T_3$ from the bounding box. Additionally, multiple matches between bounding boxes and trackers are allowed. In the example of FIG. 5D, bounding boxes S2 502 and S6 506 remain unmatched after step 2. For bounding box S2 502, tracker R3 513 is within distance $T_3$, thus tracker R3 513 is associated with bounding box S2 502. No tracker, however, is sufficiently close to S6 506, hence S6 506 remains unmatched.

FIG. 5F-FIG. 5J show another example of matching trackers and bounding boxes according to a multi-to-multi matching process. As illustrated in FIG. 5F, input trackers are shown with circles and input bounding boxes are shown with squares. Step 1 is shown in FIG. 5G with initial one-to-one matchings between trackers and bounding boxes being shown with a double arrow. FIG. 5H shows step 2, where certain matchings or associations between blob trackers and bounding boxes are removed. For example, there is an initial matching status, which is a subset of one-to-one matchings. In some examples, the initial matching satisfies two conditions according to steps 1 and 2: 1) only one-to-one matching is enabled; and 2) matchings with a distance larger than T is removed. In some cases, an empty matching set satisfies these two conditions as well, so one implementation may directly go from the input to step 3. In one illustrative example, the distance can be defined by geometry information of a bounding box, as well as a tracker's predicted bounding box location. For example, if the tracker matches in frame T a bounding box pBox, and its prediction (e.g., as a result of Kalman filter) may shift the whole bounding box to a different position, designated as a new box of predBox, the distance of the tracker and the bounding box curBox is defined as the distance between the curBox and predBox. In some examples, a Hungarian method can be used in Step 1 (FIG. 5G). However, Hungarian pursues an optimization solution of one-to-one matching, and thus may associate elements with distance larger than $T_1$, causing certain matchings to not fulfil the two constraint of the matching problem noted above. Therefore, as described above, in Step 2, any matching $(R_i, S_j)$ with a distance $d(R_i, S_j)$ is removed if $d(R_i, S_j) > T$. After the step 2, some trackers and some bounding boxes are initially one-by-one matched. Those initial matches are illustrated by the double arrows.

Step 3 is shown in FIG. 5I, and takes the results of initial matching and further tries to match just the unmatched trackers. For example, for each unmatched tracker, the process finds a best matching bounding box with a distance smaller than $T_2$. If such a bounding box does not exist, the tracker will not be matched in this step, and therefore may be considered as lost. New matches in Step 3 are illustrated by dashed arrows from a tracker to a bounding box.

Step 4 is shown in FIG. 5J, and takes the results of step 3 and further tries to match just the unmatched bounding boxes. For example, for each unmatched bounding box, the process finds a best matching tracker with a distance smaller than $T_3$, if such a bounding box does not exist, the bounding box will not be matched in this step and therefore may be considered as a new tracker. New matches in Step 4 are illustrated by dashed, dotted arrows from a bounding box to a tracker.

The four matching steps (steps 1-4) described above may be sufficient, in most cases, to match all the bounding boxes and trackers in a frame. There may be cases, however, were additional refinement is needed. For example, in FIG. 5D, two bounding boxes S2 502 and S3 503 are both associated with tracker R3 513. In this example, the bounding boxes S2 502 and S3 503 may represent an object that has split into two objects. A split scenario is discussed further with respect to FIG. 6A-FIG. 6B. As another example, bounding box S1 501 is associated with two trackers R1 511 and R2 512. In this example, S1 501 may represent two objects that have merged into a single object. A merge scenario is discussed further with respect to FIG. 7A-FIG. 7E and FIG. 8. Other situations may also arise, such as ambiguous matches, which are discussed with respect to FIG. 10A-FIG. 10B.

Figure 5E:
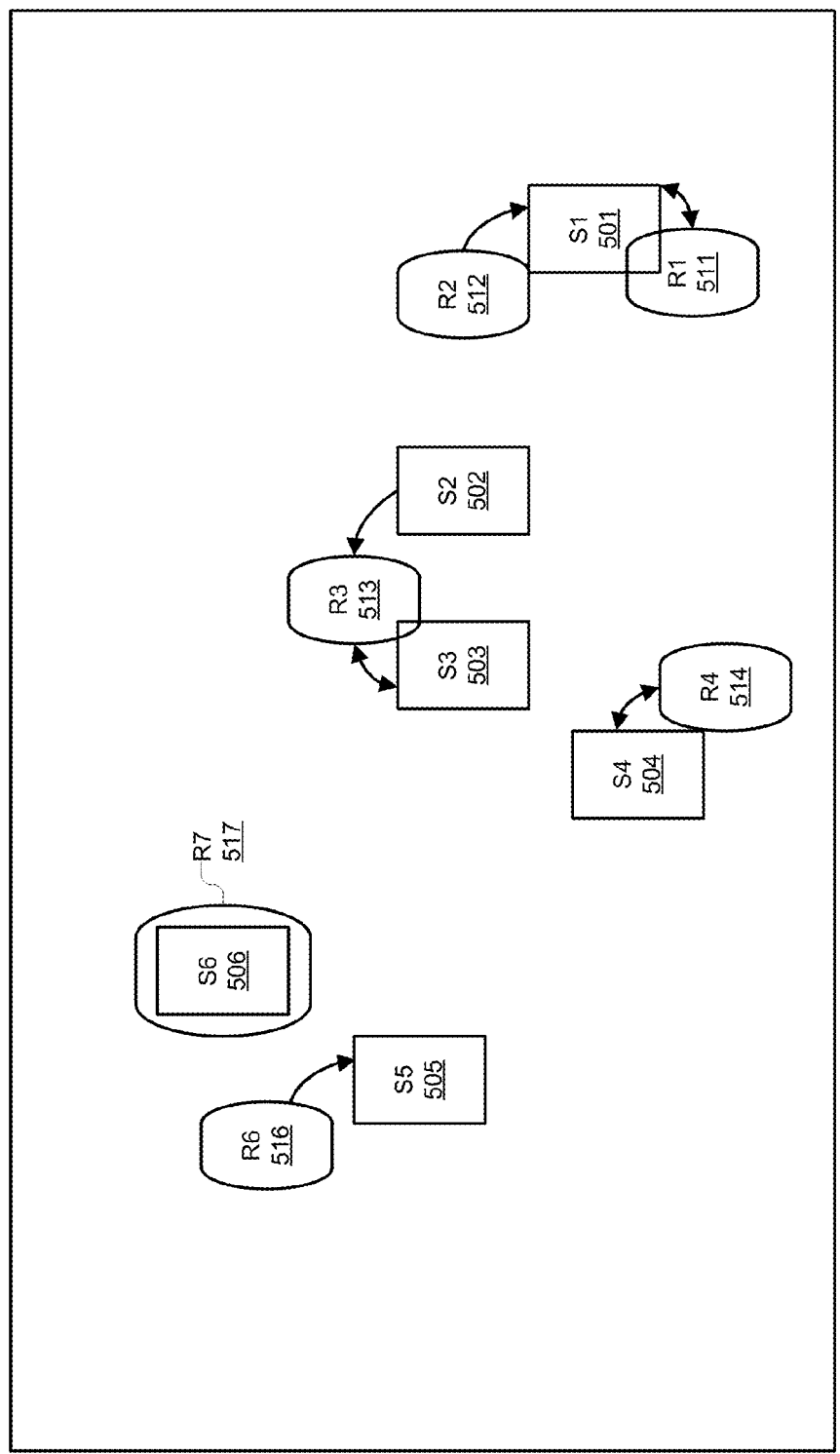

As another example, bounding box S6 506 is not associated with any tracker. This example illustrates a case where the bounding box S6 506 may describe a new object, that is, an object that has just entered the scene. As illustrated in FIG. 5E, the system may identify S6 506 as still unmatched. The system may then generate a new tracker R7 517, and associate R7 517 with S6 506. FIG. 5K shows a group of trackers and bounding boxes where the top-right bounding box does not match any tracker after Step 4, in which case a new tracker is generated to match with the top-right bounding box (shown by a dotted line).

Figure 6A:
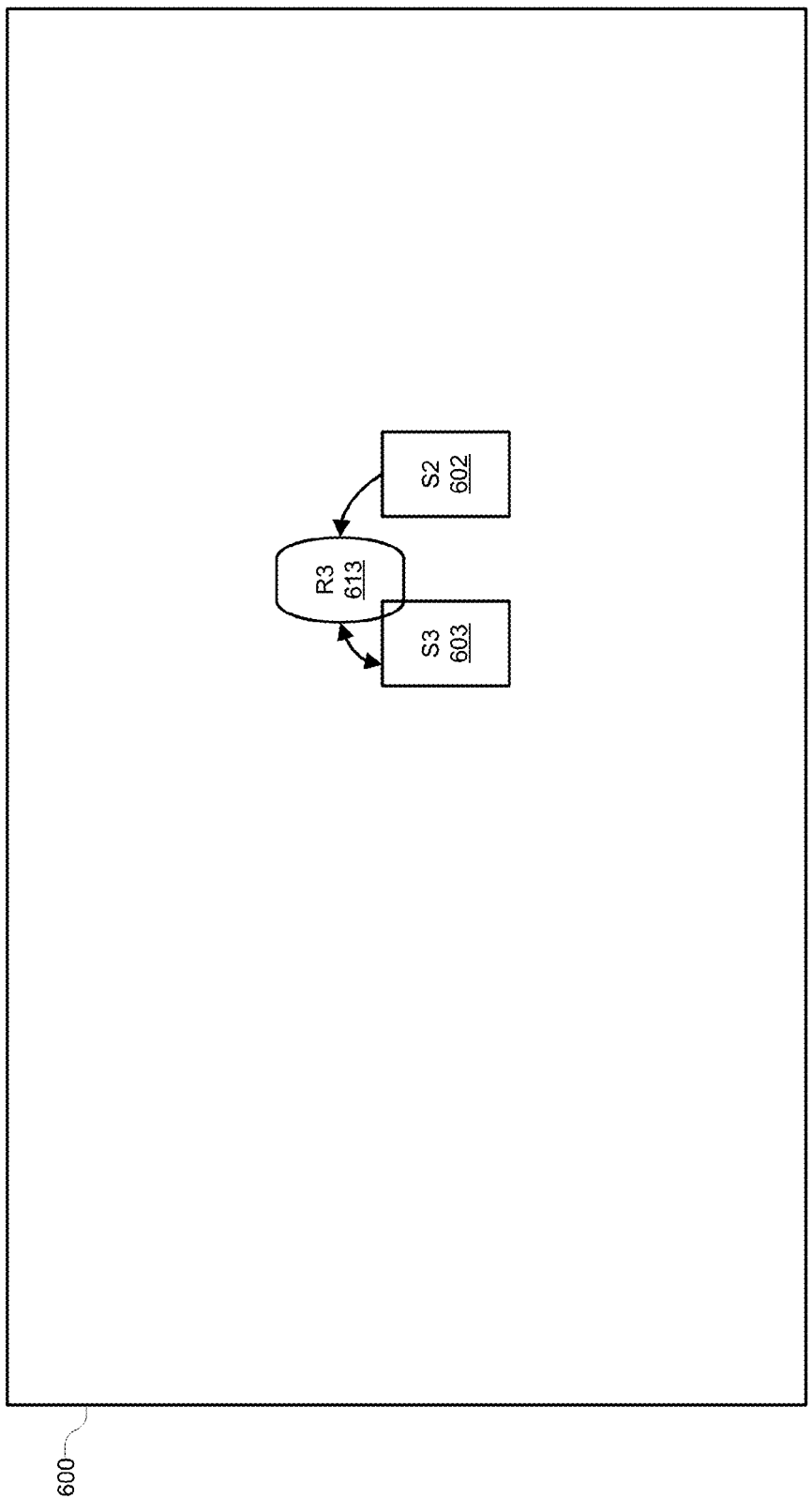
FIG. 6A illustrates an example of a frame where two bounding boxes are associated with one tracker.

As noted above, an object that is detected as one blob in a previous frame may split into two or more objects, and be identified as two or more separate blobs in a current frame. As a result, after the matching steps 1-4 discussed above, one bounding box may be associated with two or more trackers. FIG. 6A illustrates an example of a frame 600 where two bounding boxes, S2 602 and S3 603, are associated with one tracker R3 613. These associations may have been made at various steps in the matching process discussed above. For example, one of the associations may have been made in the step 1, where the system attempted to match all of the trackers and bounding boxes. As another example, one or both of the associations may have been made when the system attempted to match unmatched trackers (in step 3) or unmatched bounding boxes (in step 4).

In refining the matches that resulted from the initial matching steps 1-4, the system may identify the scenario illustrated in FIG. 6A as a case where an object has split into two objects. A new tracker may thus be required. This is illustrated in FIG. 6B. In this example, the existing tracker, R3 613 is closer to S3 603 than to S2 602. Hence, the association between tracker R3 613 and bounding box S3 603 is preserved, and the association between tracker R3 613 and bounding box S2 602 is removed. The system also generates a new tracker R8 618 for S2 602. In various implementations, the new tracker R8 618 may inherit some information from R3 613. In these implementations, it may be assumed that S2 602 likely did not newly enter the scene starting in the current frame 600, but rather shares some history that is captured by tracker R3 613. In some cases, when a split happens for a tracker that contains one or more hidden trackers (described below), a "split process" may be performed, in which case the hidden trackers can be used to match the bounding boxes so as to avoid creating new trackers for the bounding boxes. When such a matching happens, a hidden tracker is not a hidden tracker anymore and is removed from the object tree it previously belongs to.

FIG. 6C shows another illustration of a split scenario. As shown in FIG. 6C, splitting happens within the dashed box, wherein one tracker matches two bounding boxes. The bounding box that has a smaller distance (the shaded bounding box) inherits the existing tracker, while the other bounding box has to be carried by a newly created tracker moving forward (called a split new tracker), similarly as a new tracker as shown in FIG. 5K. A difference between a split new and a new tracker is that such a split new tracker may inherit some information from the existing tracker.

In some cases, an opposite scenario can also occur, where two formerly distinct blobs (each with their own trackers) merge into a single blob. For example, a merging scenario may occur when one bounding box is associated with more than one tracker during the data association process (e.g., by data association engine 414). When merging occurs for two trackers, neither of which already contain hidden trackers, a "merging process" can be performed, in which case one of the trackers will be chosen to be the major tracker (or "parent" tracker) while the other tracker may be set as a hidden tracker (or "child" tracker) belonging to the parent tracker. For example, as shown below in FIG. 7A-FIG. 7E, a merge can happen, in which case one tracker becomes a hidden tracker of a parent tracker. The hidden tracker and parent tracker can be referred to as a merged tracker. The merged tracker itself can then be merged with another tracker (based on the blobs for the trackers being merged), and both the parent tracker itself and the child tracker of the merged tracker may become the direct child tracker of a new parent tracker of the newly merged tracker. Thus, both the parent tracker and hidden tracker become hidden trackers of the new parent tracker, but are in the same hierarchy of an object tree.

Figure 7A:
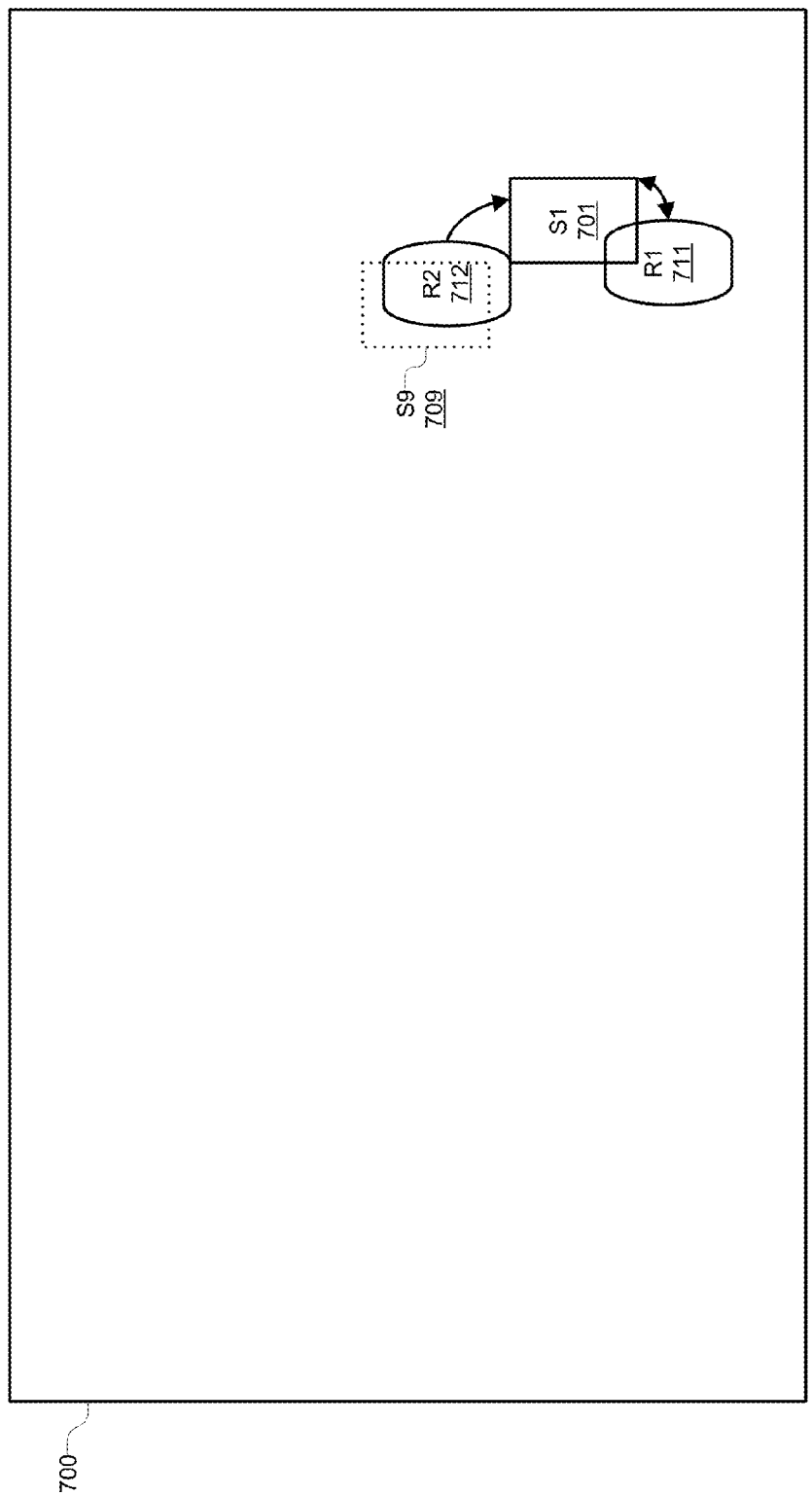
FIG. 7A illustrates an example of a frame where one bounding box has been associated with two trackers.

FIG. 7A illustrates an example of a frame 700 where one bounding box S1 701 has been associated with two trackers R1 711 and R2 712 during the data association process (e.g., by data association engine 414). In a previous frame, one of the trackers, such as R2 712, may have been associated with another bounding box S9 709. In the current frame 700, the object represented by bounding box S9 709 may have merged with the object represented by bounding box S1 701. Hence, bounding box S9 709 was not found in the current frame 700. The tracker R2 712, however, persisted into the current frame, and due to the proximity of R2 712 to S1 701, the system has associated tracker R2 712 with bounding box S1 701. Bounding box S1 701, however, is also associated with tracker R1 711. This association may have happened during step 1 of the matching process, or during step 3 or step 4, when multiple matches were allowed.

In some cases, it may happen that the two objects formerly represented by bounding boxes S1 701 and S9 709 may again separate into distinct blobs. Hence, rather than removing the tracking information provided by the separate trackers R1 711 and R2 712, the system may instead preserve the tracking information in so-called "hidden" trackers. As discussed further below, a tracker becomes hidden as a result of a merge. For example, a hidden tracker is a tracker that is related to another tracker as the result of the merging of two objects, with the other tracker representing the merged object.

Figure 7B:
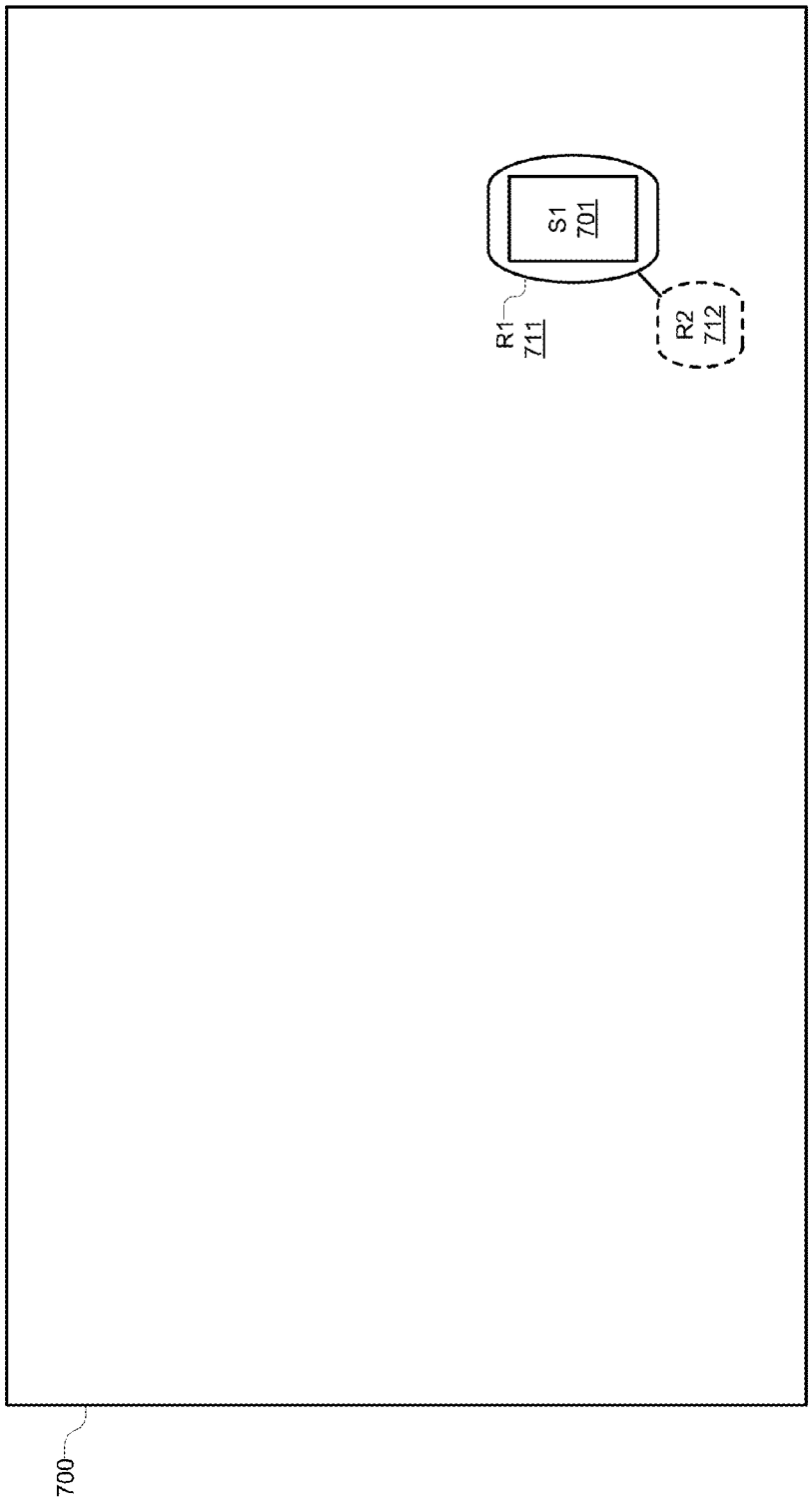
FIG. 7B illustrates an example where a tracker has been made hidden.

FIG. 7B illustrates an example where a tracker has been made hidden as a result of the system determining that a merge has occurred. To preserve the tracking information, the system may choose one of the two trackers illustrated in FIG. 7A, R1 711 in this example, to be a "major" or "parent" tracker. As illustrated in FIG. 7B, the parent tracker remains associated with bounding box S1 701. The other tracker, R2

712 in this example, is made a "hidden" or "child" tracker of R1 711. That is, hidden tracker R2 712 becomes a hidden tracker (or child tracker) of the parent tracker R1 711, and remains as a child of the parent tracker R1 711 as the parent tracker R1 711 (e.g., by way of its association with bounding box S1 701) is updated in subsequent frames. The hidden tracker R2 712 is illustrated here as having a location distinct from the parent tracker R1 711. In some implementations, hidden tracker R2 712 and its parent tracker R1 712 will have their location information modelled differently, that is, e.g., they may be treated as having a different location, such as a location relative to the direction of travel of the previous bounding box (e.g., bounding box S9 700) with which the hidden tracker R2 712 was associated. In this case, the bounding box will match the parent tracker R1 711 in the current frame as well as subsequent frames, but will not be used to update the hidden tracker R2 712, For example, bounding box S1 701 will not be used to update the hidden tracker R2 712. In some implementations, hidden tracker R2 712 may be treated as having a similar location as parent tracker R1 711, thus the bounding box matching the parent tracker R1 711 in the current frame as well as subsequent frames may be used to update not only the location information of the parent tracker R1 711, but also that of hidden tracker R2 712. In some implementations, when the hidden tracker R2 712 is made hidden, it may also be unmatched from bounding box S1 701 (the prior association between the hidden tracker R2 712 and bounding box S1 701 can be removed).

In some cases, a parent tracker, which has at least one hidden tracker, may itself merge with another tracker. FIG. 7C illustrates an example where this may occur. In this example, the object described by the bounding box S1 701 has moved towards another object, described by bounding box S10 720. Bounding box S1 701 was previously associated with hidden tracker R1 711, and parent tracker R1 711 is the parent of the hidden tracker R2 712, as described above with respect to FIG. 7B. In this example, bounding box S10 720 is separately associated with a tracker R10 730.

Figure 7D:
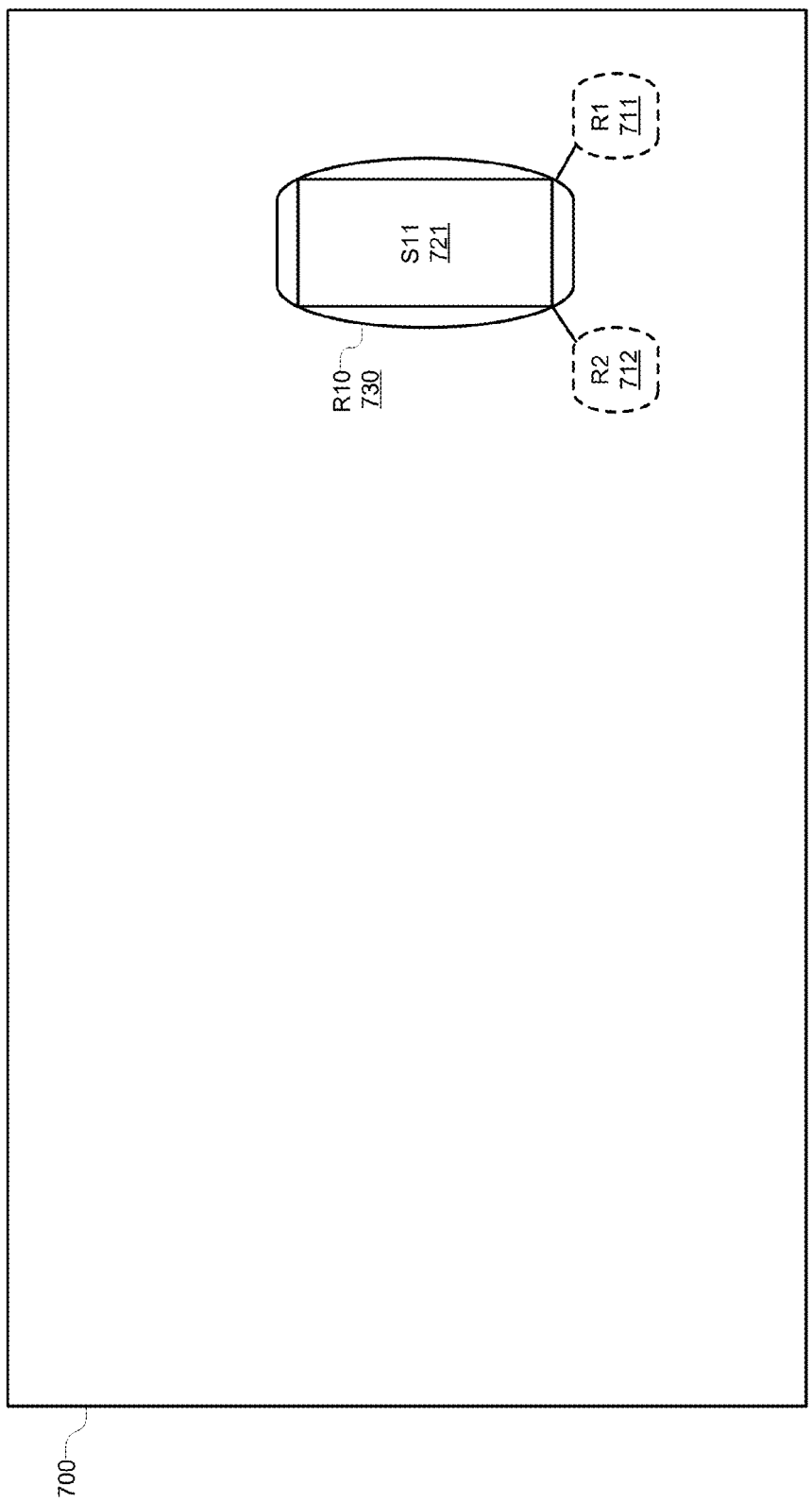
FIG. 7D illustrates an example where multiple bounding boxes have been merged into a single bounding box.

In some cases, the system may determine that the bounding boxes S10 701 and S10 720 should be merged into a single bounding box. In such cases, the system may generate a single bounding box. This is illustrated in FIG. 7D. In FIG. 7D, a single bounding box S11 721 now describes the objects formerly associated with S1 701 and S10 720.

Similar to the scenario illustrated in FIG. 7B, in FIG. 7D, all of the trackers are preserved. In this example, the system selects R10 730 as the parent tracker. Both the tracker R1 711 and the hidden tracker R2 712 are made hidden, or "child" trackers of R10 730. In this way, all of the trackers are preserved. In some cases, the system may have selected R1 711 to be the parent tracker instead of R10 730. For example, the system may select R1 711 when R1 711 is closer to the bounding box S11 721 than is tracker R10 730. In such a case, the system would make both R10 730 and R2 712 hidden trackers of R1 711.

FIG. 7E shows another example of merged trackers due to merged bounding boxes. As noted above, when a merge happens for two trackers (neither of which contains hidden trackers), one tracker will be chosen to be the parent tracker while the other may be set as a hidden tracker belonging to the parent tracker. As shown in FIG. 7E, when merge happens between a previously merged tracker and another tracker, both the parent tracker itself and its child tracker (of the previously merged tracker) will become the direct child tracker of the new parent tracker, and thus both become hidden trackers but in the same hierarchy of the object tree.

Figure 8:
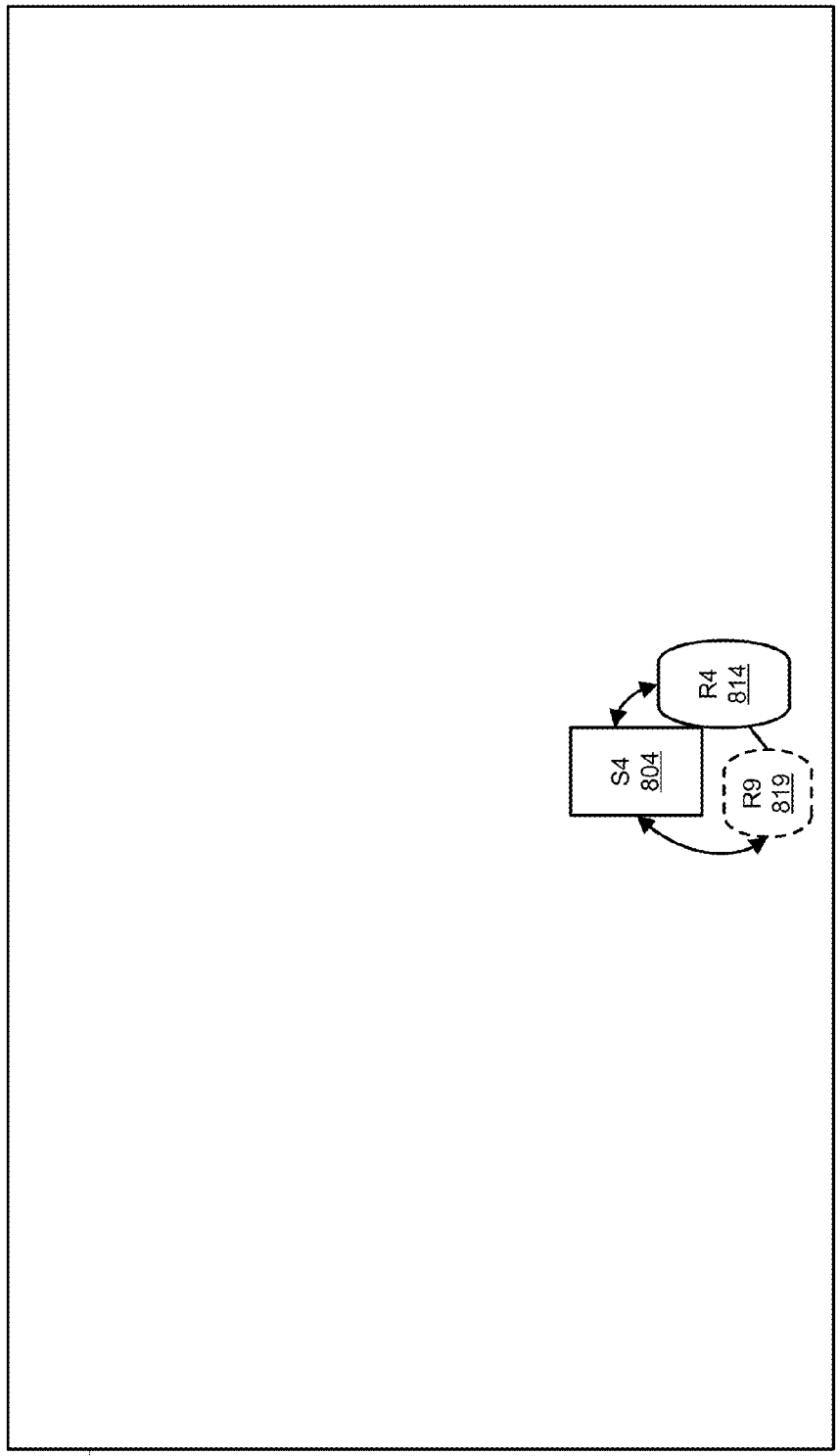
FIG. 8 illustrates an example where a bounding box has been associated with a hidden tracker.

In various implementations, hidden trackers can also be considered during the matching process described with respect to FIGS. 5A-5E. FIG. 8 illustrates an example where a bounding box has been associated with a hidden tracker. In this example, a hidden tracker R9 819 is a child of a parent tracker R4 814. Additionally, the system has associated a bounding box S4 804 with both the parent tracker, R4 814, and the hidden tracker, R9 819. In various implementations, bounding box S4 804 may have been associated with a non-hidden tracker R4 814 during any of the step 1, step 3, or step 4 in the above matching process. In some implementations, the system may have associated hidden tracker R9 819 in the step 3, where unmatched trackers are matched to nearby bounding boxes. In these implementations, hidden trackers may be treated in step 3 similar to non-hidden trackers. In some implementations, the system may have associated bounding box S4 804 with hidden tracker R9 819 in step 4, where unmatched bounding boxes are matched with trackers. In these implementations, when matching unmatched bounding boxes to trackers, hidden trackers and non-hidden trackers may be treated the same. In some implementations, hidden trackers are not considered during step 1 of the matching process. In some implementations, hidden trackers are only considered when more bounding boxes need to be matched, and thus only during step 4.

FIG. 8 illustrates one case where a bounding box is associated with a hidden tracker and the hidden tracker's parent tracker. When the video content analysis system associates a bounding box with a parent tracker and with a hidden tracker, it may be that the bounding box represents two blobs that had, in some earlier sequence of frames, merged into a single blob. The single blob may again split into two distinct blobs, and the system may provide a bounding box for each. FIG. 9A illustrates an example of a frame 900 where two bounding boxes, S4 904 and S13 923, are both associated with a parent tracker R4 914. In this example, a hidden tracker R13 933 is a child of the parent tracker R4 914. In some previous frame, the blobs represented by S4 904 and S13 923 may have been close enough together that the system generated a single bounding box, S14 924, for the conjoined blob. This previously existing bounding box, S14 924, may further have been associated with parent tracker R4 914.

Figure 9B:
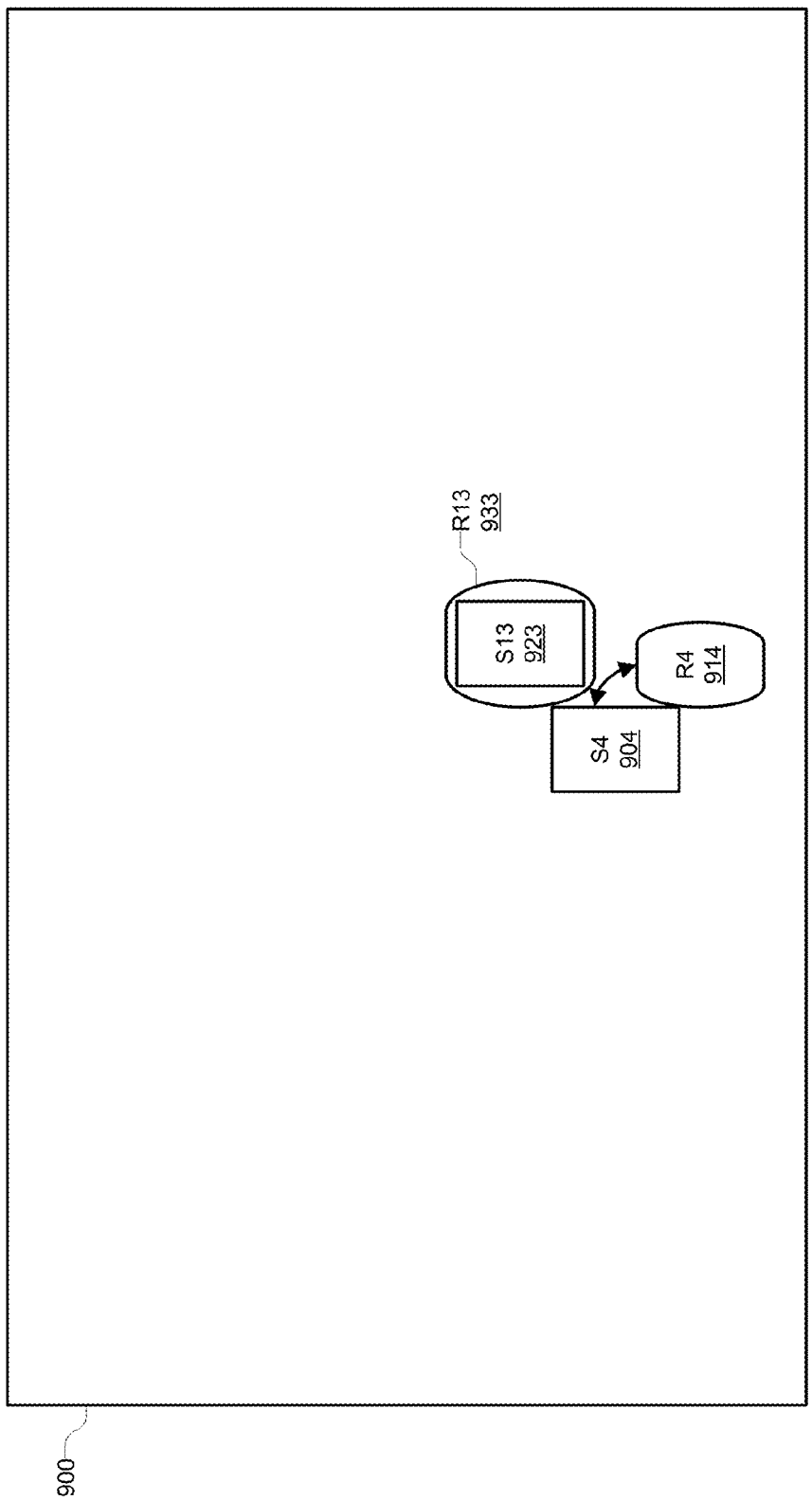
FIG. 9B illustrates an example where a hidden tracker is associated with a bounding box.

In the current frame 900, the system has now identified the two bounding boxes, S4 904 and S13 923, and has associated both with the tracker R4 914. As discussed above, when one tracker is associated with more than one bounding box, one blob may have split into two (or more) blobs, and a new tracker may be required. In the example illustrated in FIG. 9A, however, instead of generating a new tracker, the system may instead switch the hidden tracker R13 933 to non-hidden, and associate the tracker R13 933 with one of the two bounding boxes. This is illustrated in FIG. 9B. In FIG. 9B, the system has determined that tracker R4 914 should remain associated with bounding box S4 904, probably because of the proximity of R4 914 to S4 904. Formerly hidden tracker R13 933, however, has been made non-hidden, and has been associated with bounding box S13 923. Bounding box S13 923 is thus paired with a tracker that includes history information collected while S4 904 and S13 923 were merged, as well as any history information that R13 933 collected before R13 933 became a hidden tracker. Using hidden trackers in this way may better reflect the activity that occurred in the scene.

Figure 9C:
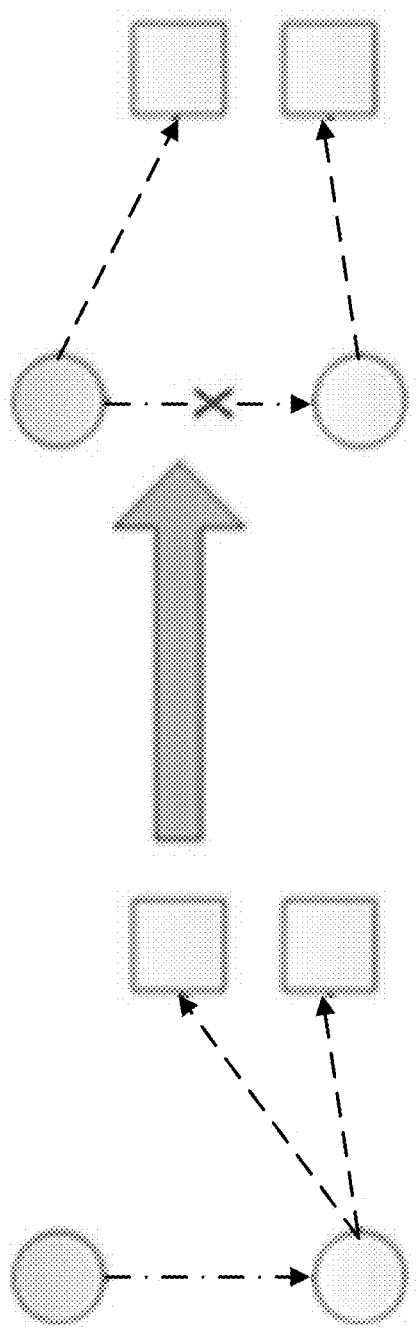
FIG. 9C illustrates another example where two bounding boxes are both associated with a parent tracker and a hidden tracker is associated with a bounding box.
Figure 9C:
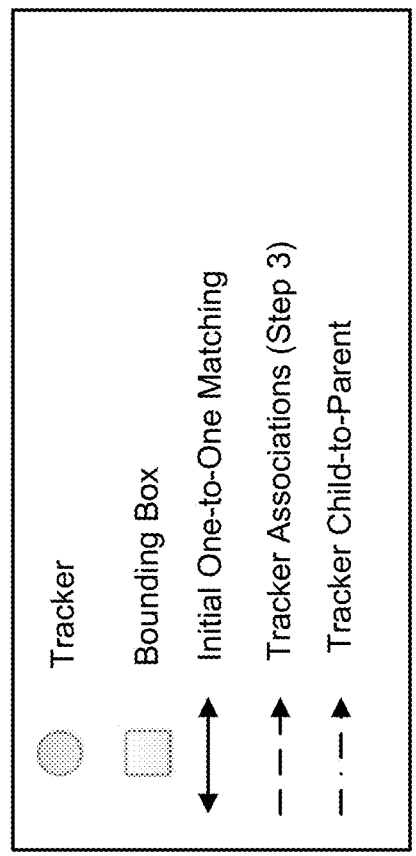

FIG. 9C shows a scenario when a split happens for a tracker that contains one or more hidden trackers. The hidden tracker (or child tracker) is used to match the bounding boxes so as to avoid creating new trackers. When such a matching happens, a hidden tracker is not a hidden tracker anymore (as shown by the "x" in FIG. 9C), and is removed from the object tree it previously belongs to.

The matching process (steps 1-4) discussed with respect to FIG. 5A-FIG. 5E may, in many cases, generally result in one-to-one matching between bounding boxes and trackers or in multiple matches that indicate merging or splitting of blobs. For example, after the step 3, a bounding box may match no trackers or one or more trackers. Trackers are not likely to match more than one bounding box after step 3, since, in this step, only unmatched trackers are matched to bounding boxes.

Figure 10A:
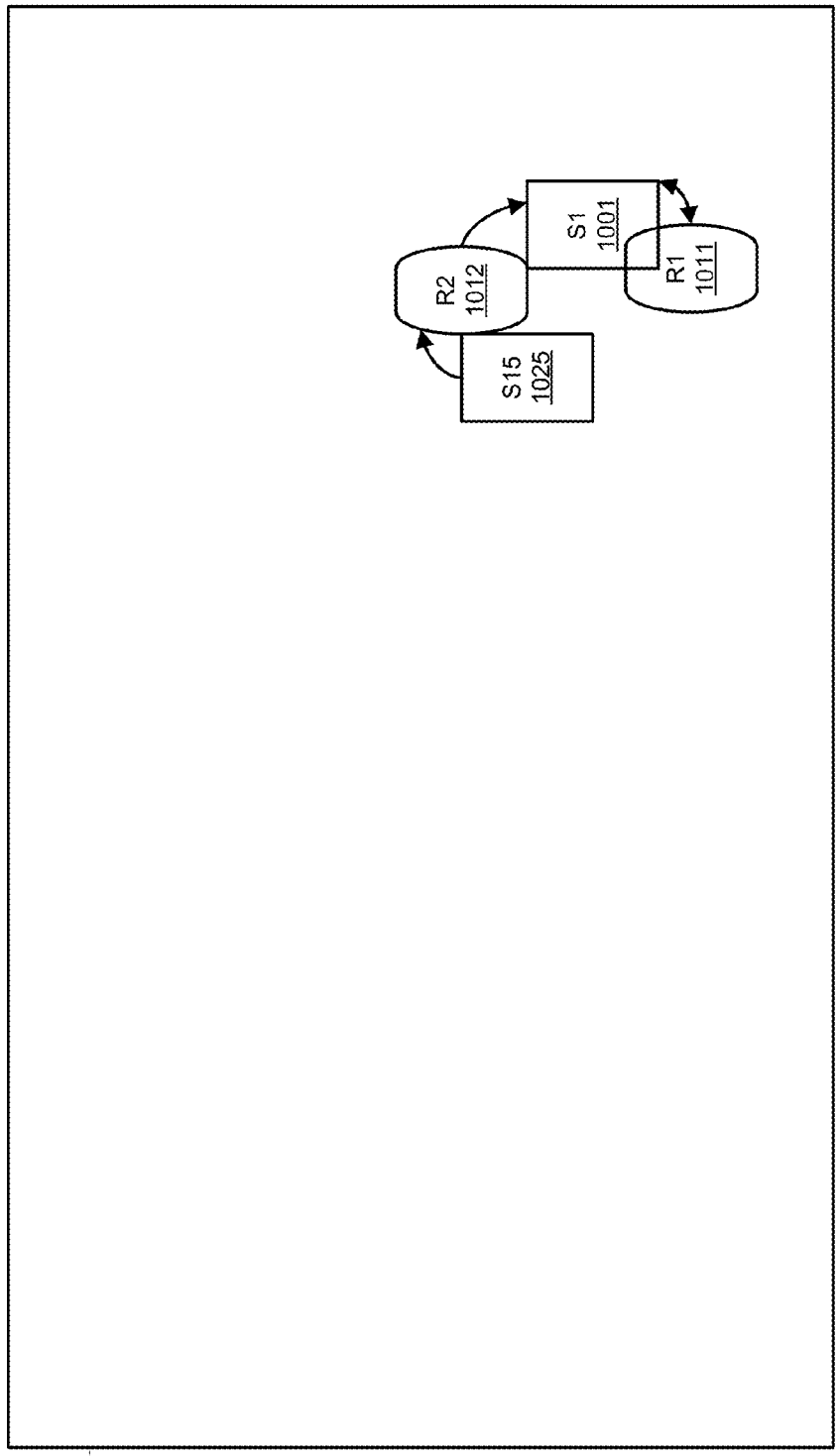
FIG. 10A illustrates an example where a tracker matches more than one bounding box, and one of the bounding boxes also matches a second tracker.

Step 4, however, may introduce ambiguous matches, due to multiple bounding boxes possibly matching the same tracker. An example of such an ambiguous matching case is illustrated in the example frame 1000 of FIG. 10A. In the example of FIG. 10A, tracker R2 1012 is associated with bounding box S1 1001 as well as S15 1025. Having tracker R2 1012 being associated with two bounding boxes may have occurred, for example, by the system first finding R2 1012 as an unmatched tracker in step 3 and thus associating tracker R2 1012 with bounding box S1 1001, and then finding S15 1025 as an unmatched bounding box in step 4 and associating S15 1025 with R2 1012. As discussed above, when one tracker is associated with two bounding boxes, it may be that a split has occurred, and a tracker is needed. In the example of FIG. 10A, however, bounding box S1 1001 has also been associated with tracker R1 1011. As also discussed above, when one bounding box is associated with two or more trackers, a merge may have occurred. In other words, it may not be clear in the example illustrated in FIG. 10A whether a split has occurred, requiring a new tracker, or whether a merge has occurred, requiring that a tracker be hidden. This situation may be referred to as an ambiguous matching.

An ambiguous matching can be defined as follows: given an associated bounding box and tracker pair $(R_i, S_j)$, there is an association $(R_i, S_k)$, where k is unequal to j, meaning that tracker $R_i$ is associated with two bounding boxes $S_j$ and $S_k$. Furthermore, there may be at least one other bounding box and tracker pair $(R_l, S_k)$, where l is unequal to i, meaning bounding box $S_k$ is associated with tracker $R_l$ as well as tracker $R_i$.

In this situation, in various implementations, the system may be configured to assume that one of the associations is incorrect. For example, it may be assumed that, given that there are two bounding boxes and two trackers in this scenario, one tracker is likely for one bounding box, while the other tracker is likely for the other bounding box. Thus, in various implementations, the system may be configured to resolve the ambiguity between the matches by removing $(R_i, S_k)$. This may be the appropriate association to remove because, in the definition provided above, $R_i$ has been associated with two or more bounding boxes, one of which $R_i$ may have been associated with before. Furthermore, $S_k$ has been associated with other trackers, and thus does not need a new tracker.

Figure 10B:
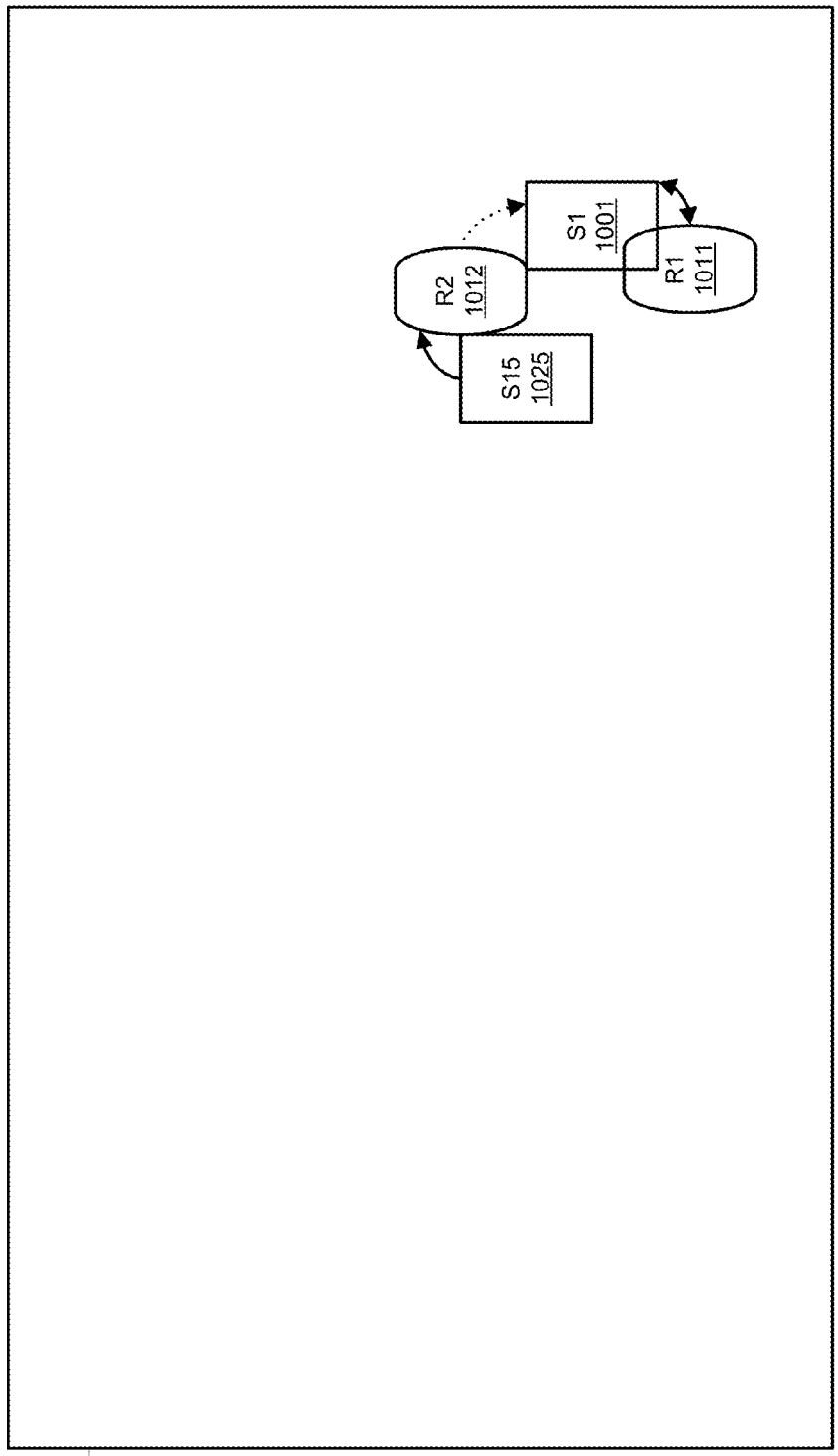
FIG. 10B illustrates an example of resolving the ambiguity illustrated in FIG. 10A.

FIG. 10B illustrates an example of the generalization described above, as applied to the example of FIG. 10A. In FIG. 10B, the association between tracker R2 1012 and bounding box S1 1001 has been removed. Tracker R2 1012 remains associated with bounding box S15 1025, and bounding box S1 1001 remains associated with tracker R1 1011.

Figure 10C:
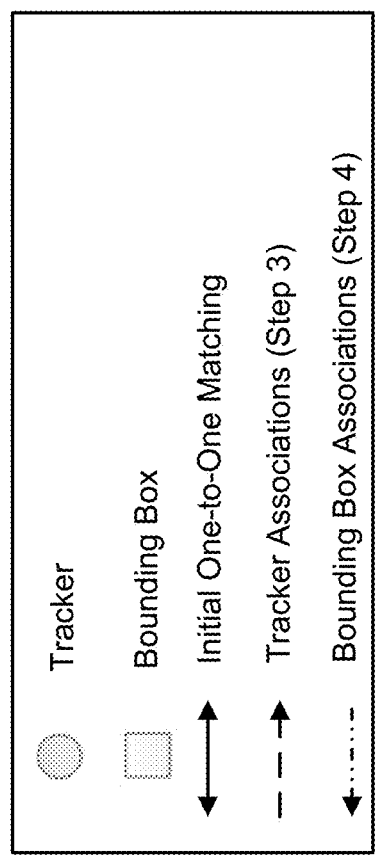
Figure 10C:
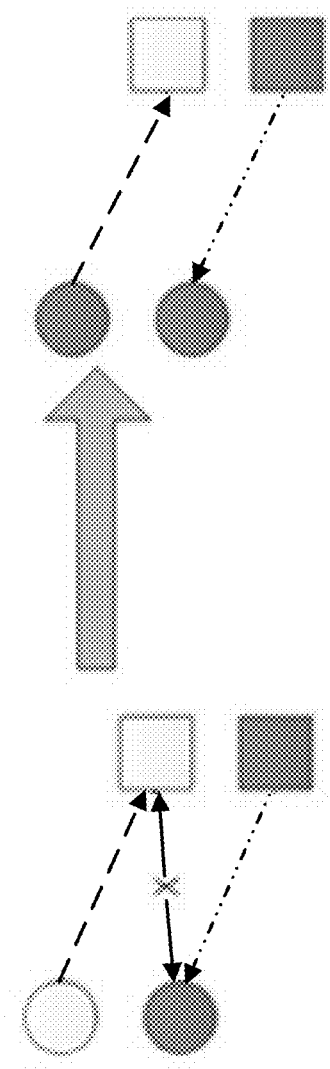

Ambiguous matchings are also shown in FIG. 10C-FIG. 10D. For example, as described above, in a tracking application, most of the matchings may be one-to-one matching. There can also be cases of merge and split. After Step 3 is done, a bounding box may match to zero trackers or to one or more trackers, but no trackers will match two or more bounding boxes. However, after Step 4 is done, there can be ambiguous matching, as shown in FIG. 10C and FIG. 10D, since Step 4 enables multiple bounding boxes to match a single tracker. An ambiguous matching is defined as described above. Such an ambiguous matching indicates that one tracker may split to multiple bounding boxes while one of the trackers is actually being merged from other trackers. This can be a complicated and almost meaningless event from the system perspective. Such ambiguous matchings can be disallowed by the system by removing the matching $(R_i, S_j)$. Note that the ambiguity is only introduced in Step 4, so we only need to check any matching $(R_i, S_j)$ introduced during Step 4 for ambiguity. When such ambiguity is detected, the previous matching $(R_i, S_k)$ is removed (as shown by the "x" through the one-to-one matching), since 1) tracker $R_i$ has been matched to two or more bounding boxes, with only one matching to a bounding box that has been matched before; and 2) bounding box $S_k$ has been matched to other trackers and therefore does not cause a situation for $S_k$ to seek for a new tracker. A similar example is shown in FIG. 10D, where a previous matching is removed, as shown by the "x" through the one-to-one matching.

The above discussion provides examples of various situations that may occur in a scene, including blobs splitting and merging and possibly splitting and merging at the same time. The discussion also provides examples of the video content analysis system resolving each situation and associating each bounding box with a tracker that seems appropriate.

The matching refinement examples provided above shall now be described more generally. The refinement steps generally look for new bounding blocks, split cases, and merge cases, should any exist in a current frame.

In the following discussion, the following terms will be used:
  Unique bounding box: a bounding box that is associated with only one tracker.
  Unique tracker: a tracker that associated with only one bounding box.
  Unmatched bounding box: a bounding box that is not associated with any existing tracker.
  Unmatched tracker: a tracker that is not associated with any bounding box.
  Matched bounding box: a bounding box that is associated with at least one existing tracker.
  Matched tracker: a tracker that is associated with at least one bounding box.

Note that these designations are intended to provide clarity to the following discussion, and are not intended to define or limit the associated terms.

The system may perform matching refinement for matches from step 4 described above. The matching refinement can include a "refinement step 1" and a "refinement step 2." For example, after step 4 in the initial matching process (discussed above with respect to FIGS. 5A-5D), there may remain bounding boxes that are unmatched (e.g., the bounding box is not associated with any tracker), and there may be bounding boxes that are unique (e.g., the bounding box is associated with only one tracker). For any remaining unmatched bounding box, the system can create new tracker as element of set $R^N$. In various implementations, for any unique bounding boxes, the system may attempt to identify a better tracker, should a better tracker exist. To do so, the system may, first, for each unique bounding box, identify any tracker that is within a distance $T_3$ to the unique bounding box. Second, these trackers may be put into a target tracker list. Next, for each tracker in the target tracker list, the system may, first, remove any ambiguous matches (that is, matches where one tracker is associated with two bounding boxes, and one of those two bounding boxes is further associated with a second tracker). Secondly, the system may identify trackers in the list that are associated with more than one matched bounding box, and for each identified tracker, may invoke a split and generate a new tracker for all but one of the associated bounding boxes (see, e.g., FIGS. 6A-6B). Third, the system may mark each of the trackers in the target tracker list, and their associated bounding boxes as "processed." The bounding boxes that have not been matched may be matched in matching stage step 4, and a split may only be introduced in this step. After step 4, those non-matched bounding boxes after matching stage step 3 can only be either still unmatched bounding boxes or unique bounding boxes. A "refinement Step 2" is used to process these matched trackers, which is described further below. The "refinement step 1" is now described.

In the refinement step 1, for example, for each unmatched bounding box, a new tracker is created as an element of set $R^N$, and, for each unique bounding box, the following procedure is applied:
1. Identify a target tracker
2. Insert the target tracker to a target tracker list.

For each item in the target tracker list, the following items apply in step:
1. Remove the ambiguity if any
2. If the target tracker has more than one matched bounding boxes, invoke a split process, as discussed with respect to FIG. 6A-FIG. 6B or FIG. 9A-FIG. 9B.
3. Mark the target tracker and all the above relevant bounding boxes as "processed".

The system may then perform matching refinement for other trackers. For example, after processing the target tracker list, there may remain bounding boxes and trackers that are not considered "processed" by the system (denoted as "unprocessed" bounding boxes). Generally, the unprocessed bounding boxes at this point are matched bounding boxes (e.g., bounding boxes that match one or more trackers). In addition, the "unprocessed" trackers are either unique trackers (e.g., the tracker is associated with only one bounding box) or unmatched trackers (e.g., the tracker is not associated with any bounding box). For each unprocessed trackers, the system may attempt to find a bounding box, or a better bounding box, to associate with each of these trackers. For each of the unprocessed unique trackers, the system may, first, identify a target bounding box (which will be unprocessed too since the ambiguity has been removed). For example, a target bounding box for an unprocessed unique tracker can include a bounding box that is within a distance $T_2$ to the unprocessed unique tracker. The system may, second, add the target bounding box to a target bounding box list. Next, the system may examine each bounding box in the target bounding box list, and, first, determine whether each target bounding box from the target bounding box list is associated with (or matched with) more than one tracker, and if a target bounding box from the target bounding box list is associated with more than one tracker, initiate the merge process (as previously described). For example, the merge process can include, at least in part, setting one tracker as a parent tracker and another tracker as a hidden tracker belonging to the parent tracker (see, e.g., FIGS. 7A-7D). Second, the system may mark each bounding box in the target bounding box list, and their associated trackers, as "processed." There may be trackers that will still be marked as "unprocessed" only if there were unmatched trackers. Those unmatched trackers, if not being set as hidden trackers, will eventually not be matched. The video analytics system can consider those unmatched trackers as lost. This is the "refinement step 2".

The refinement step 2, for example, for other trackers can be performed after the above two procedures for performing matching refinement for matches from step 4, and can include, for each "unprocessed," unique tracker, applying the following procedure:

For each "unprocessed" unique tracker, the following items apply in step:
1. Identify a target bounding box (which will be unprocessed too since the ambiguity has been removed)
2. Insert the target bounding box to a target bounding box list.

For each item in the target bounding box list, the following items apply in step:
1. If the target bounding box has more than one matched tracker, invoke a merge process, as discussed above with respect to FIG. 7A-FIG. 7D.
2. Mark the target bounding box and all the above relevant trackers as "processed".

After the above procedures, there may still be trackers that are marked as "unprocessed." These trackers are generally unmatched trackers. Any of these unmatched trackers that are not hidden trackers are likely to not be matched to any bounding box. These unmatched trackers can thus be considered lost.

After processing the list of bounding boxes, there may still remain trackers that the system considers "unprocessed." Generally, these trackers are unmatched trackers. Since no bounding box could be found for these trackers, the trackers are considered lost, meaning that the objects the trackers were tracking have left the scene.

In various implementations, multi-to-multi matching processes, such as are described above, may be configured to maximize the number of matches, as well as to minimize the sum of the distances between each matched bounding box and tracker.

Optimization of the number of matches can be expressed as follows (and denoted as an multi-to-multi optimization problem). Upon completing the matching process, the system may have a matching set (R',S'). The system may divide the matching set (R',S') into three categories: a first set for one-to-one matches, a second set for multiple trackers that match one bounding box (multi-to-one matching), and a third set for multiple bounding boxes that match one tracker (one-to-multi matching). That is: $(R',S')=(R'',S'') \cup (R''_N, S''_1) \cup (R''_1, S''_M)$, wherein $R'=R'' \cup R''_N \cup R''_1$ wherein $S'=S'' \cup S''_M \cup S''_1$, intersection between any two of R", $R''_N$, and $R''_1$ is empty, intersection between any two of S", $S''_M$, and $S''_1$ is empty, and the following conditions are satisfied:

$(R'',S'')=\{(R''_i,S''_i) | R''_i \in R'', S''_i \in S''\}$: One-to-one mapping $(R''_N,S''_1)=\{(R''_{N_j},S''_{1_j})\}$: for any $S''_{1_j} \in S''_1$, there are two or more matchings in the set $(R''_N,S''_1)$ and for any $R''_{N_j} \in R''_N$, there is one and only one matching in the set $(R''_N,S''_1)$.

$(R''_1,S''_M)=\{(R''_{1_j},S''_{N_j})\}$: for any $R''_{1_j} \in R''_1$, there are two or more matchings in the set $(R''_1,S''_M)$ and for any $S''_{N_j} \in S''_N$, there is one and only one matching in the set $(R''_1,S''_N)$.

Given the above, the number of matches can be expressed as:

$$|(R',S')|=|(R'',S'')|+|(R''_N,S''_1)|+|(R''_1,S''_N)|=|R''|+|R''_N|+|S''_M| \text{ and } |R''|+|S''|.$$

Optimization of the matching distances (or association distances) between each matched bounding box and tracker can be achieved throughout each of the steps 1-4 described above. For example, after step 1 and step 2 of the four step process illustrated in FIG. 5A-FIG. 5D, optimal distances may have been achieved for the initial matches between the bounding boxes and trackers that are matched. In step 3 and step 4, the system may search among all trackers and bounding boxes for pairs with a minimum distance between the bounding box and the tracker in the pair. In these steps 3 and 4, the order in which trackers or bounding boxes are considered does not affect the search for the minimum distances. Alternatively, the system may apply a global optimization during the steps 3 and 4. Specifically, during step 3, a distance matrix of U×m can be used as the input for the optimization, wherein U is the number of trackers to be matched and m is the total number of bounding boxes. Similarly, during step 4, a distance matrix of n×V can be used as the input for the optimization, wherein V is the number of bounding boxes to be matched and n is the total number of trackers.

In some examples, further associations may be made when a split occurs. As noted above, when one tracker is associated with multiple bounding boxes, the blobs associated with the bounding boxes may have split from another blob. As also discussed above, the bounding box that has the smallest distance to the tracker inherits the current tracker, and all other bounding boxes may be assigned new trackers. In some cases, however, the tracker may be made the parent tracker of one or more hidden trackers. When this is the case, instead of being assigned new trackers, each of the other bounding boxes may be associated with a hidden tracker to which the bounding box is closest in distance. In most cases, this distance is likely to be less than the threshold (denoted as $T_1$ above) for each matching between a remaining bounding box and a hidden tracker. In some cases, if the current bounding box is the last bounding box and the hidden tracker is the last remaining hidden tracker, the threshold may be ignored. In some implementations, this process of providing further associations due to a split may not be part of the multi-to-multi matching problem as defined above, and may instead be part of tracker management after the matching in order to make the system more stable.

In some examples, further associations may be made when a merge occurs. As also noted above, when multiple trackers are associated with one bounding box, it may be that two blobs have merged into one. As also noted above, the system can select the tracker that is closest in distance to the one bounding box to be the parent tracker, while all other trackers (including child trackers of other parent trackers) are made hidden trackers of the parent tracker. This includes trackers that themselves have hidden trackers; the hidden trackers can also be made hidden trackers of the parent tracker. The parent tracker may then be used in subsequent frames, and may include most of the new information acquired for the subsequent frames and update its status based on the current bounding box. In some cases, the tracker selected as the parent tracker may itself already have one or more hidden trackers. In some implementations, these hidden trackers may all be considered as having the same distance to the bounding box as does the parent tracker. Furthermore, in these implementations, all of the other, non-hidden trackers that are associated with the one bounding box are made hidden trackers of the parent tracker. In some implementations, this process of providing further associations due to a merge may not be part of the multi-to-multi matching problem as defined above, and may instead be part of tracker management after the matching in order to make the system more stable. Alternatively, all relevant hidden trackers of the trackers matching the bounding box are considered together to give a possible smaller distance thus it becomes the parent tracker. All the other relevant trackers become child trackers.

As described above, the whole system may contain a matching stage, including steps 1-4, a matching refinement step, including the refinement step 1 and refinement step 2. Those major steps may rely on sub-functions. The whole system is described in detail below, by utilizing the sub-processes.

The Matching Stage, including a multi-to-multi matching system and process that can be implemented by video content analysis system shall now be described in further detail. For a given input frame, the system may be provided with a set of trackers R, and may identify a set of blobs and their corresponding bounding boxes S. Note that a tracker or a bounding box is defined as included in M if there is at least one element (trac, box) in M with trac being the tracker or box being the bounding box. Detailed steps of the matching stage are described below:

1. Initiate an empty set of matchings of M.
2. Invoke Hungarian method for the trackers which are not hidden trackers and bounding boxes S and get the initial M, each has a matching status of MATCH_HUG. <Step 1>
3. Remove the matchings in M that has a distance larger than T. <Step 2>
4. For each tracker tracA that is not a hidden tracker and not included in M, find a bounding box in S, such that the distance between the tracker tracA and the bounding box boxA is minimized. If the distance is smaller than T, insert the (tracA, boxA) into M and set the current matching status to MATCH_TRACKER. <Step 3>. Alternatively, instead of finding the matches one by one, a global optimization mechanism can apply to jointly find the matches so that the results do not depend on the order of the trackers they are present.
5. For each bounding box boxB that is not within M, find a tracker in R, such that the distance between the bounding box boxB and the tracker tracB is minimized. If the distance is smaller than T, insert the (tracB, boxB) into M and set the current matching status to MATCH_LEFT_BOX. <Step 4>. Alternatively, instead of finding the matches one by one, a global optimization mechanism can apply to jointly find the matches so that the results do not depend on the order of the bounding boxes they are present.

Given the pairings in M that result from the above steps, the system may next engage in the matching refinement stage. Detailed steps of the matching refinement stage are described below:

1. For each bounding box boxN in R, if it is not included in M, create a new tracker for boxN.
2. For each element (tracC, boxC) in M with a matching status of MATCH_LEFT_BOX, the following applies
   a. Remove the ambiguity for tracC.
3. Create a set of empty bounding box list set traMultiboxListSet, for elements each corresponds to one target tracker and will be used to maintain a list of bounding boxes matching the target tracker. That is for each tracC, there is a unique element of traMultiboxListSet, that contains a list of bounding boxes corresponding to this tracC
4. For each element (tracC, boxC) in M with a matching status of MATCH_LEFT_BOX, the following applies.

a. Identify a tractoNBoxListC from traMultiboxListSet with the target tracker tracC.
b. Insert boxC into the tractoNBoxListC.
5. For each element (tracC, boxC) in M with a matching status of MATCH_LEFT_BOX, the following steps apply in order.
    a. Identify a tractoNBoxListfrom traMultiboxListSet with the target tracker tracC.
    b. f tractoNBoxList contains only one entry, one-to-one match detected and update the tracC with boxC.
    c. Else, split tracC to all bounding boxes in tractoN-BoxList (with a simplified name of boxListC in the definition of this function).
6. Create a set of empty tracker list set boxtoMultiTrackerListSet, for element corresponds to one target bounding box and will be used for as a list to contain trackers.
7. For each element (tracD, boxD) in M with a matching status of not equal to MATCH_LEFT_BOX, the following steps apply in order.
    a. Identify a boxtoNtrackerListSet from boxtoMultiTrackerListSet with the target bounding box boxD.
    b. Insert tracD into the boxtoNtrackerListSet.
8. For each element (tracD, boxD) in M with a matching status of not equal to MATCH_LEFT_BOX, the following steps apply in order.
    a. Identify a boxtoNtrackerListSet from boxtoMultiTrackerListSet with the target bounding box boxD.
    b. If boxtoNtrackerListSet contains only one entry, one-to-one match detected and update the tracD with boxD.
    c. Else, merge trackers from boxtoNtrackerListSet with bounding box boxD (with a simplified name of trackerListD in the definition of this function).

Note that in the above procedures, in various implementations, any list may be given as pointers or indices to trackers or bounding boxes, rather than being duplicated versions of the actual instances.

Various sub-functions of the matching procedure and matching refinement procedure above can be performed. In some caes, there are two types of sub-functions, normative sub-functions and non-normative sub-functions. For example, the normative sub-functions can be necessary in some cases for the whole multi-to-multi matching algorithm in order to make the algorithm complete. The non-normative sub-functions, however, have to be present, but can be implemented using any suitable technique. For example, a tracker may be updated with a bounding box in two different ways according to the description provided herein. Once is when a "normal" matching happens, while the other is when a "merge" matching happens. In such a case, the point of this description is to emphasize that the multi-to-multi matching systems and techniques disclosed here are able to distinguish these two different types of matching while the other modules of the video analytics system can take advantage of the matching types and use them in different ways to handle these two different cases.

The following is an example of a sub-function procedure for ambiguity removal for a tracker:

Input to this function is a tracker trac which has one or more matchings in M with a matching status of MATCH_LEFT_BOX. This function may remove certain matchings in M.

For any matching (trac, boxAm) in M with a matching status of unequal to MATCH_LEFT_BOX, the following steps apply in order:

1. Create a list of matchings with boxAm being the bounding box. Denote the list as trackerListforBoxAm.
2. Insert all matchings in M with bounding box equal to boxAm and matching status unequal to MATCH_LEFT_BOX into trackerListforBoxAm.
3. If the trackerListforBoxAm is not empty, remove (trac, boxAm) from M. [Therefore, alternatively, the above insertion process can terminate once a single matching is identified.]

In the above procedure, in some cases the above insertion process can terminate once a single match is identified.

The following are three example procedures for splitting a tracker. In some cases, the procedures for splitting can be normative sub-functions. In some cases, however, one or more of the procedures for splitting may not be necessary. The input to these procedures is a tracker tracS and a list of bounding boxes boxList. These procedures assign trackers to bounding boxes in boxList. In the following childTrackerListS is the childTrackerList of tracS (that is, childTrackerListS includes the hidden trackers of tracS).

The first example procedure for splitting a tracker is as follows:

Method #1
1. Find a bounding box boxT in boxList with smallest distance to the tracS.
2. If childTrackerListS is empty, for each bounding box in boxList that is not boxT, create a new tracker with the bounding box, with a parameter indicating "split case".
3. Else, for each bounding box boxO in boxList that is not boxT, the following steps apply in order.
    a. Select an entry tracC in childTrackerListS, if tracC is selected,
        i. Update the tracker tracC with bounding box boxO with a parameter indicating the "normal case".
        ii. Remove tracC from childTrackerListS.
    b. If tracC is not selected, create a new tracker with the bounding box boxO, with a parameter indicating "split case"

The second example procedure for splitting a tracker is as follows:

Method #2
1. Create a list of trackers as a union of childTrackerListS and tracS, denote such a list as splitTrackerList.
2. For each bounding box boxC in boxList, the following steps apply in order.
    a. Select an entry tracC in splitTrackerList, if tracC is selected,
        i. Update the tracker tracC with bounding box boxO with a parameter indicating the "normal case".
        ii. Remove tracC from splitTrackerList.
    b. If tracC is not selected, create a new tracker with the bounding box boxO, with a parameter indicating "split case"

The third example procedure for splitting a tracker applies a global optimization between splitTrackerList and boxList. This example proceeds as follows:

Method #3
1. Create a list of trackers as a union of childTrackerListS and tracS, denote such a list as splitTrackerList.
2. Create a distance matrix with the trackers in childTrackerListS and bounding boxes in boxList, denote this matrix as disMatrixSub, it is a U×V matrix wherein U is the number of entries in boxList and V is the number of entries in childTrackerListS. Note that the implementation of the whole algorithm can be based on a distance matrix of all trackers and all bounding boxes. In such a case, instead of creating a sub matrix, just indices to the correct positions of the matrix should be correctly calculated. Therefore, using disMatrixSub can be considered as only editorial.

3. While both U and V is larger than 0, the following applies
   a. Find the corresponding pair of (i, j) indexing trackers and boxes from the splitTrackerList and boxList respectively, such that disMatrixSub[i,j] is the smallest of the sub matrix. Denote tracC and boxO as the tracker and bounding box associated with (i,j).
   b. Update the tracker tracC with bounding boxO with a parameter indicating the normal case.
   c. Remove tracC from splitTrackerList, remove boxO from the boxList and remove row i and column j from the matrix disMatrixSub.
4. If both U and V become 0, all trackers and boxes are matched. Otherwise, if U is larger than 0 when V is 0, create new trackers for the leftover bounding boxes, with parameter indicating "split case".

A example procedure for merging trackers is as follows. In some cases, the procedures for merging can be normative sub-functions. In some cases, however, the procedure for merging may not be necessary. The input to this procedure is a list of trackers, tracList, and a bounding box boxM. The procedure assigns the trackers related to those in tracList to the bounding box. In the steps below, note that if a tracker tracC is a hidden/child tracker of a tracker tracP, it belongs to a list of childTrackerList of tracP:

1. Find a tracker tracT in tracList with smallest distance to the boxM. Alternatively, a tracker tracT in tracList with the longest duration is chosen. Alternatively, a tracker tracT from those in tracList that are not new (or split new) trackers with smallest distance is chosen, if it cannot be found, a tracker tracT from all those in tracList with smallest distance is chosen.
2. For any tracker in tracO in tracList that is not tracT, the following applies
   a. Denote the childTrackerList of tracT as childTrackerListT and childTrackerList of tracO as childTrackerListO
   b. For each entry in childTrackerListO, insert it into the childTrackerListT.
   c. Set the childTrackerListO to empty.
3. Update the tracker tracT with bounding box boxM with a parameter indicating the "normal case".
4. For each tracker tracC in childTrackerListT, update the tracker tracC with bounding box boxM with a parameter indicating the "merge case".

The following is an example procedure for selecting a tracker from a tracker list, given a particular bounding box. In some cases, the procedures for tracker selection from the tracker list can be normative sub-functions. In some cases, however, the procedure for tracker selection may not be necessary. The input to this procedure is a tracker list trackerList and bounding box boxT. This procedure may return one tracker of trackerList or else otherwise indicate that no tracker was available. When no tracker is available, the output tracker is considered "not selected".

1. If trackerList is an empty, return "not selected".
2. For an entry tracS in trackerList that minimizes the distance to boxT.
   a. If tracS is smaller than $T_1$, tracS is selected.
   b. Else if tracS is the last one in trackerList (i.e. trackerList contains only one entry), tracS is selected.
   c. Else, return "not selected".

Alternatively, tracS can be selected based on duration. Alternatively, tracS can be selected based on the tracker status being new or not, where a tracker that is not new (or split new) is more likely to be chosen.

The following is an example of a procedure for updating a bounding box in the normal case. In some cases, the procedures for updating a bounding box in the normal case can be non-normative sub-functions. The input to this procedure is a tracker trac1 and a bounding box box1:
1. Update the position of trac1 as that of the box1;
2. Use the box1 to update the location prediction, e.g., Kalman filter's parameters so as to derive better position for the next frame;
3. Denote the final status for this trac1 as normal.

The following is an example of a procedure for updating a bounding box in the merge case. In some cases, the procedures for updating a bounding box in the merge case can be non-normative sub-functions. The input to this procedure is a tracker tracN and a bounding box box1.
1. Update the position of tracN as that of the box1;
2. Denote the final status for this trac1 as "merge";
3. Tag the tracN is to indicate it is merged into another tracker.

The following is an example procedure for creating a new tracker in the normal case. In some cases, the procedures for creating a new tracker in the normal case can be non-normative sub-functions. The input to this procedure is a bounding box box:
1. Create a tracker tracN and assign is position/size the same as box;
2. Denote the final status for this tracN as "new";
3. Assign a new label for this tracN.

The following is an example of a procedure for creating a new tracker in a split case. In some cases, the procedures for creating a new tracker in a split case can be non-normative sub-functions. The input to this procedure is a bounding box box:
1. Create a tracker tracSN and assign is position/size the same as box;
2. Denote the final status for this tracN as "split new";
3. Assign a new label for this tracN.
4. Assign the label of the tracker it is spitted from. Note that by knowing a tracker tracP split to a list of boxes, the label is the label of tracP.

In various implementations, a video content analysis system may include a multi-to-multi matching framework for multi-object tracking, as previously described. The framework can include a matching stage, in which trackers are paired with bounding boxes, with the objective that the smallest overall cost is achieved. The smallest overall cost can be defined as the sum of the distances between each paired tracker and bounding box being minimized. The matching stage may allow trackers that match no bounding box, and such trackers may be deemed lost. The matching stage may also allow bounding boxes that match no trackers, and such bounding boxes may require new trackers. The matching stage may also allow one tracker to be associated with multiple bounding boxes, and may also allow multiple trackers to be associated with one bounding box.

In various implementations, the matching framework may pair trackers and bounding boxes only when the distance between a tracker and bounding box is less than a threshold. Any pairing where the distance between the tracker and the bounding box is greater than the threshold may be removed.

In various implementations, the matching framework may include, first, pairing each tracker and each bounding box in a frame so that all the trackers or all the bounding boxes are paired, and so that all the pairings are one-to-one. Next, any pairing where the distance between the bounding box and the tracker is larger than at threshold is removed. Third, any remaining unmatched trackers may be matched to bounding boxes. Fourth, any remaining bounding boxes may be matched to trackers. In various implementations, the third and fourth steps may occur in any order.

In various implementations, the pairings that result from the matching framework may be further refined. Refinement steps may reduce the pairings to only three kinds of pairings: one-to-one pairings, one-tracker-to-multiple-bounding-box pairings, and/or multiple-tracker-to-one-bounding-box pairings.

In various implementations, refinement may include removing ambiguous matches. Removing ambiguities may include reducing any multiple-tracker-to-multiple-bounding box pairings such that only multiple-tracker-to-one-bounding-box and one-tracker-to-multiple-bounding-box pairings remain. If a tracker trac which has one or more matchings in M with one matching status being MATCH_LEFT_BOX, for any matching (trac, boxAm) in M with a matching status of unequal to MATCH_LEFT_BOX, the following applies: Consider a list of matchings with boxAm being the bounding box and matching status unequal to MATCH_LEFT_BOX as trackerListforBoxAm. If the trackerListforBoxAm is not empty, remove (trac, boxAm) from M.

In various implementations, refinement may include identifying any remaining unmatched bounding boxes. These bounding boxes may be identified as new, and the system may generate new trackers for these bounding boxes.

In various implementations, during refinement, unique bounding boxes may be examined, and either remain unique (that is, associated with only one tracker), or may by joined with other bounding boxes, possibly resulting in many bounding boxes being associated with one tracker.

In various implementations, after refinement, bounding boxes and trackers may either be paired one-to-one, or may be paired one-bounding-box-to-multiple-trackers.

In various implementations, any trackers that remain unmatched after refinement are considered lost.

In various implementations, the system may use an adaptive threshold when considering the distance between a bounding box and a tracker. For example, the threshold may be based on the sizes of the bounding box and the tracker. In one example, an adaptive threshold may be defined as T=MIN(T, MAX (boxHeight, boxWidth)), wherein boxHeight and boxWidth are the size of the bounding box being considered.

In various implementations, the system may use two thresholds instead one threshold when considering the distance between a bounding box and a tracker. For example, the system may use a Tnear and a Tfar, where the system uses Tnear when determining which of multiple bounding boxes (or multiple trackers) are closest to a tracker (or bounding box) and thus should be selected. In this example, when only one bounding box (or tracker) is being considered, the system may use Tfar to determine whether the bounding box (or tracker) is close enough to a tracker (or bounding box). In this example, Tnear may be set zero or a value less than zero, so that the distance between a bounding box and a tracker satisfies Tnear when the tracker and the bounding box overlap.

As discussed above, the multi-to-multi matching framework may include the use of hidden trackers. In various implementations, when two or more trackers are merged, one tracker becomes a "major" or "parent" tracker, while the remaining trackers become hidden trackers, or "children" of the parent tracker. Trackers that have been merged in this way may be assigned a "merge" state.

In various implementations, hidden trackers may also be split. For example, when a parent tracker is associated with multiple bounding boxes, hidden trackers may be paired with some of the multiple bounding boxes. Alternatively or additionally, hidden trackers may be considered in matching trackers and bounding boxes in a globally optimized fashion. When hidden trackers are also considered, the hidden trackers may, separately from their parent tracker, be associated with bounding boxes.

In various implementations, hidden trackers that have been associated with a bounding box are given a "split" status.

In various implementations, a tracker that is associated with two or more bounding boxes is given a "split new" status, regardless of whether the tracker has one or more hidden trackers.

In various implementations, hidden trackers are not considered in making the initial pairings between trackers and bounding boxes. In these implementations, the hidden trackers may be considered later, when the system considers bounding boxes that have not yet been matched to trackers.

In various implementations, global optimization may be based only on the distances between trackers and bounding boxes. Alternatively or additionally, global optimization may also be based on the state of each tracker (e.g., "new," "split new," or "not new"), and/or the duration of each tracker.

In some cases, a tracker that is being made hidden may itself be a parent tracker of one or more hidden trackers. In various implementations, these hidden trackers may be removed as hidden trackers from the tracker, and be made children of the parent tracker that the tracker is being made a hidden tracker for. That is, the tracker, and all of its hidden trackers, are all made children of the same parent tracker.

In various implementations, one-to-one pairings of trackers and bounding boxes are assigned a "normal" status.

A video content analysis system may include multi-to-multi matching process in an overall object tracking system. In object tracking, multi-to-multi matching may be necessary, due to the possible occurrences of splitting and merging of blobs. The matching process may reduce the occurrence of trackers being updated with irrelevant or incorrect information, or new trackers being created with incorrect information. A video content analysis system may further be able to integrate other, possibly advanced object tracking and detection methods with the matching process, including for example methods for updating the distance function or methods for defining a blob to be of any shape. A multi-to-multi matching process may further lead to more accurate updating of trackers and better tracking results.

Figure 11:
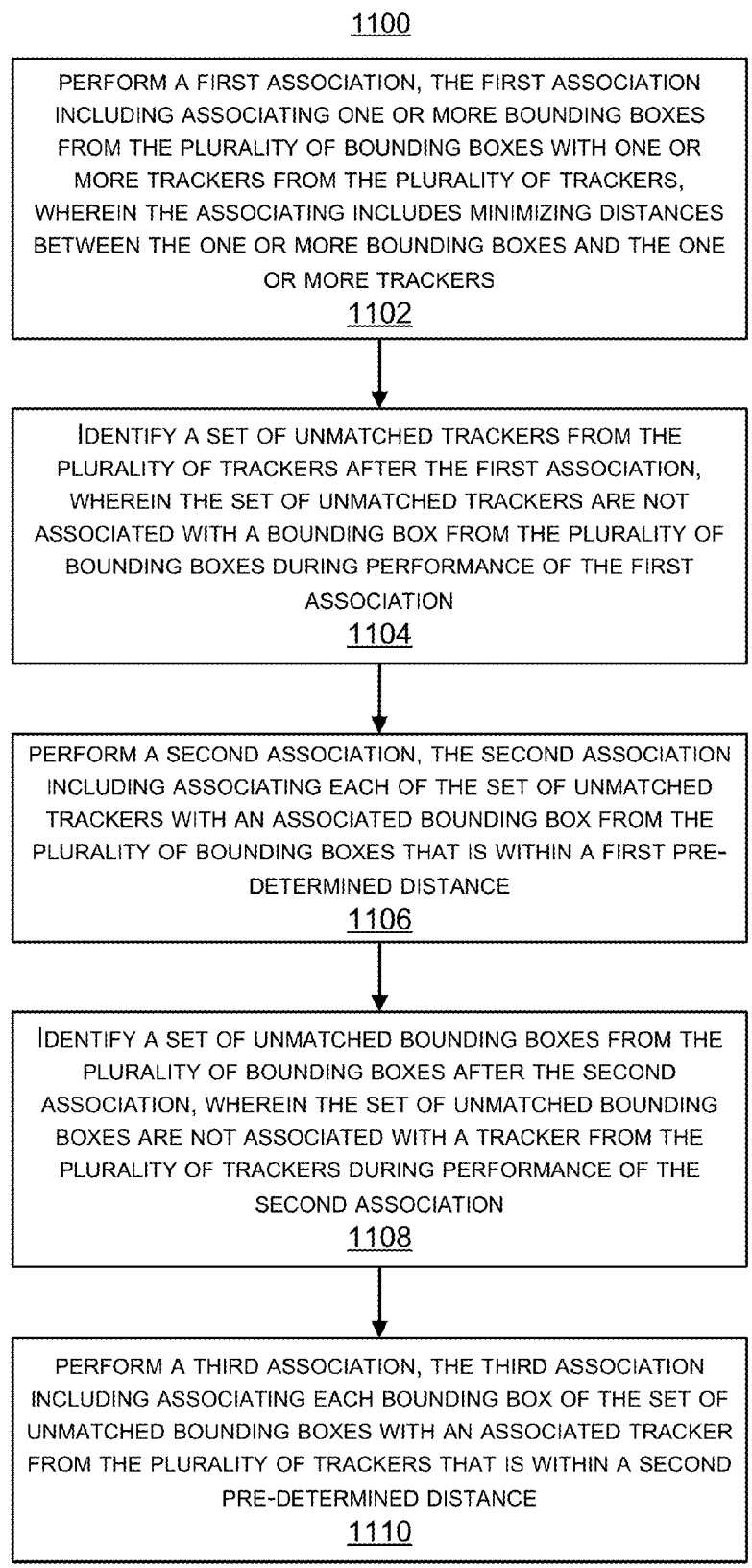
FIG. 11 an example of a process of matching a plurality of bounding boxes to a plurality of trackers.

FIG. 11 illustrates an example of a process 1100 of matching a plurality of bounding boxes to a plurality of trackers using the multi-to-multi matching techniques described herein. At 1102, the process 1100 includes performing a first association, the first association including associating one or more bounding boxes from the plurality of bounding boxes with one or more trackers from the plurality of trackers, wherein the associating includes minimizing distances between the one or more bounding boxes and the one or more trackers. In some examples, associating the plurality of bounding boxes with the plurality of trackers during the first association includes associating a number of bounding boxes from the plurality of bounding boxes with an equal number of trackers from the plurality of trackers. Each bounding box from the number of bounding boxes is matched with one tracker from the number of trackers. In some examples, the process 1100 further includes identifying one or more bounding boxes from the number of bounding boxes and one or more associated trackers from the number of trackers, where a distance between each of the identified one or more bounding boxes and an associated tracker from the one or more associated trackers is greater than a third pre-determined distance. An example of the third pre-determined distance is designed above as a distance $T_1$. In some examples, the process 1100 further includes removing associations between the identified one or more bounding boxes and one or more associated trackers. For example, the third pre-determined distance may be defined so that a tracker that is farther than the third pre-determined distance from a bounding box is, more likely than not, a tracker for a different bounding box, and thus such associations may be removed. In one illustrative example provided above, any matching $(R_i, S_j)$ with a distance $d(R_i, S_j)$ is removed if $d(R_i, S_j) > T_1$.

At 1104, the process 1100 includes identifying a set of unmatched trackers from the plurality of trackers after the first association. The set of unmatched trackers are not associated with a bounding box from the plurality of bounding boxes during performance of the first association. At 1106, the process 1100 includes performing a second association. The second association includes associating each of the set of unmatched trackers with an associated bounding box from the plurality of bounding boxes that is within a first pre-determined distance. An example of the first pre-determined distance is designed above as a distance $T_2$. For example, an unmatched tracker can be matched with a bounding box that is within the first pre-determined distance from the unmatched tracker.

At 1108, the process 1100 includes identifying a set of unmatched bounding boxes from the plurality of bounding boxes after the second association. The set of unmatched bounding boxes are not associated with a tracker from the plurality of trackers during performance of the second association. At 1110, the process 1100 includes performing a third association. The third association includes associating each of the set of unmatched bounding boxes with an associated tracker from the plurality of trackers that is within a second pre-determined distance. An example of the second pre-determined distance is designed above as a distance $T_3$. In some examples, associating each bounding box of the set of unmatched bounding boxes with an associated tracker from the plurality of trackers includes associating an unmatched bounding box from the one or more unmatched bounding boxes with a tracker from the plurality of trackers that is designated as hidden. Such examples can associate hidden trackers with unmatched bounding boxes instead of generating new trackers for the unmatched bounding boxes. New trackers can still be generated for the unmatched bounding boxes when no hidden trackers are available.

In some examples, the process 1100 further includes identifying one or more remaining unmatched bounding boxes from the plurality of bounding boxes after the third association, and generating a new tracker for each of the one or more remaining unmatched bounding boxes. The new tracker can be associated with an unmatched bounding box.

In some examples, the process 1100 further includes identifying one or more remaining unmatched trackers from the plurality of trackers after the third association, and designating the one or more remaining unmatched trackers as lost. For example, the one or more remaining unmatched trackers can be assigned a lost status or state.

In some examples, the process 1100 further includes identifying a first bounding box from the plurality of bounding boxes that is associated with a tracker from the plurality of trackers after the third association. The tracker is associated with a second bounding box from the plurality of bounding boxes. Such a scenario can occur, for example, when two blobs split apart (e.g., when two people separate from one another, in which case two blobs generated for the two people are split), in which case the two bounding boxes for the two blobs are split. In such examples, the process 1100 further includes splitting the first bounding box from the tracker. The splitting includes removing the association of the first bounding box from the tracker, generating a new tracker, and associating the first bounding box with the new tracker. In some cases, the first bounding box can be removed from the tracker due to the first bounding box having a larger distance to the tracker than the second bounding box. In some examples, the new tracker can be designated as a split new tracker, and the split new tracker can inherit some information from the tracker.

In some examples, the process 1100 further includes identifying a bounding box from the plurality of bounding boxes that is associated with at least a first tracker and a second tracker. The the first tracker and the second tracker are included in the plurality of trackers. Such a scenario can occur, for example, when two blobs become merged (e.g., when two people come so close to one another that two blobs generated for the two people are detected as a merged blob), in which case the two bounding boxes for the two blobs are merged. In such examples, the process 1100 further includes merging the first tracker and the second tracker. The merging includes assigning the first tracker as a hidden tracker of the second tracker, assigning the second tracker as a parent tracker of the first tracker, and removing the association of the first tracker from the identified bounding box. The first tracker can be assigned as the hidden tracker by setting a state of the first tracker as hidden. The second tracker can be assigned as the parent tracker by setting a state of the first tracker as a parent of the first tracker.

In some examples, the process 1100 further includes identifying a first bounding box from the plurality of bounding boxes that is associated with a first tracker from the plurality of trackers after the third association. The first tracker is associated with a second bounding box, and a second tracker is assigned as a hidden tracker of the first tracker. Such a scenario can occur, for example, when two blobs split apart, in which case the two bounding boxes for the two blobs are split. In such examples, the process 1100 further includes splitting the first bounding box from the first tracker. The splitting includes removing the association of the first bounding box from the first tracker, removing the second tracker as the hidden tracker of the first tracker, and associating the first bounding box with the second tracker.

In some examples, the process 1100 further includes identifying a first tracker from the plurality of trackers that is associated with a first bounding box and a second bounding box. Such a scenario can occur, for example, when two blobs split apart, in which case the two bounding boxes for the two blobs are split. The first bounding box and the second bounding box are included in the plurality of bounding boxes. In such examples, the process 1100 further includes identifying a second tracker from the plurality of trackers that is associated with the second bounding box, and removing the association of the first tracker from the second bounding box.

In some examples, the process 1100 may be performed by a computing device or an apparatus, such as the video analytics system 100. For example, the process 1100 can be performed by the video analytics system 100, the blob detection engine 104, and/or the object tracking engine 106 shown in FIGS. 1, 3, and 4. In some cases, the computing device or apparatus may include a processor, microprocessor, microcomputer, or other component of a device that is configured to carry out the steps of process 1100. In some examples, the computing device or apparatus may include a camera configured to capture video data (e.g., a video sequence) including video frames. For example, the computing device may include a camera device (e.g., an IP camera or other type of camera device) that may include a video codec. In some examples, a camera or other capture device that captures the video data is separate from the computing device, in which case the computing device receives the captured video data. The computing device may further include a network interface configured to communicate the video data. The network interface may be configured to communicate Internet Protocol (IP) based data.

Process 1100 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1100 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The content-adaptive blob tracking operations discussed herein may be implemented using compressed video or using uncompressed video frames (before or after compression). An example video encoding and decoding system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method for matching a plurality of bounding boxes to a plurality of trackers, comprising:
performing a first association, the first association including associating one or more bounding boxes from the plurality of bounding boxes with one or more trackers from the plurality of trackers, wherein the associating includes minimizing distances between the one or more bounding boxes and the one or more trackers;
identifying a set of unmatched trackers from the plurality of trackers after the first association, wherein the set of unmatched trackers are not associated with a bounding box from the plurality of bounding boxes during performance of the first association;
performing a second association, the second association including associating each of the set of unmatched trackers with an associated bounding box from the plurality of bounding boxes that is within a first pre-determined distance;
identifying a set of unmatched bounding boxes from the plurality of bounding boxes after the second association, wherein the set of unmatched bounding boxes are not associated with a tracker from the plurality of trackers during performance of the second association; and
performing a third association, the third association including associating each bounding box of the set of unmatched bounding boxes with an associated tracker from the plurality of trackers that is within a second pre-determined distance.

2. The method of claim 1, further comprising:
wherein the first association includes associating a number of bounding boxes from the plurality of bounding boxes with an equal number of trackers from the plurality of trackers, wherein each bounding box from the number of bounding boxes is matched with one tracker from the number of trackers;
identifying one or more bounding boxes from the number of bounding boxes and one or more associated trackers from the number of trackers, wherein a distance between each of the identified one or more bounding boxes and an associated tracker from the one or more associated trackers is greater than a third pre-determined distance; and
removing associations between the identified one or more bounding boxes and one or more associated trackers.

3. The method of claim 1, further comprising:
identifying one or more remaining unmatched bounding boxes from the plurality of bounding boxes after the third association; and
generating a new tracker for each of the one or more remaining unmatched bounding boxes.

4. The method of claim 1, further comprising:
identifying one or more remaining unmatched trackers from the plurality of trackers after the third association; and
designating the one or more remaining unmatched trackers as lost.

5. The method of claim 1, further comprising:
identifying a first bounding box from the plurality of bounding boxes that is associated with a tracker from the plurality of trackers after the third association, wherein the tracker is associated with a second bounding box from the plurality of bounding boxes; and
splitting the first bounding box from the tracker, wherein splitting includes:
removing the association of the first bounding box from the tracker;
generating a new tracker; and
associating the first bounding box with the new tracker.

6. The method of claim 1, further comprising:
identifying a bounding box from the plurality of bounding boxes that is associated with at least a first tracker and a second tracker, wherein the first tracker and the second tracker are included in the plurality of trackers; and
merging the first tracker and the second tracker, wherein merging includes:
assigning the first tracker as a hidden tracker of the second tracker;
assigning the second tracker as a parent tracker of the first tracker; and
removing the association of the first tracker from the identified bounding box.

7. The method of claim 1, wherein associating each bounding box of the set of unmatched bounding boxes with an associated tracker from the plurality of trackers includes associating an unmatched bounding box from the one or more unmatched bounding boxes with a tracker from the plurality of trackers that is designated as hidden.

8. The method of claim 1, wherein hidden trackers are only considered for association with the set of unmatched bounding boxes during the third association.

9. The method of claim 1, further comprising:
identifying a first bounding box from the plurality of bounding boxes that is associated with a first tracker from the plurality of trackers after the third association, wherein the first tracker is associated with a second bounding box, wherein a second tracker is assigned as a hidden tracker of the first tracker; and
splitting the first bounding box from the first tracker, wherein splitting includes:
removing the association of the first bounding box from the first tracker;
removing the second tracker as the hidden tracker of the first tracker; and
associating the first bounding box with the second tracker.

10. The method of claim 1, further comprising:
identifying a first tracker from the plurality of trackers that is associated with a first bounding box and a second bounding box, wherein the first bounding box and the second bounding box are included in the plurality of bounding boxes;
identifying a second tracker from the plurality of trackers that is associated with the second bounding box; and
removing the association of the first tracker from the second bounding box.

11. An apparatus comprising:
a memory configured to store video data; and
a processor configured to:
perform a first association, the first association including associating one or more bounding boxes from the plurality of bounding boxes with one or more trackers from the plurality of trackers, wherein the associating includes minimizing distances between the one or more bounding boxes and the one or more trackers;
identify a set of unmatched trackers from the plurality of trackers after the first association, wherein the set of unmatched trackers are not associated with a bounding box from the plurality of bounding boxes during performance of the first association;
perform a second association, the second association including associating each of the set of unmatched trackers with an associated bounding box from the plurality of bounding boxes that is within a first pre-determined distance;
identify a set of unmatched bounding boxes from the plurality of bounding boxes after the second association, wherein the set of unmatched bounding boxes are not associated with a tracker from the plurality of trackers during performance of the second association; and
performing a third association, the third association including associating each bounding box of the set of unmatched bounding boxes with an associated tracker from the plurality of trackers that is within a second pre-determined distance.

12. The apparatus of claim 11, further comprising:
wherein the first association includes associating a number of bounding boxes from the plurality of bounding boxes with an equal number of trackers from the plurality of trackers, wherein each bounding box from the number of bounding boxes is matched with one tracker from the number of trackers;
identifying one or more bounding boxes from the number of bounding boxes and one or more associated trackers from the number of trackers, wherein a distance between each of the identified one or more bounding boxes and an associated tracker from the one or more associated trackers is greater than a third pre-determined distance; and
removing associations between the identified one or more bounding boxes and one or more associated trackers.

13. The apparatus of claim 11, wherein the processor is further configured to:
identify one or more remaining unmatched bounding boxes from the plurality of bounding boxes after the third association; and
generate a new tracker for each of the one or more remaining unmatched bounding boxes.

14. The apparatus of claim 11, wherein the processor is further configured to:
identify one or more remaining unmatched trackers from the plurality of trackers after the third association; and
designate the one or more remaining unmatched trackers as lost.

15. The apparatus of claim 11, wherein the processor is further configured to:
identify a first bounding box from the plurality of bounding boxes that is associated with a tracker from the plurality of trackers after the third association, wherein the tracker is associated with a second bounding box from the plurality of bounding boxes; and
split the first bounding box from the tracker, wherein splitting includes:
removing the association of the first bounding box from the tracker;
generating a new tracker; and
associating the first bounding box with the new tracker.

16. The apparatus of claim 11, wherein the processor is further configured to:
identify a bounding box from the plurality of bounding boxes that is associated with at least a first tracker and a second tracker, wherein the first tracker and the second tracker are included in the plurality of trackers; and
merge the first tracker and the second tracker, wherein merging includes:
assigning the first tracker as a hidden tracker of the second tracker;
assigning the second tracker as a parent tracker of the first tracker; and
removing the association of the first tracker from the identified bounding box.

17. The apparatus of claim 11, wherein associating each bounding box of the set of unmatched bounding boxes with an associated tracker from the plurality of trackers includes associating an unmatched bounding box from the one or more unmatched bounding boxes with a tracker from the plurality of trackers that is designated as hidden.

18. The apparatus of claim 11, wherein hidden trackers are only considered for association with the set of unmatched bounding boxes during the third association.

19. The apparatus of claim 11, wherein the processor is further configured to:
identify a first bounding box from the plurality of bounding boxes that is associated with a first tracker from the plurality of trackers after the third association, wherein the first tracker is associated with a second bounding box, wherein a second tracker is assigned as a hidden tracker of the first tracker; and
split the first bounding box from the first tracker, wherein splitting includes:
removing the association of the first bounding box from the first tracker;
removing the second tracker as the hidden tracker of the first tracker; and
associating the first bounding box with the second tracker.

20. The apparatus of claim 11, wherein the processor is further configured to:
identify a first tracker from the plurality of trackers that is associated with a first bounding box and a second bounding box, wherein the first bounding box and the second bounding box are included in the plurality of bounding boxes;
identify a second tracker from the plurality of trackers that is associated with the second bounding box; and
removing the association of the first tracker from the second bounding box.

21. A computer readable medium having stored thereon instructions that when executed by a processor perform a method, including:
performing a first association, the first association including associating one or more bounding boxes from the plurality of bounding boxes with one or more trackers from the plurality of trackers, wherein the associating includes minimizing distances between the one or more bounding boxes and the one or more trackers;
identifying a set of unmatched trackers from the plurality of trackers after the first association, wherein the set of unmatched trackers are not associated with a bounding box from the plurality of bounding boxes during performance of the first association;

performing a second association, the second association including associating each of the set of unmatched trackers with an associated bounding box from the plurality of bounding boxes that is within a first pre-determined distance;

identifying a set of unmatched bounding boxes from the plurality of bounding boxes after the second association, wherein the set of unmatched bounding boxes are not associated with a tracker from the plurality of trackers during performance of the second association; and performing a third association, the third association including associating each bounding box of the set of unmatched bounding boxes with an associated tracker from the plurality of trackers that is within a second pre-determined distance.

22. The computer readable medium of claim 21, further comprising:

wherein the first association includes associating a number of bounding boxes from the plurality of bounding boxes with an equal number of trackers from the plurality of trackers, wherein each bounding box from the number of bounding boxes is matched with one tracker from the number of trackers;

identifying one or more bounding boxes from the number of bounding boxes and one or more associated trackers from the number of trackers, wherein a distance between each of the identified one or more bounding boxes and an associated tracker from the one or more associated trackers is greater than a third pre-determined distance; and removing associations between the identified one or more bounding boxes and one or more associated trackers.

23. The computer readable medium of claim 21, further comprising:

identifying one or more remaining unmatched bounding boxes from the plurality of bounding boxes after the third association; and generating a new tracker for each of the one or more remaining unmatched bounding boxes.

24. The computer readable medium of claim 21, further comprising:

identifying one or more remaining unmatched trackers from the plurality of trackers after the third association; and designating the one or more remaining unmatched trackers as lost.

25. The computer readable medium of claim 21, further comprising:

identifying a first bounding box from the plurality of bounding boxes that is associated with a tracker from the plurality of trackers after the third association, wherein the tracker is associated with a second bounding box from the plurality of bounding boxes; and splitting the first bounding box from the tracker, wherein splitting includes:

removing the association of the first bounding box from the tracker;

generating a new tracker; and associating the first bounding box with the new tracker.

26. The computer readable medium of claim 21, further comprising:

identifying a bounding box from the plurality of bounding boxes that is associated with at least a first tracker and a second tracker, wherein the first tracker and the second tracker are included in the plurality of trackers; and merging the first tracker and the second tracker, wherein merging includes:

assigning the first tracker as a hidden tracker of the second tracker;

assigning the second tracker as a parent tracker of the first tracker; and removing the association of the first tracker from the identified bounding box.

27. The computer readable medium of claim 21, wherein associating each bounding box of the set of unmatched bounding boxes with an associated tracker from the plurality of trackers includes associating an unmatched bounding box from the one or more unmatched bounding boxes with a tracker from the plurality of trackers that is designated as hidden.

28. The computer readable medium of claim 21, wherein hidden trackers are only considered for association with the set of unmatched bounding boxes during the third association.

29. The computer readable medium of claim 21, further comprising:

identifying a first bounding box from the plurality of bounding boxes that is associated with a first tracker from the plurality of trackers after the third association, wherein the first tracker is associated with a second bounding box, wherein a second tracker is assigned as a hidden tracker of the first tracker; and splitting the first bounding box from the first tracker, wherein splitting includes:

removing the association of the first bounding box from the first tracker;

removing the second tracker as the hidden tracker of the first tracker; and associating the first bounding box with the second tracker.

30. The computer readable medium of claim 21, further comprising:

identifying a first tracker from the plurality of trackers that is associated with a first bounding box and a second bounding box, wherein the first bounding box and the second bounding box are included in the plurality of bounding boxes;

identifying a second tracker from the plurality of trackers that is associated with the second bounding box; and removing the association of the first tracker from the second bounding box.

* * * * *